March 7, 1944.  H. T. AVERY  2,343,273
CALCULATING MACHINE
Filed July 20, 1938  35 Sheets-Sheet 1

INVENTOR.
Harold T. Avery.
BY Lyon & Lyon
ATTORNEYS

March 7, 1944. H. T. AVERY 2,343,273
CALCULATING MACHINE
Filed July 20, 1938 35 Sheets-Sheet 2
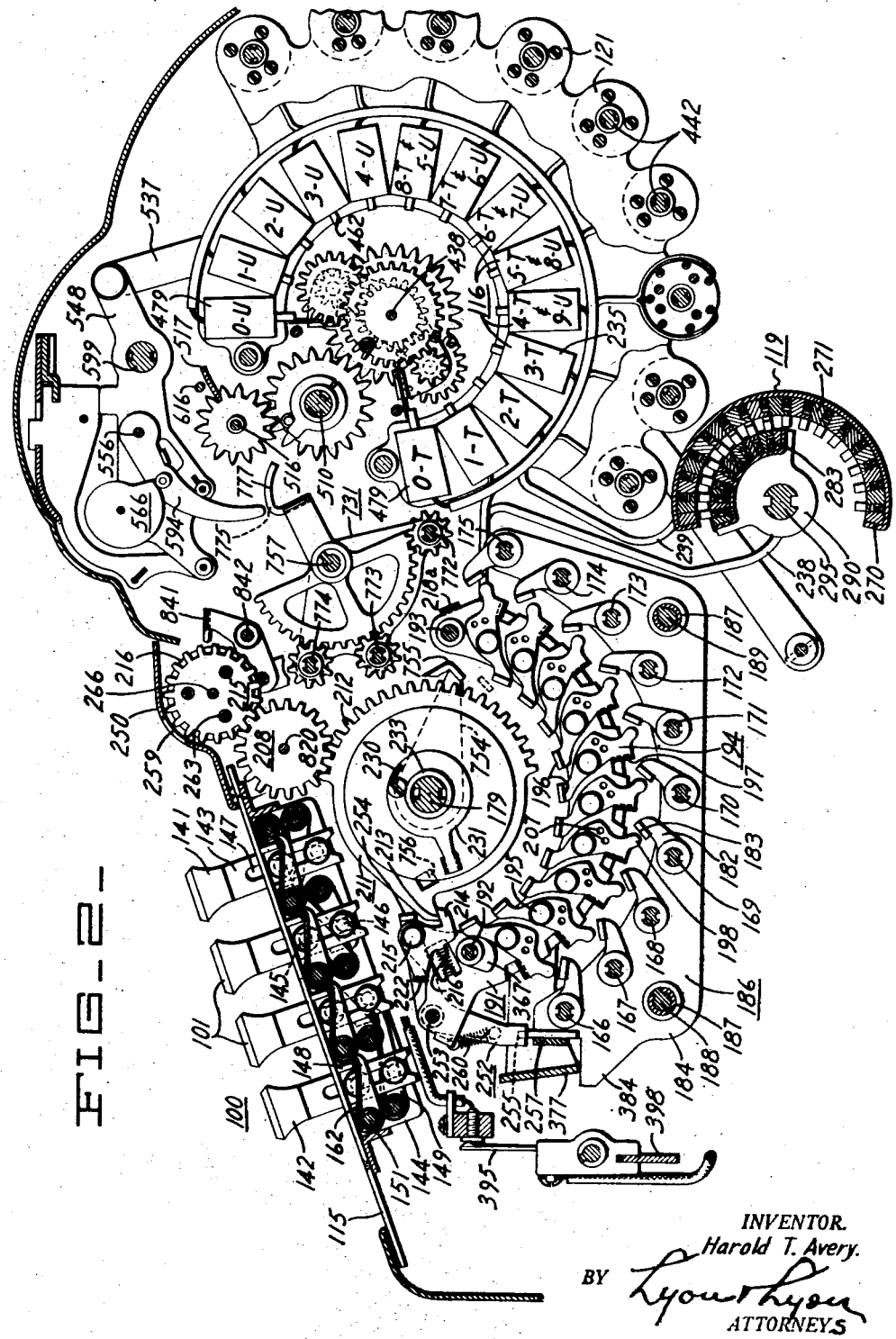
INVENTOR.
Harold T. Avery.
BY
ATTORNEYS March 7, 1944.                H. T. AVERY                 2,343,273
                          CALCULATING MACHINE
                         Filed July 20, 1938         35 Sheets-Sheet 3
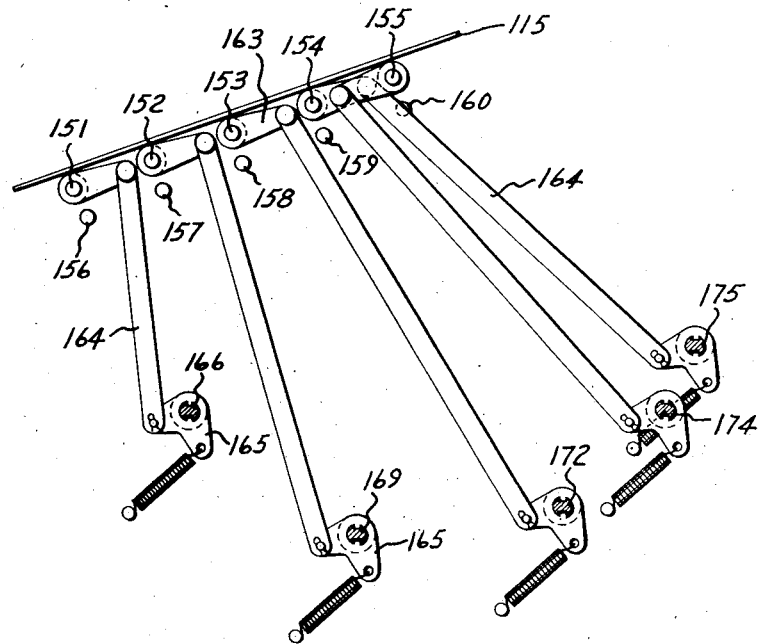
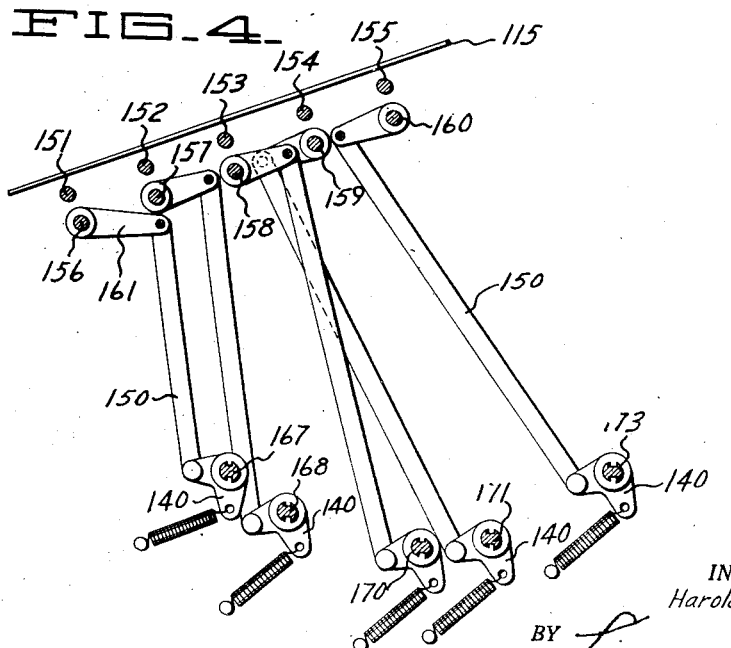
INVENTOR.
Harold T. Avery.
BY
ATTORNEYS March 7, 1944. H. T. AVERY 2,343,273
CALCULATING MACHINE
Filed July 20, 1938 35 Sheets-Sheet 4
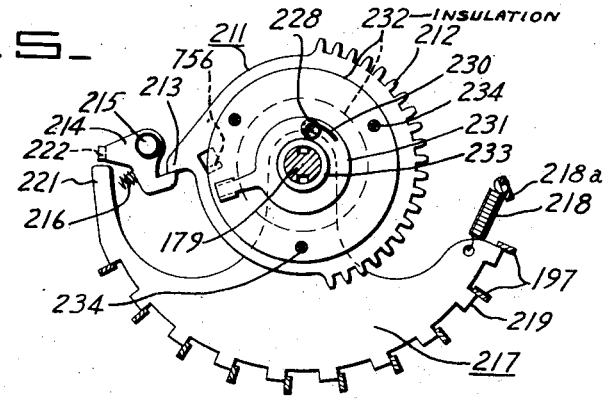
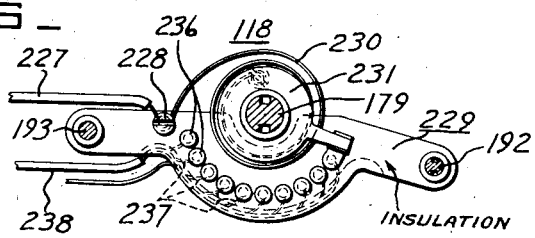
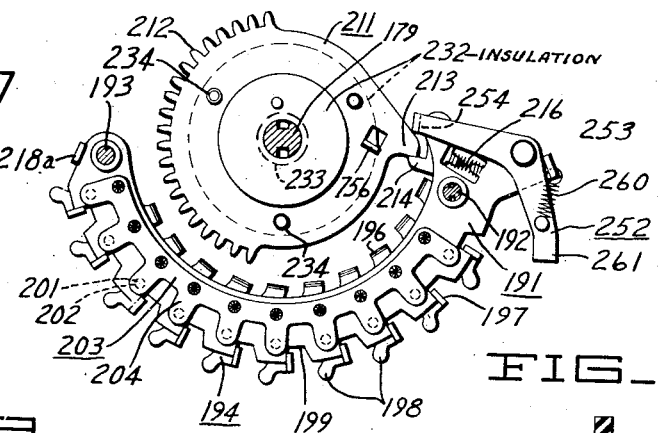
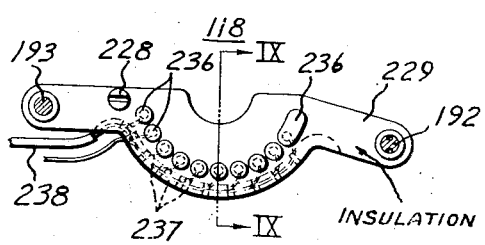
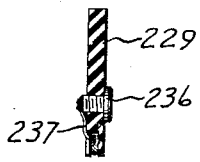
INVENTOR.
Harold T. Avery.
BY
ATTORNEYS

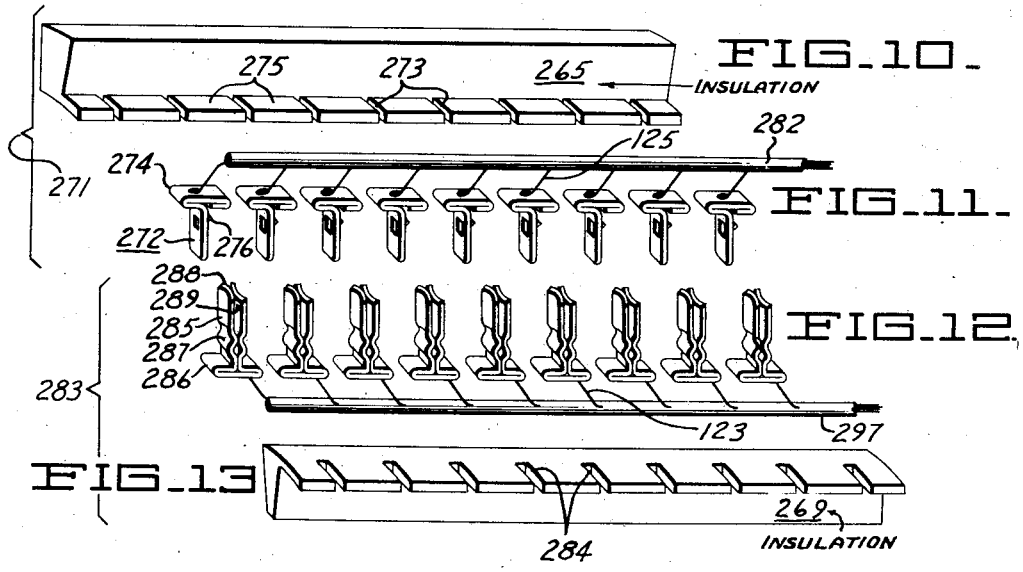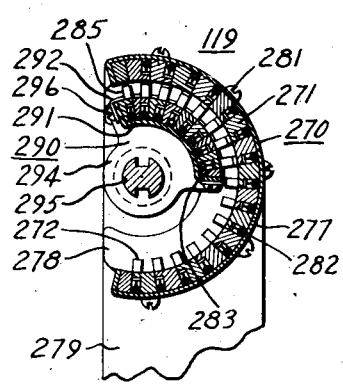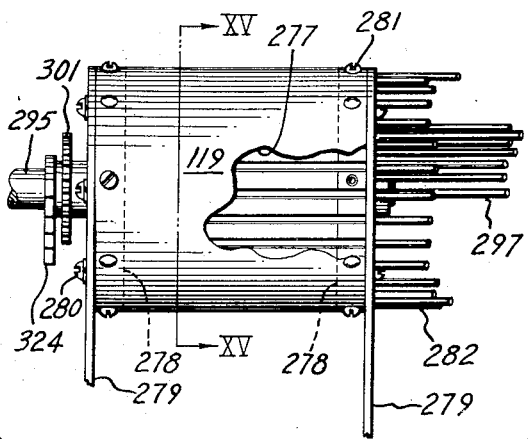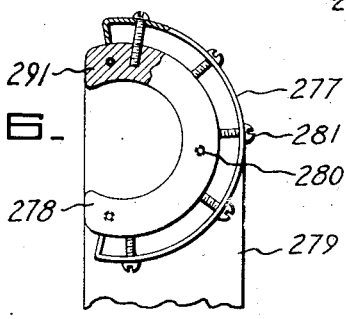

March 7, 1944.  H. T. AVERY  2,343,273
CALCULATING MACHINE
Filed July 20, 1938   35 Sheets-Sheet 6
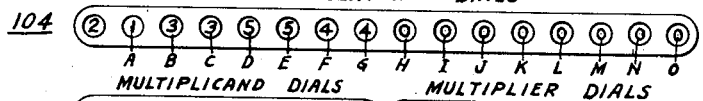
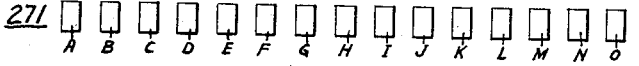
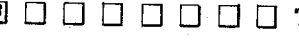
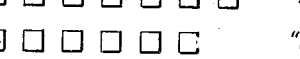
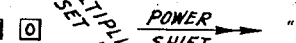
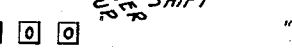
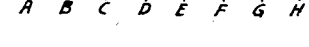
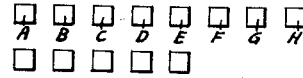
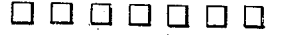
Inventor
Harold T. Avery
By Lyon & Lyon
Attorneys

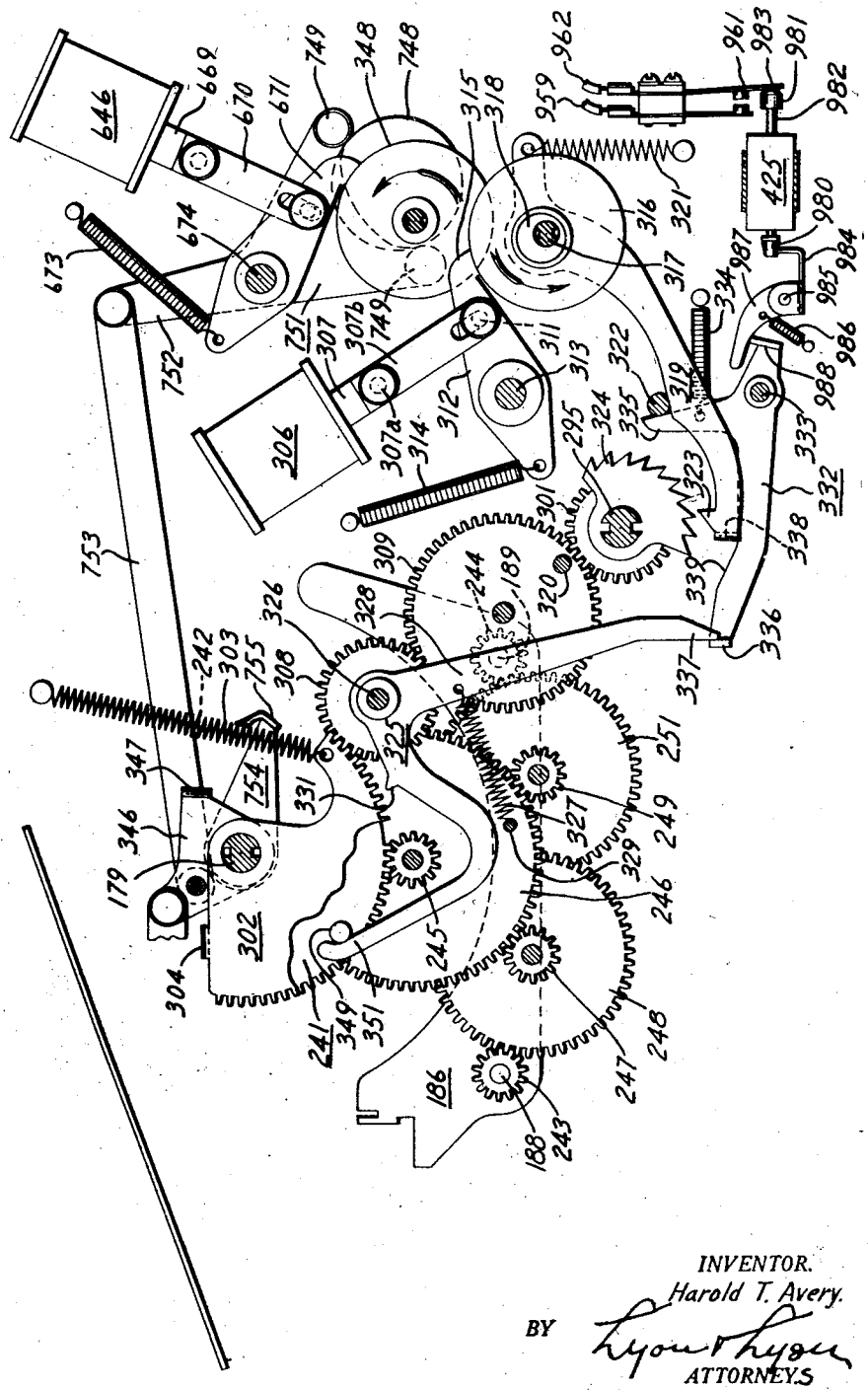

March 7, 1944.  H. T. AVERY  2,343,273
CALCULATING MACHINE
Filed July 20, 1938  35 Sheets-Sheet 8
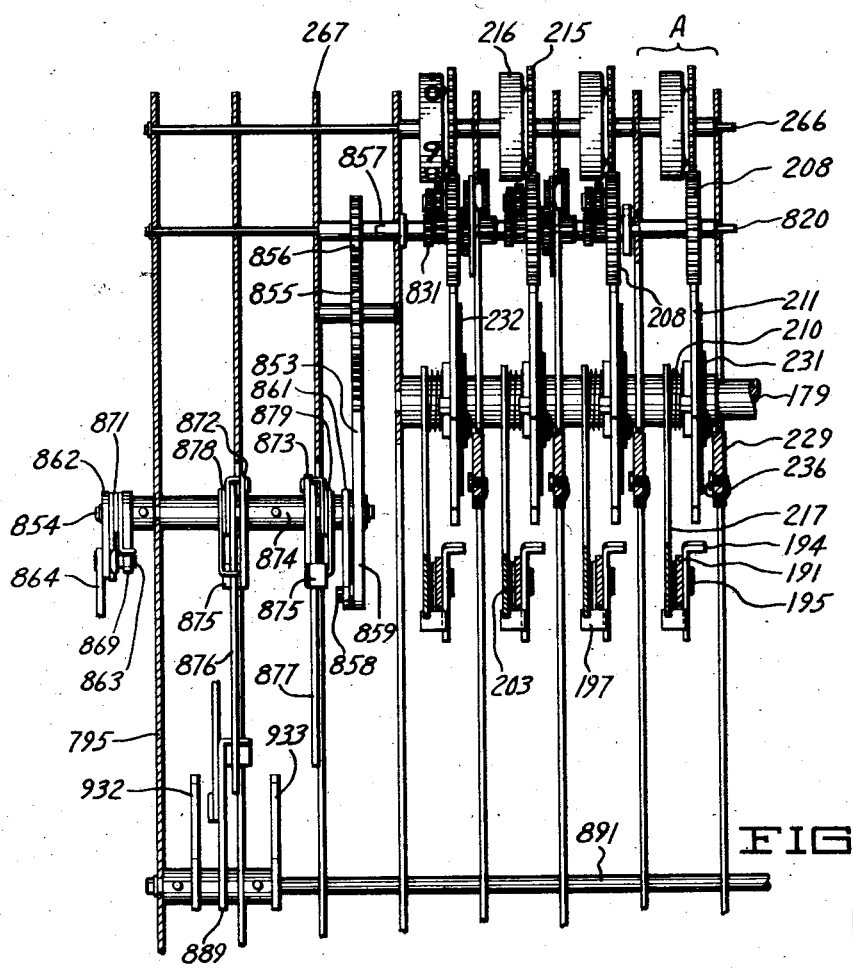
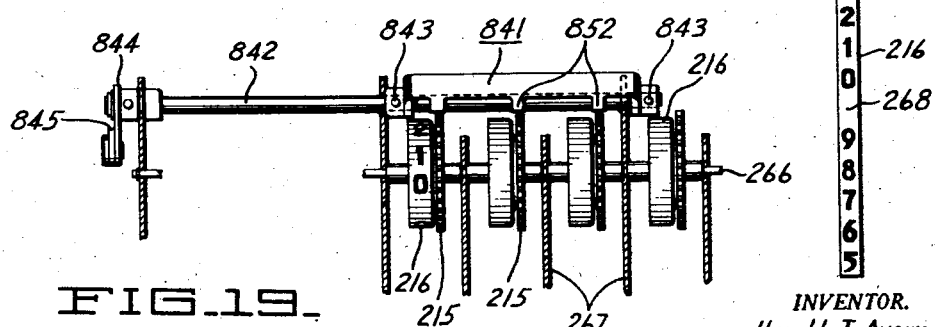
INVENTOR.
Harold T. Avery.
BY
ATTORNEYS

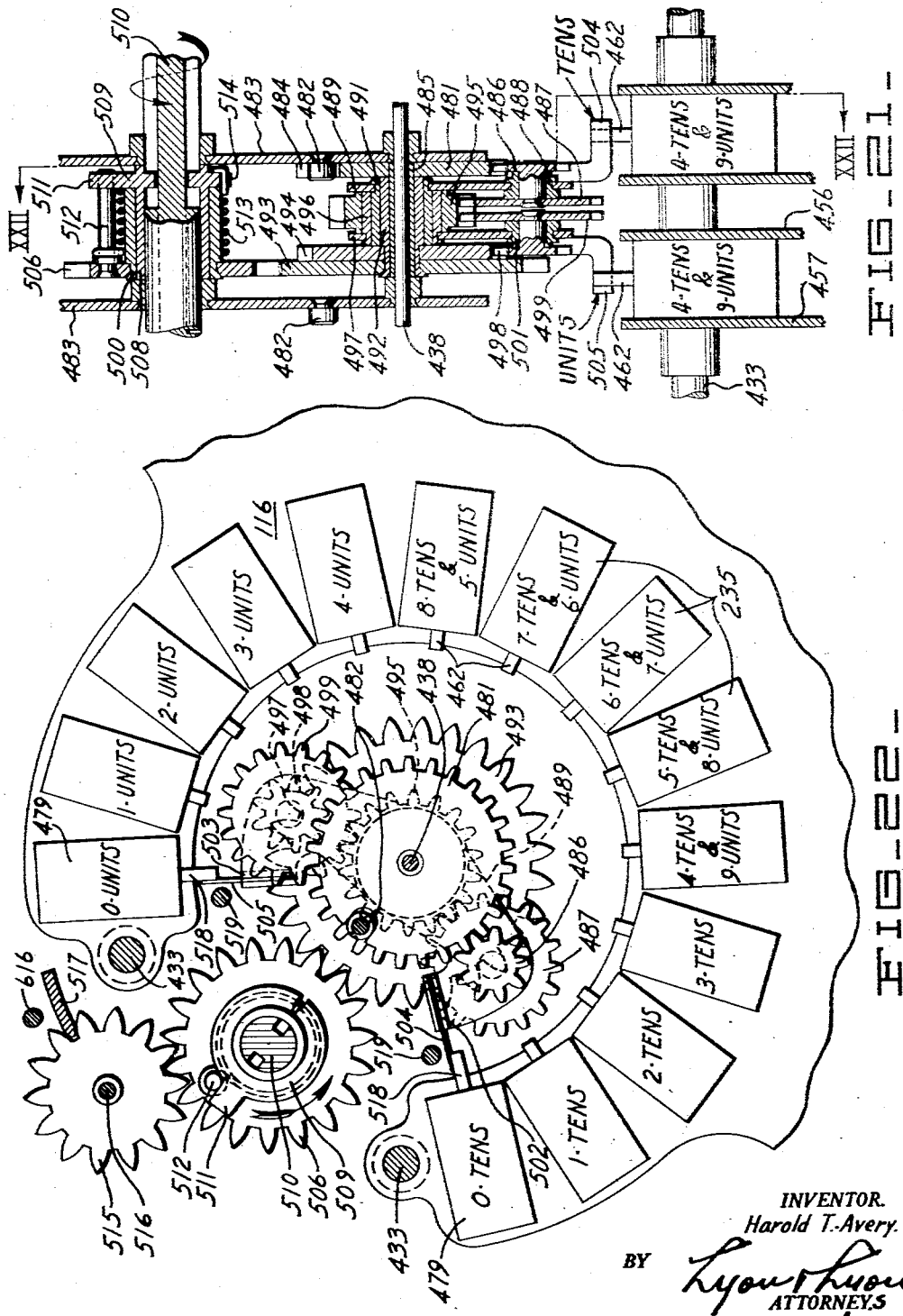

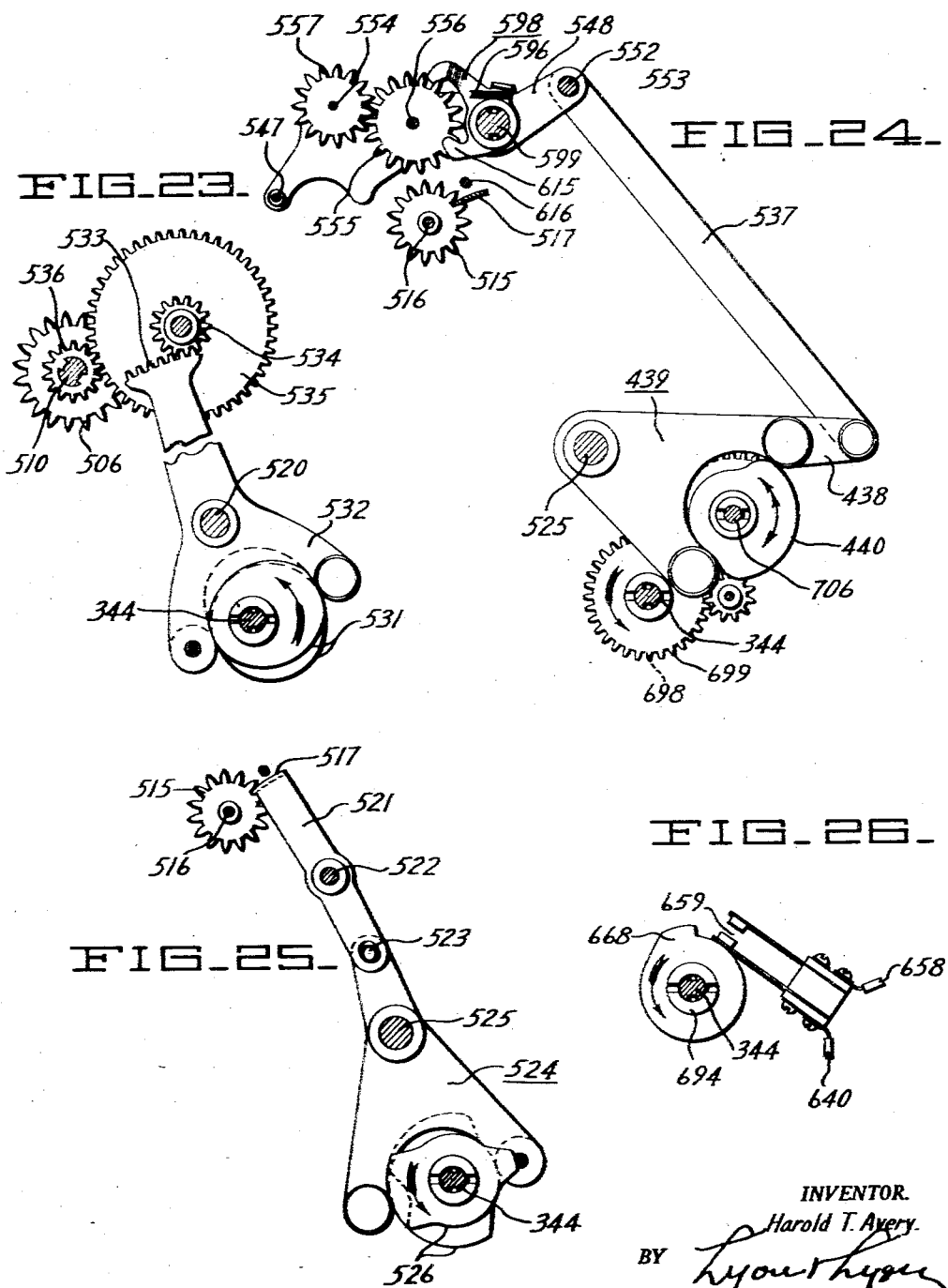

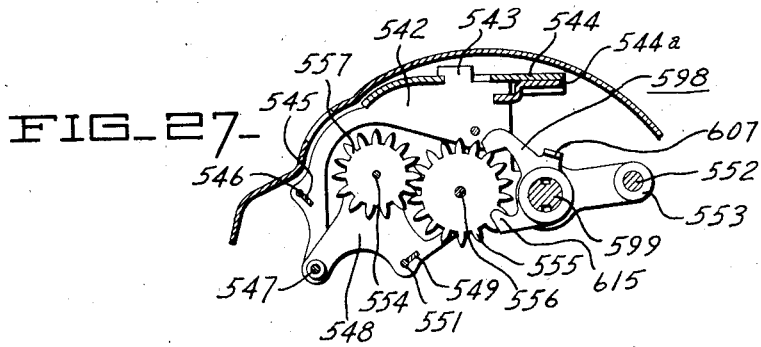
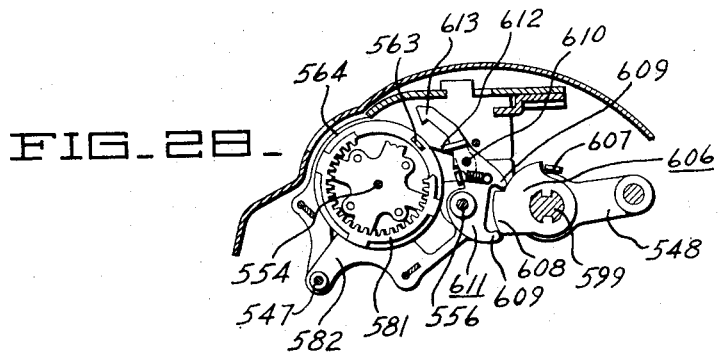
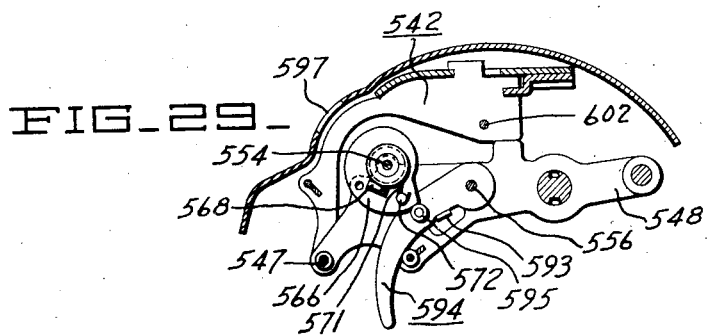
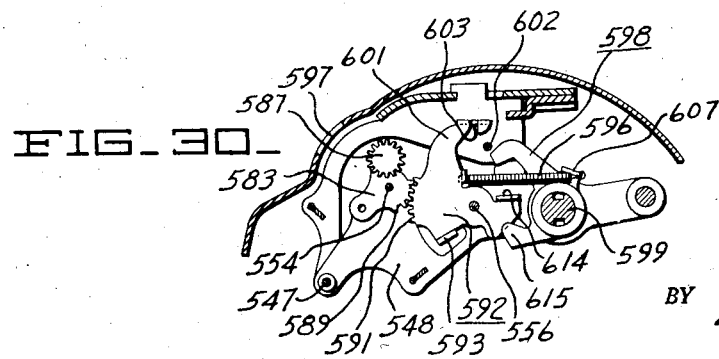

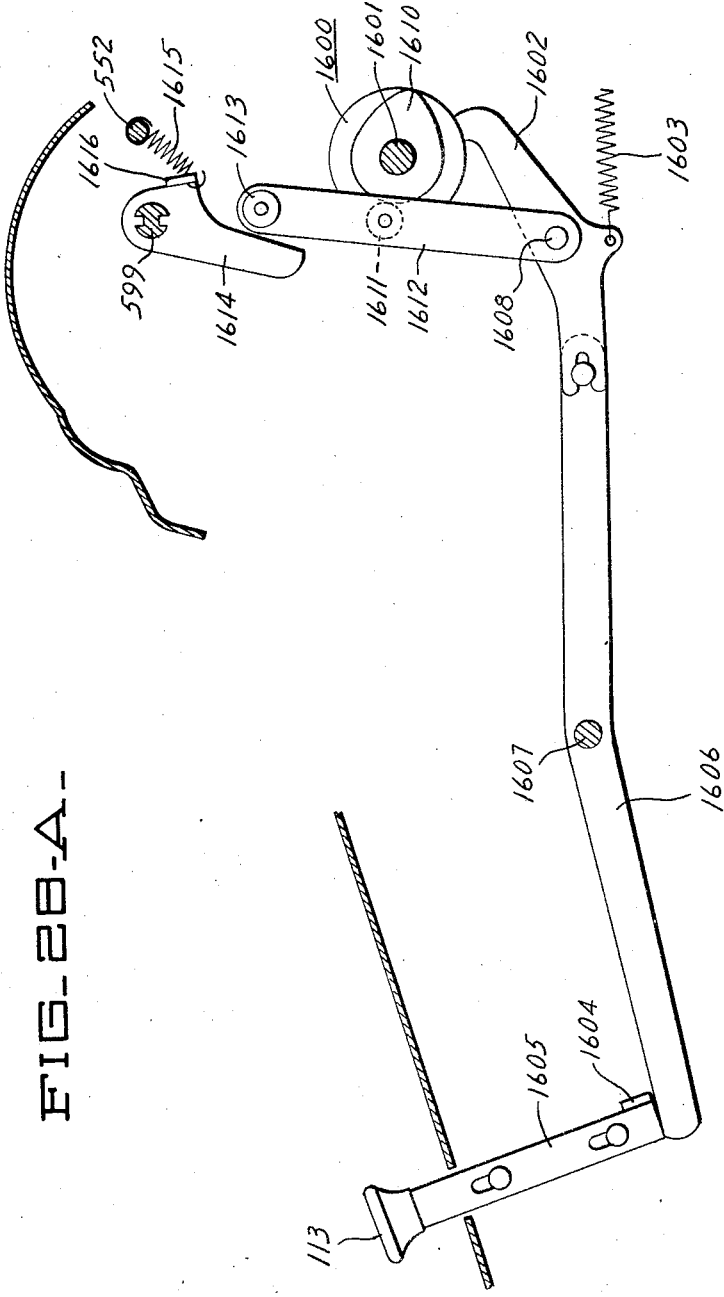

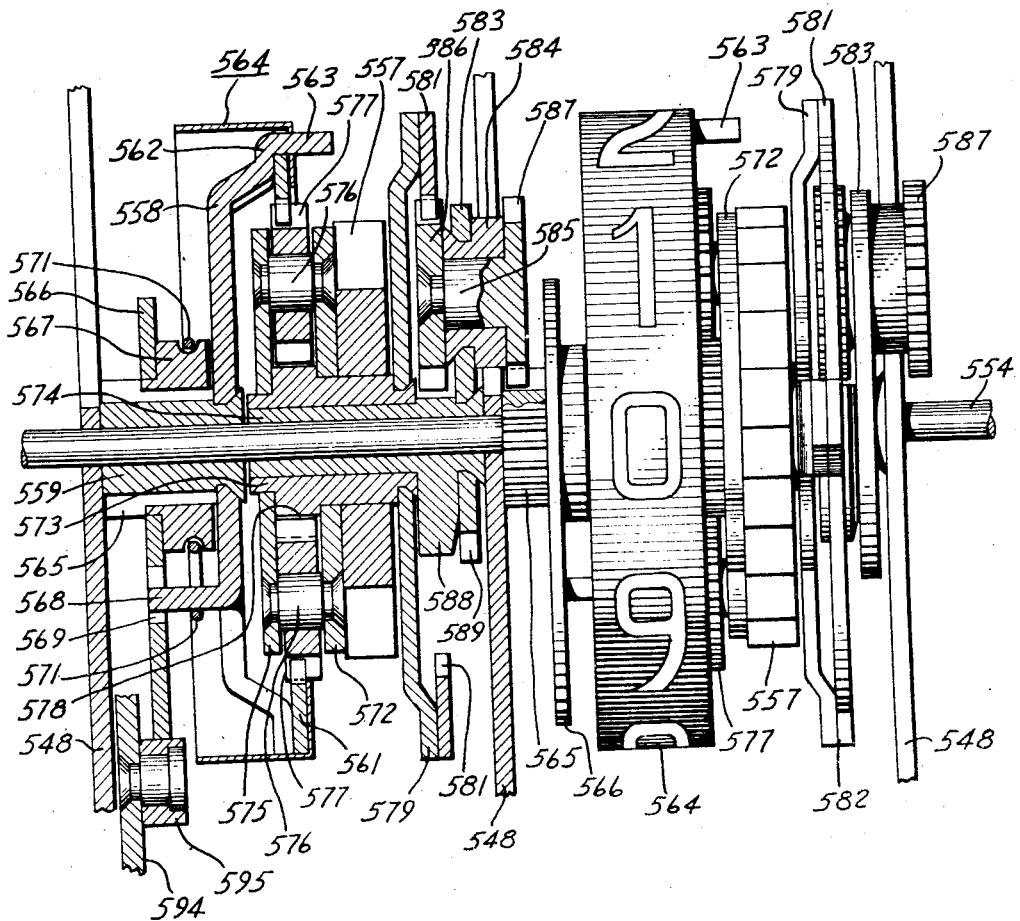
FIG_31_

March 7, 1944.  H. T. AVERY  2,343,273
CALCULATING MACHINE
Filed July 20, 1938   35 Sheets-Sheet 14
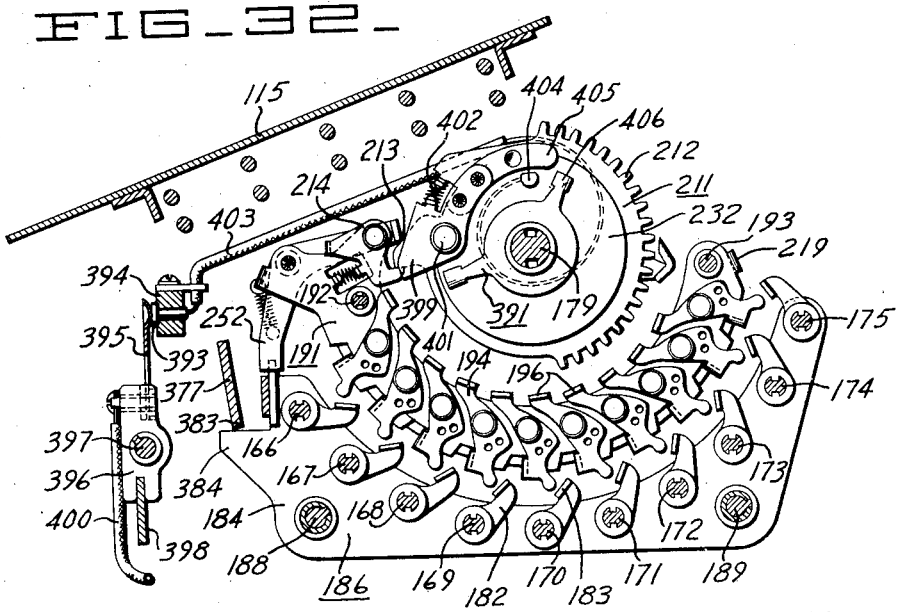
FIG_32_
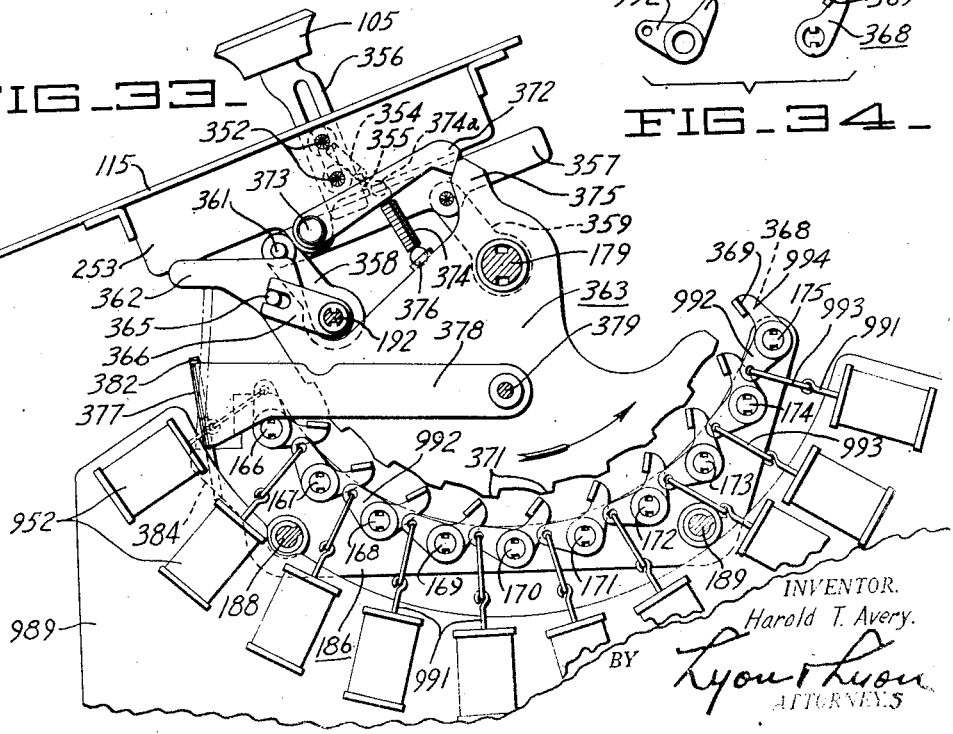
FIG_33_   FIG_34_
INVENTOR.
Harold T. Avery.
BY Lyon & Lyon
ATTORNEYS

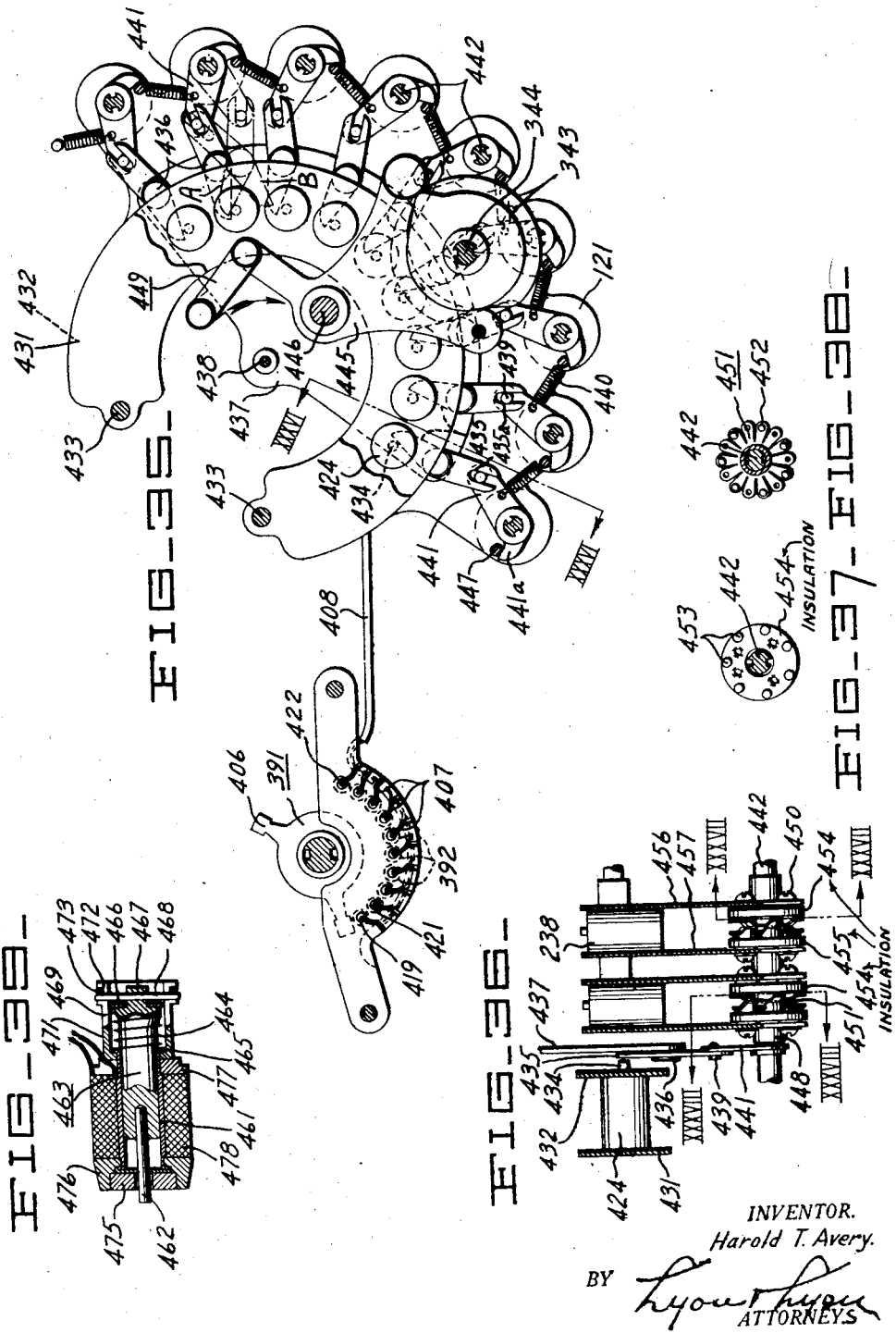

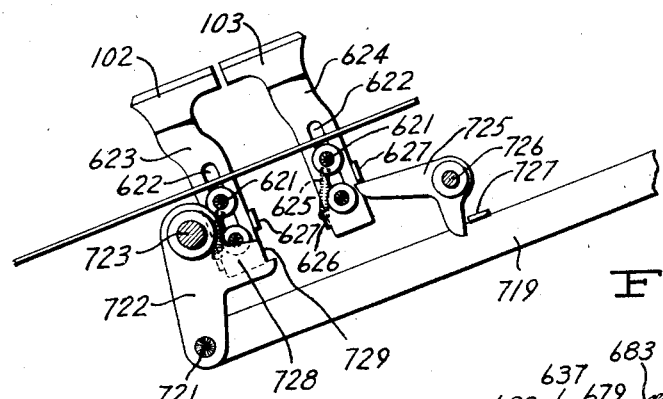
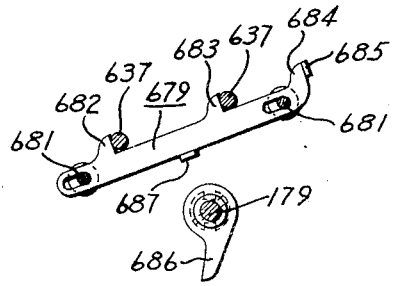
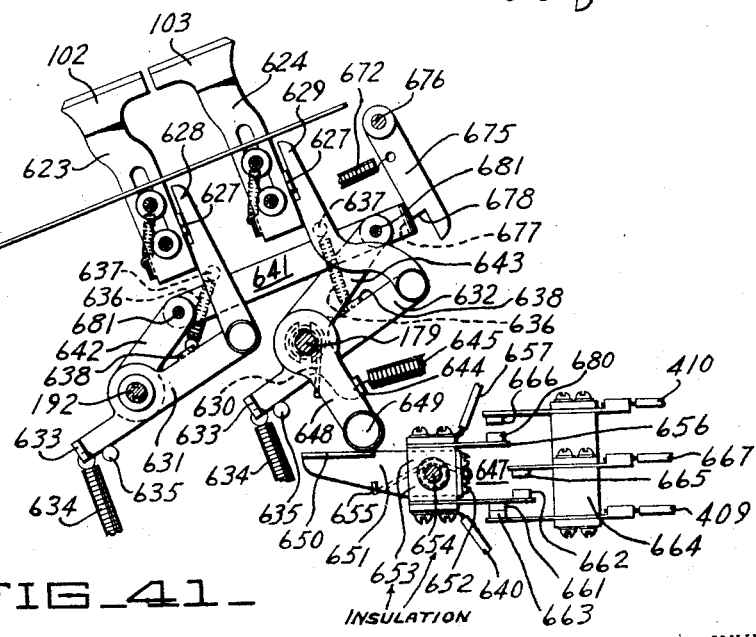

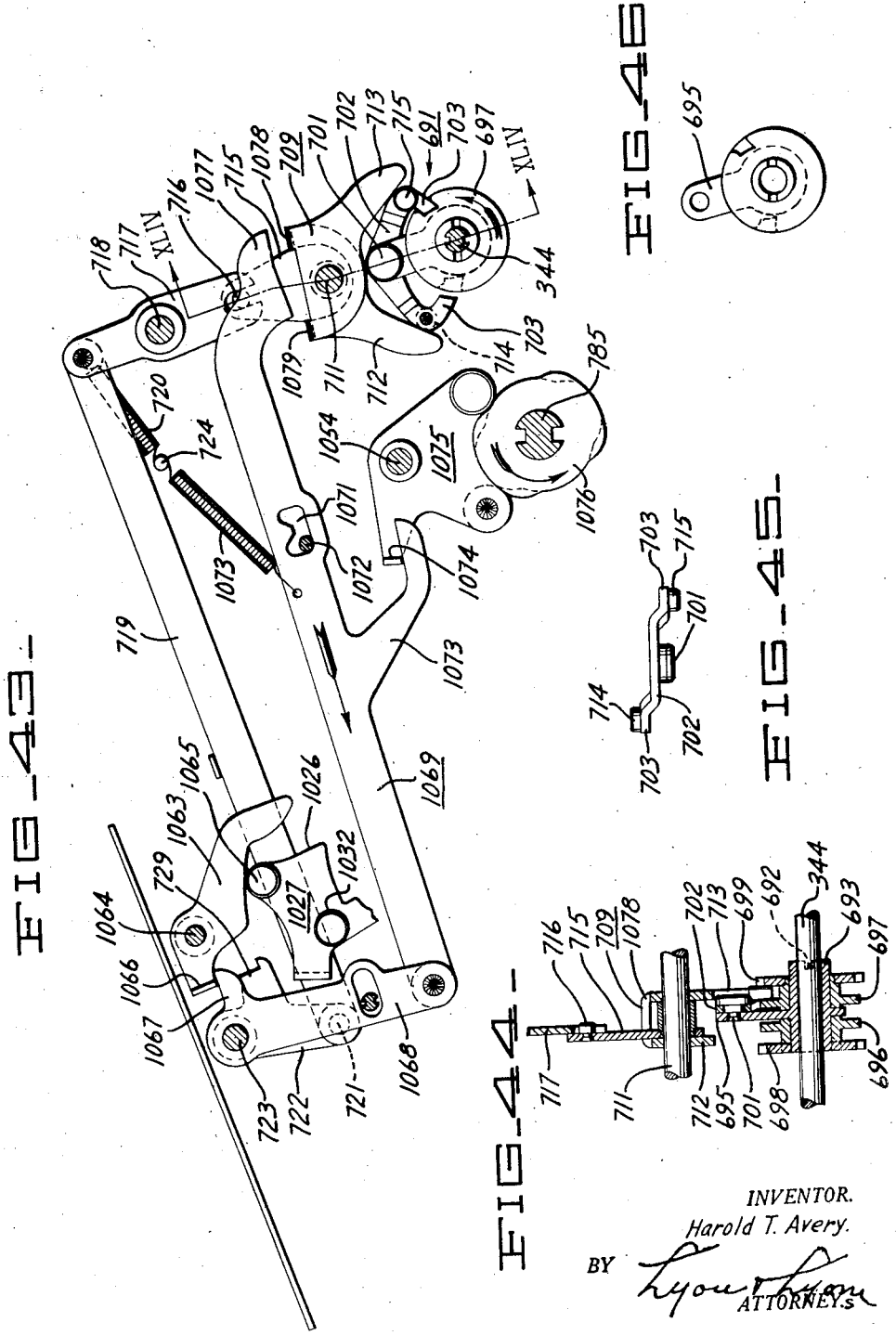

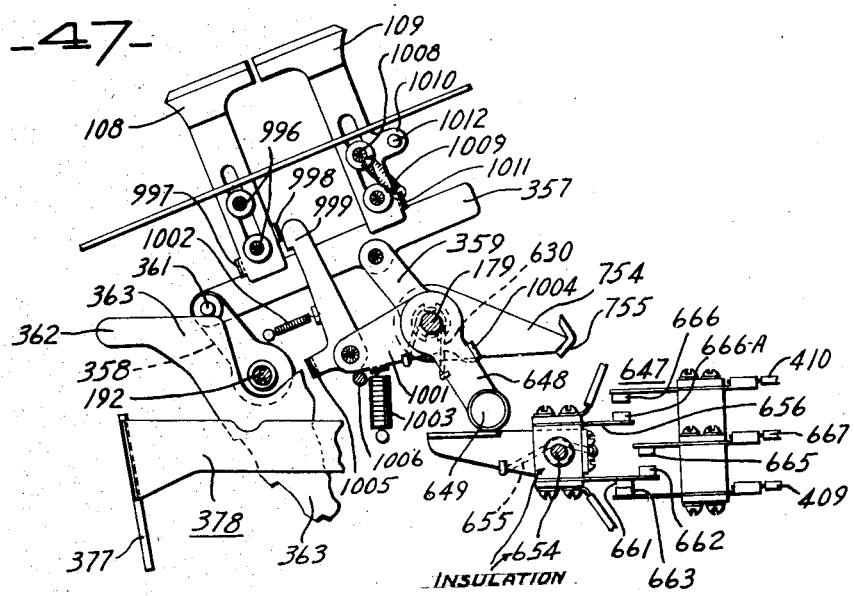
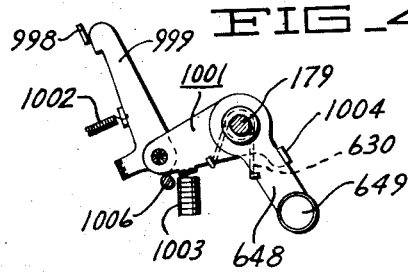
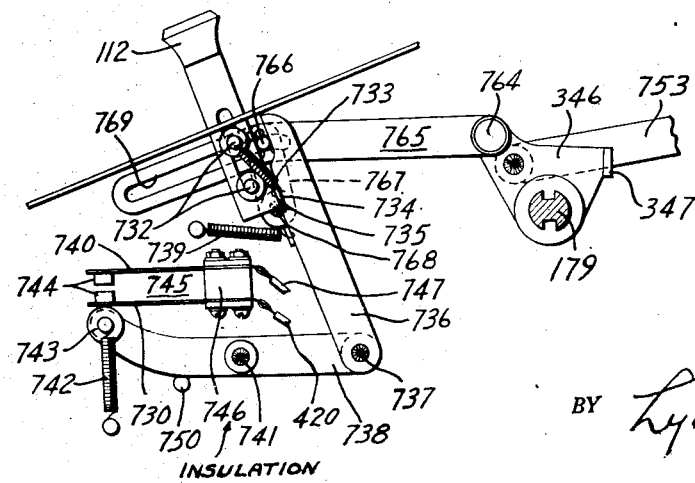

March 7, 1944.  H. T. AVERY  2,343,273
CALCULATING MACHINE
Filed July 20, 1938  35 Sheets-Sheet 19
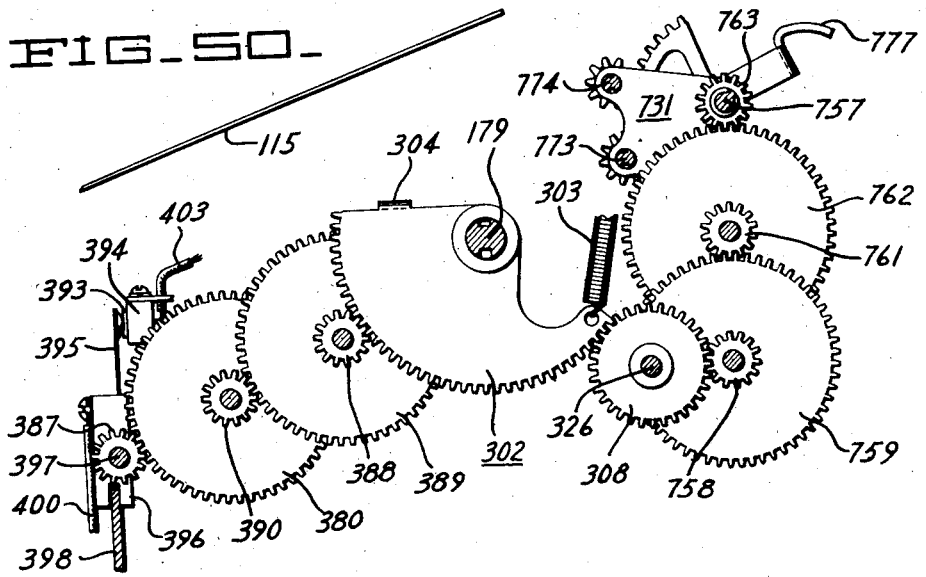
FIG_50_
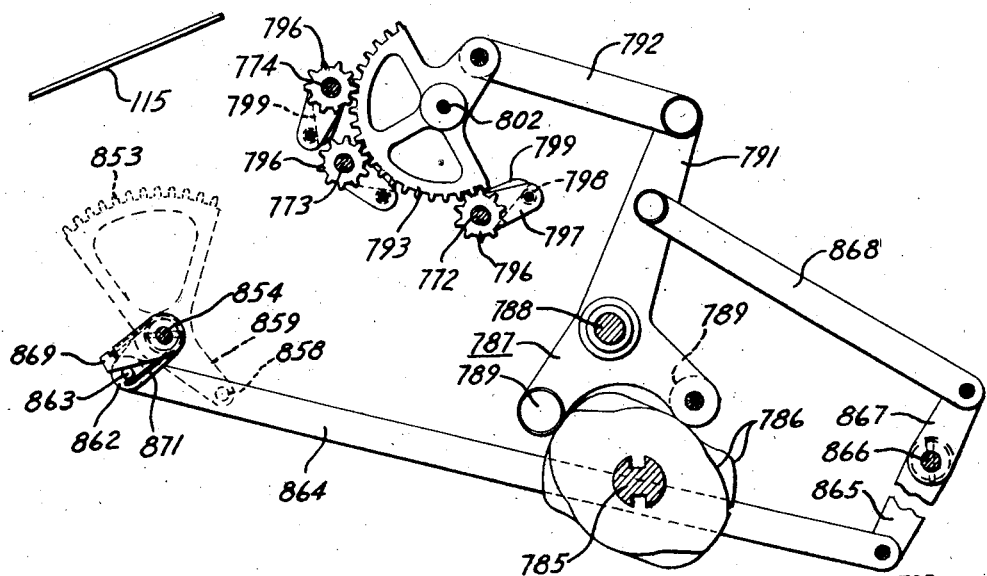
FIG_51_
INVENTOR.
Harold T. Avery.
BY Lyon & Lyon
ATTORNEYS

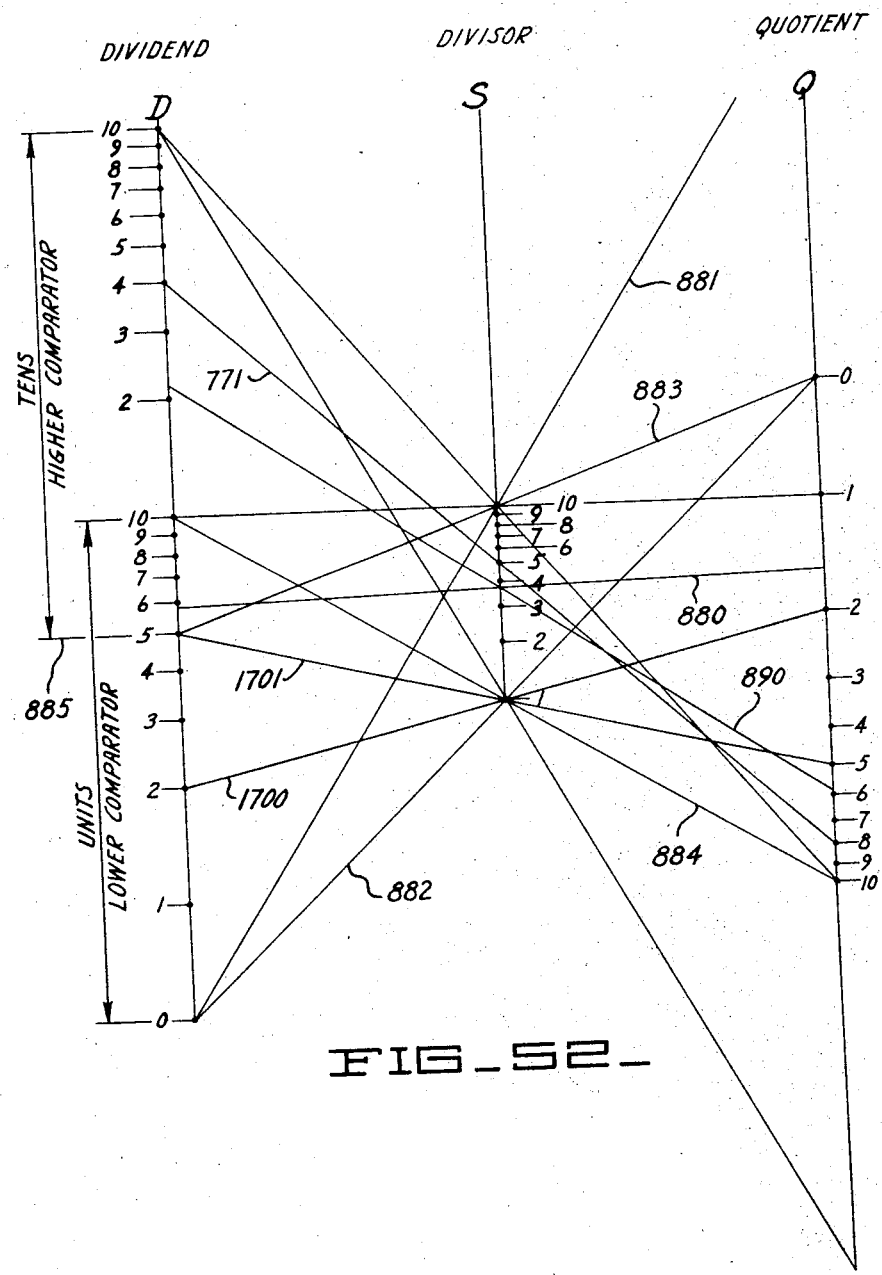
FIG_52_

March 7, 1944.  H. T. AVERY  2,343,273
CALCULATING MACHINE
Filed July 20, 1938   35 Sheets-Sheet 21
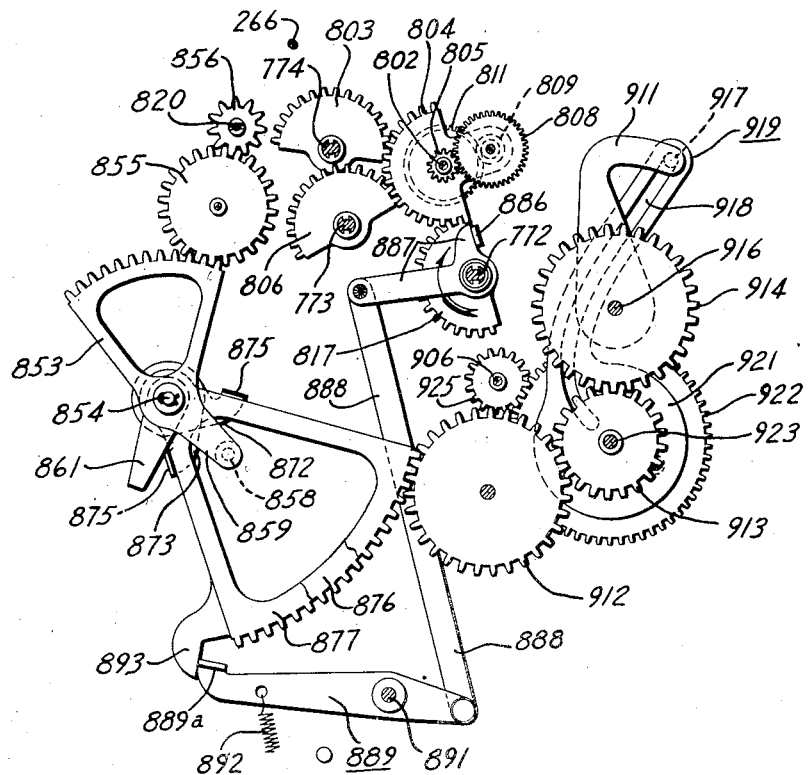
FIG_53_
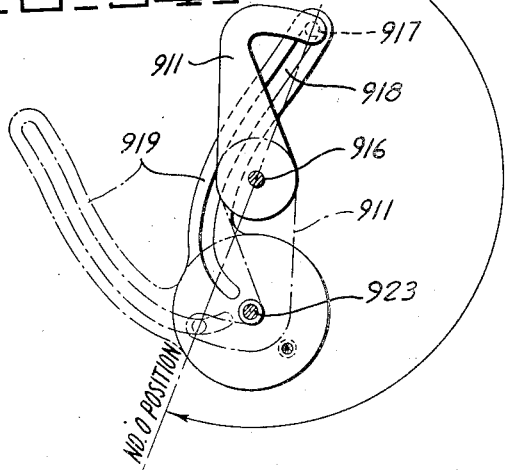
FIG_54_
INVENTOR.
Harold T. Avery.
BY Lyon & Lyon
ATTORNEYS March 7, 1944.  H. T. AVERY  2,343,273
CALCULATING MACHINE
Filed July 20, 1938  35 Sheets-Sheet 22
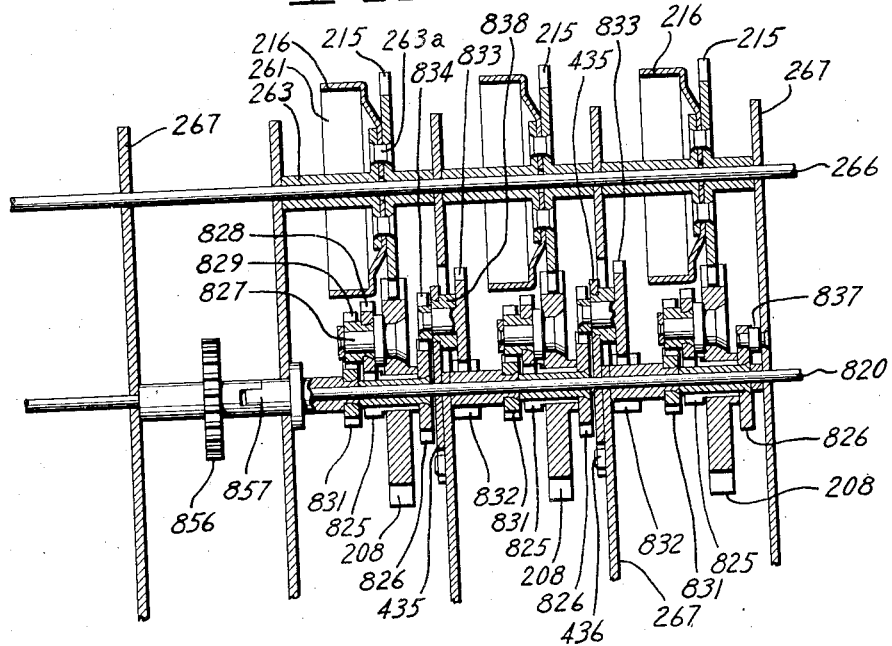
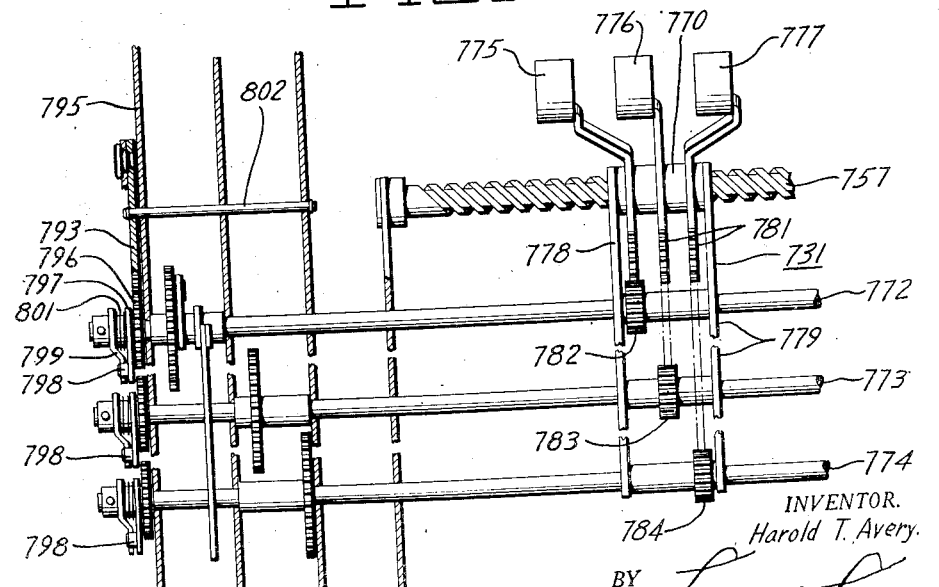
INVENTOR.
Harold T. Avery.
BY
ATTORNEYS

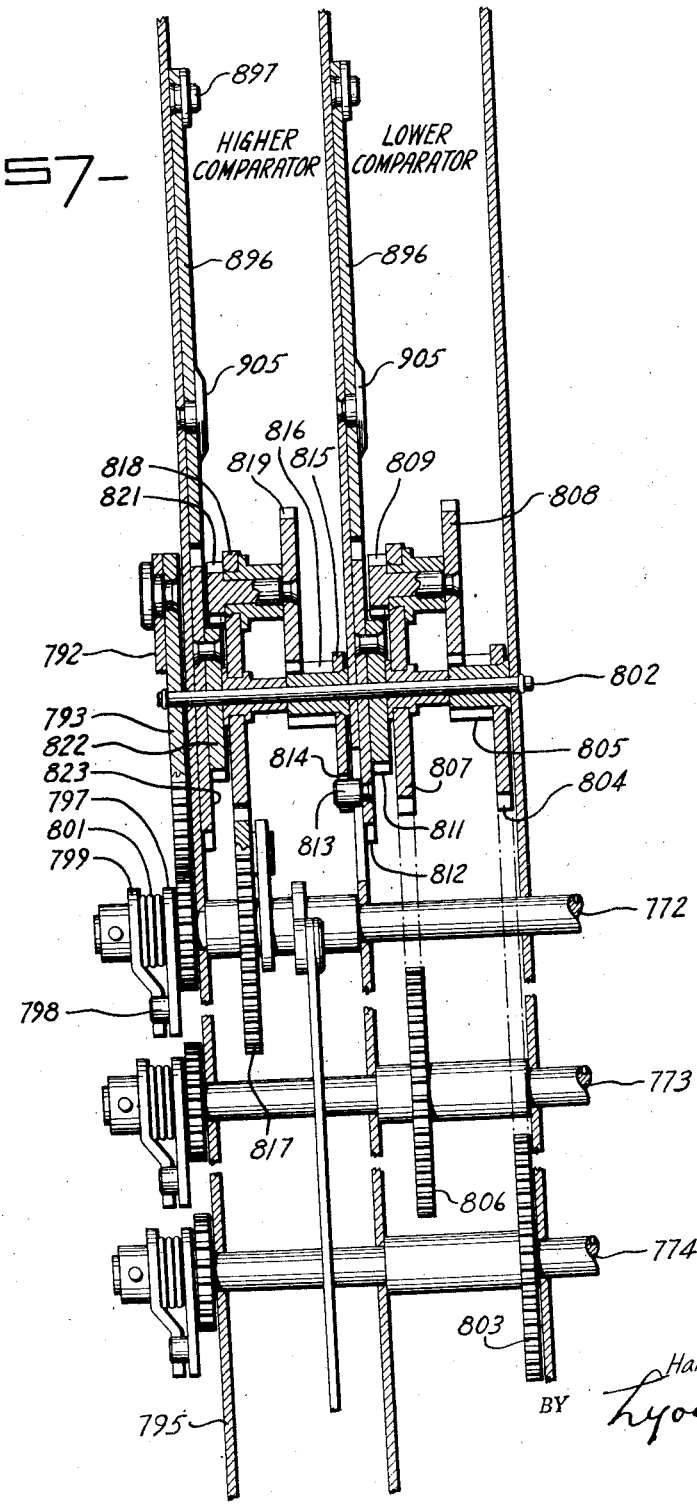

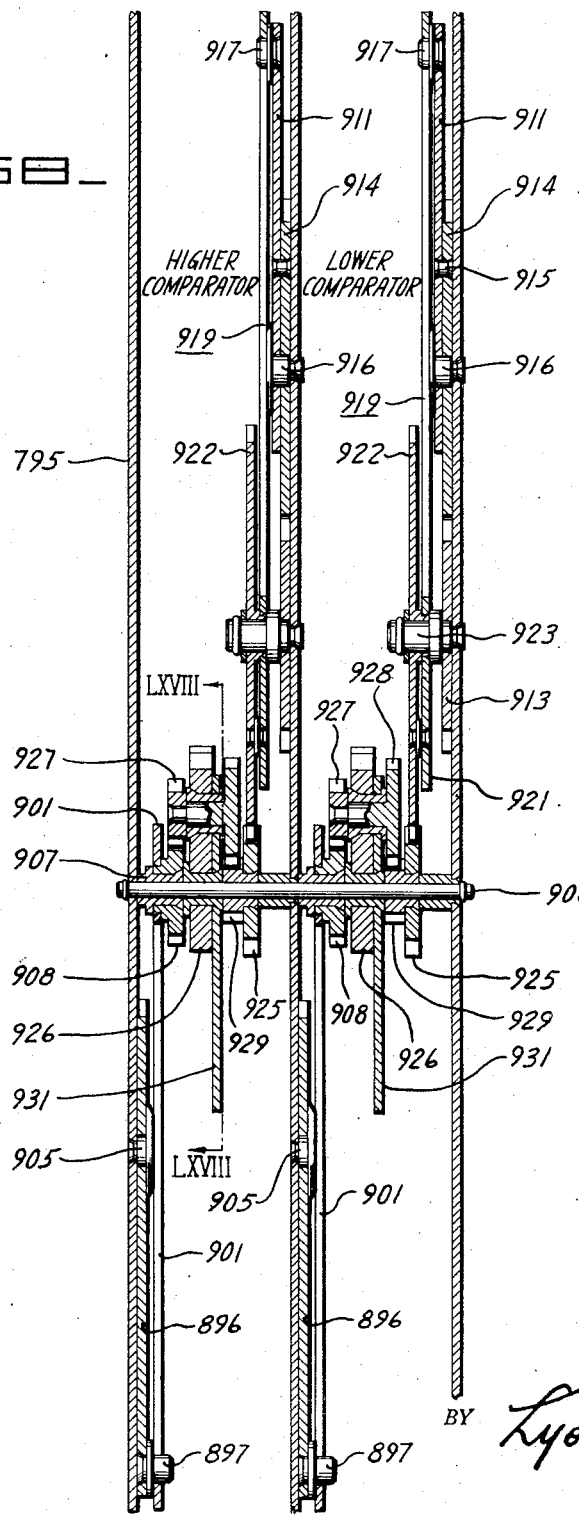

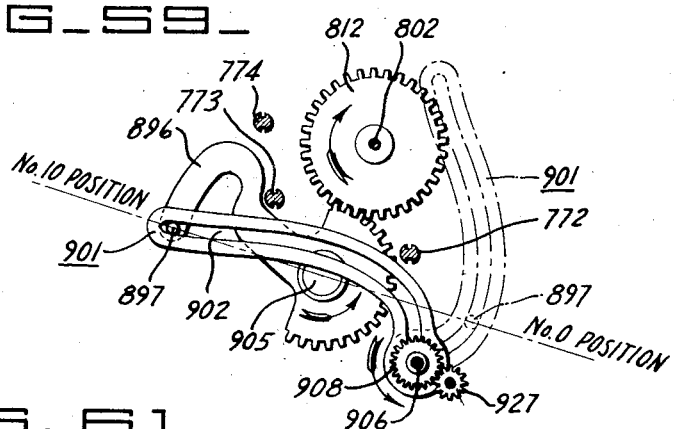
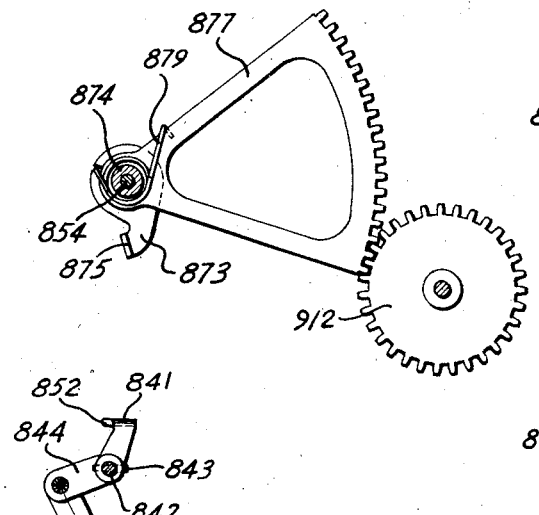
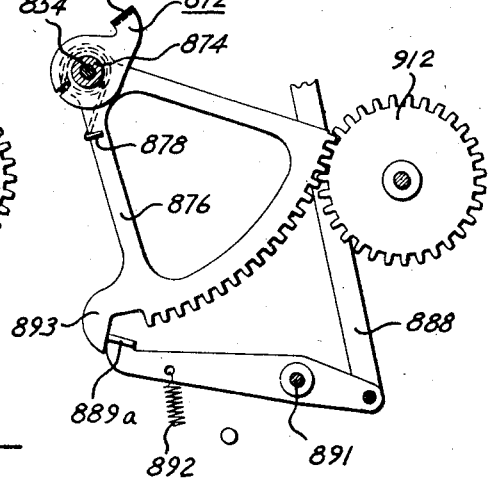
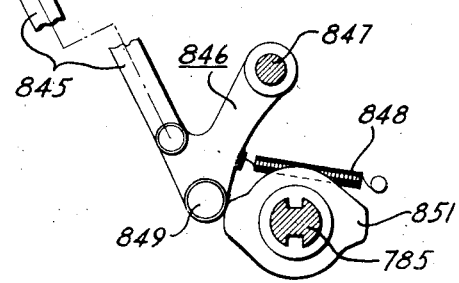

March 7, 1944.  H. T. AVERY  2,343,273
CALCULATING MACHINE
Filed July 20, 1938   35 Sheets-Sheet 26
FIG_63_
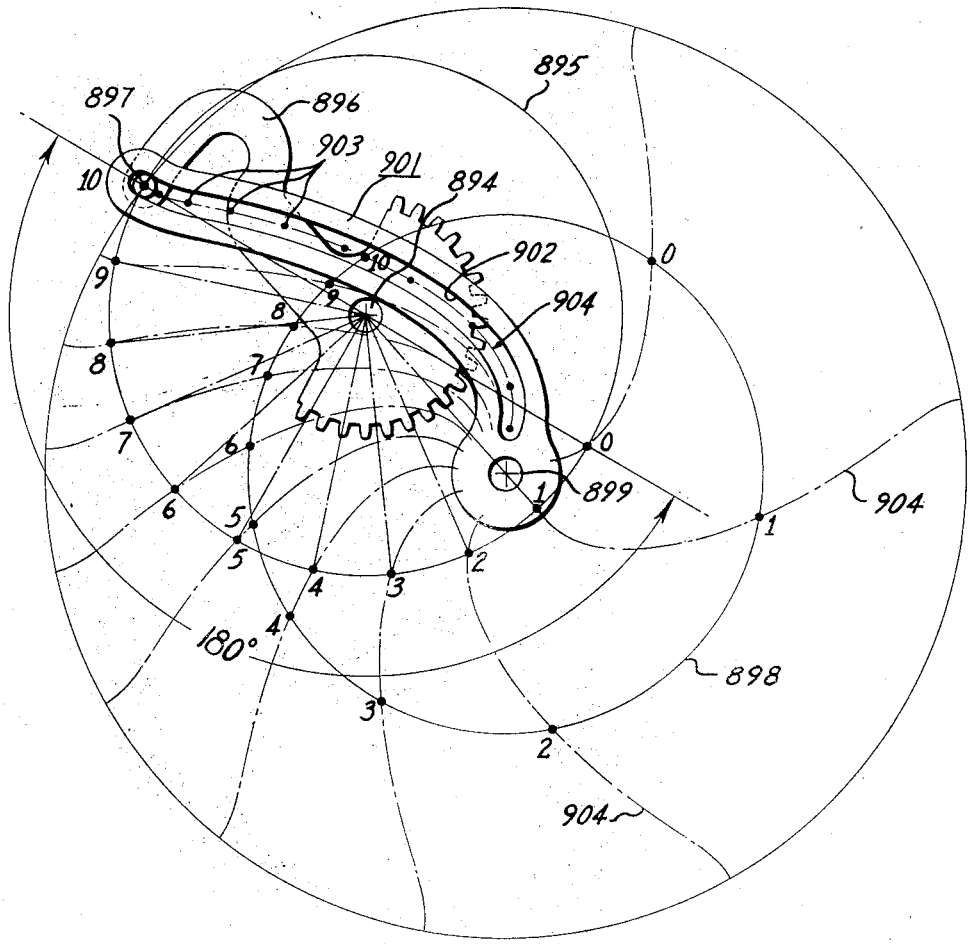
INVENTOR.
Harold T. Avery.
BY Lyon & Lyon
ATTORNEYS

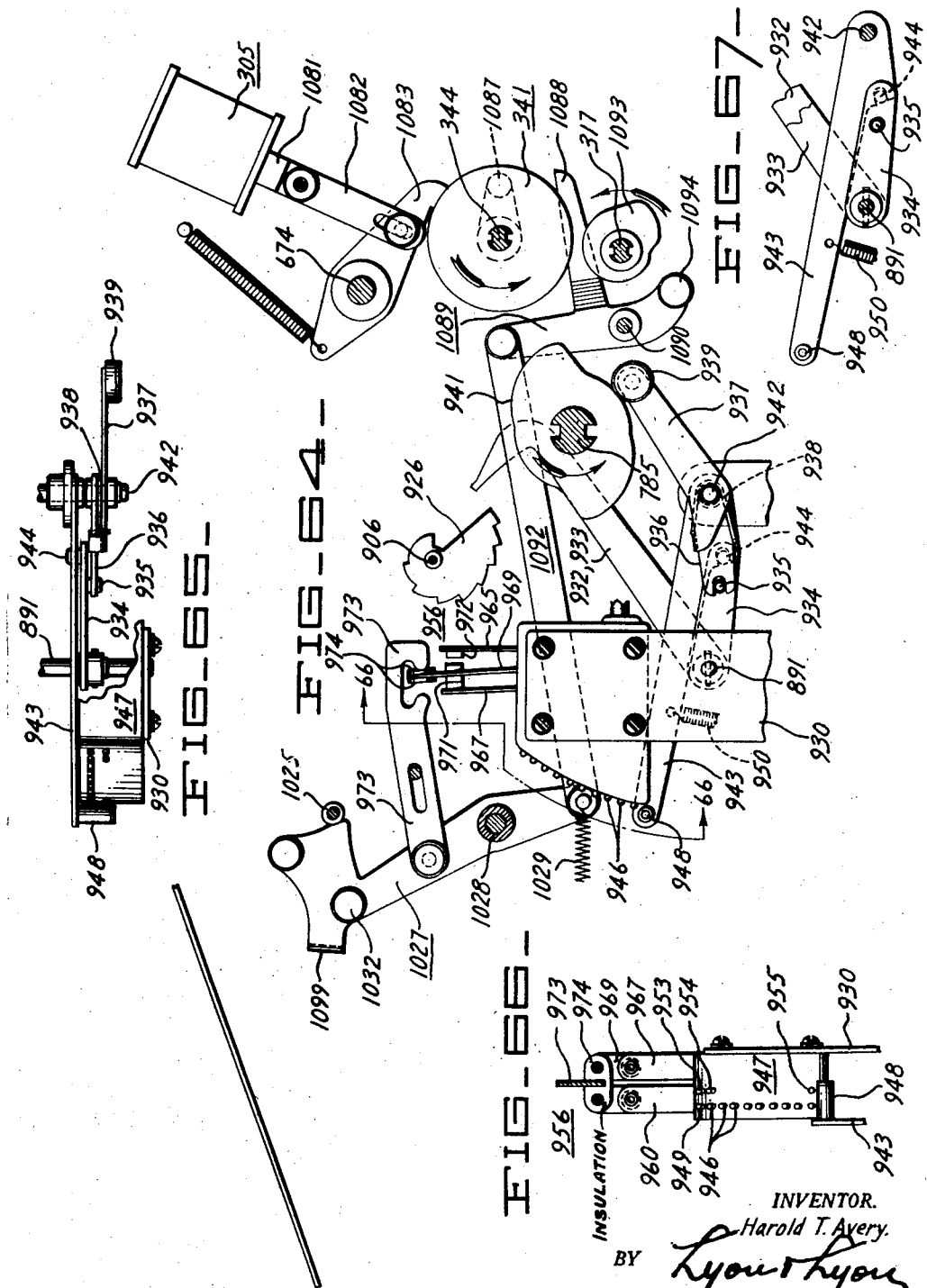

March 7, 1944.  H. T. AVERY  2,343,273
CALCULATING MACHINE
Filed July 20, 1938  35 Sheets-Sheet 28
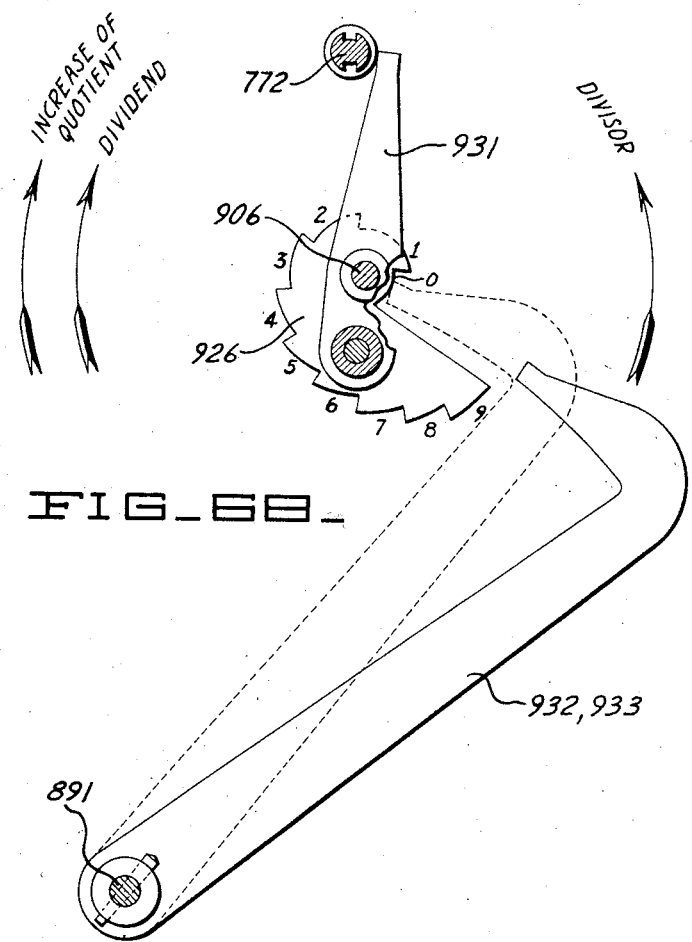
FIG_68_
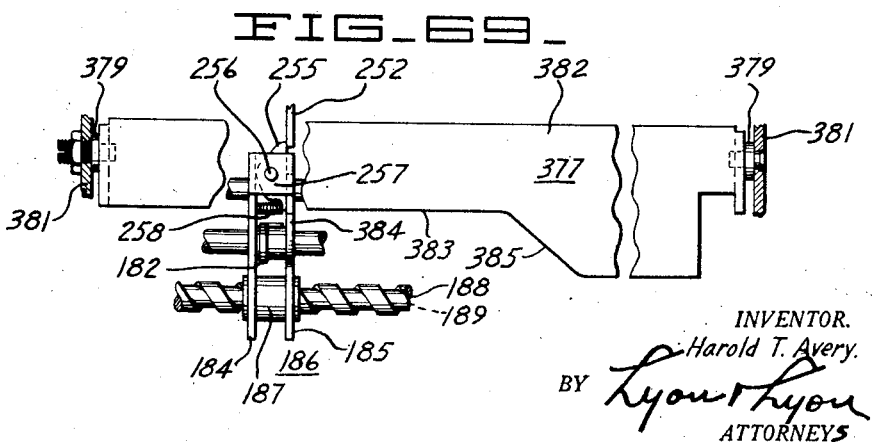
FIG_69_
INVENTOR.
Harold T. Avery.
BY Lyon & Lyon
ATTORNEYS

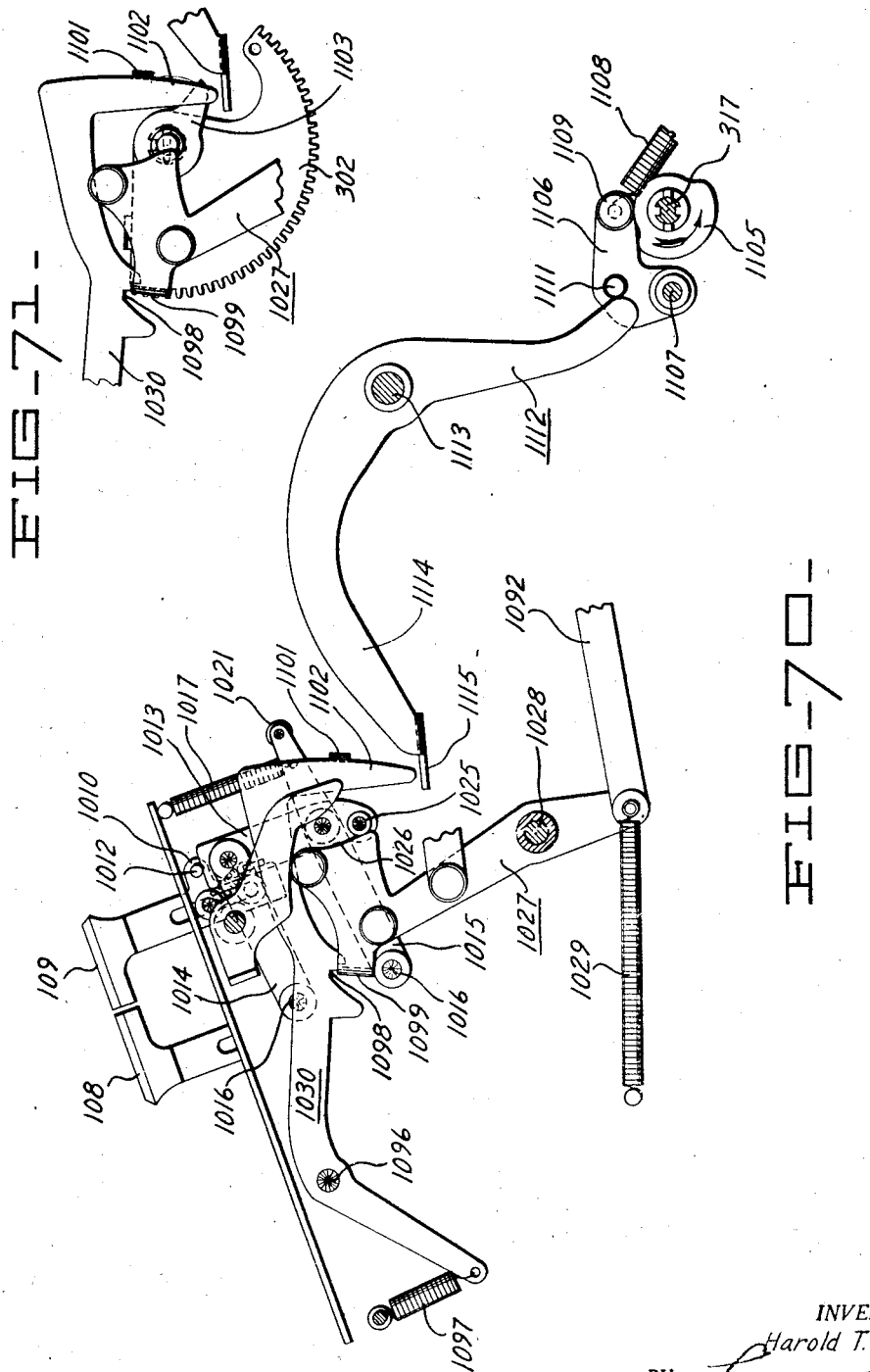

March 7, 1944.　　　　H. T. AVERY　　　　2,343,273
CALCULATING MACHINE
Filed July 20, 1938　　　　35 Sheets-Sheet 30
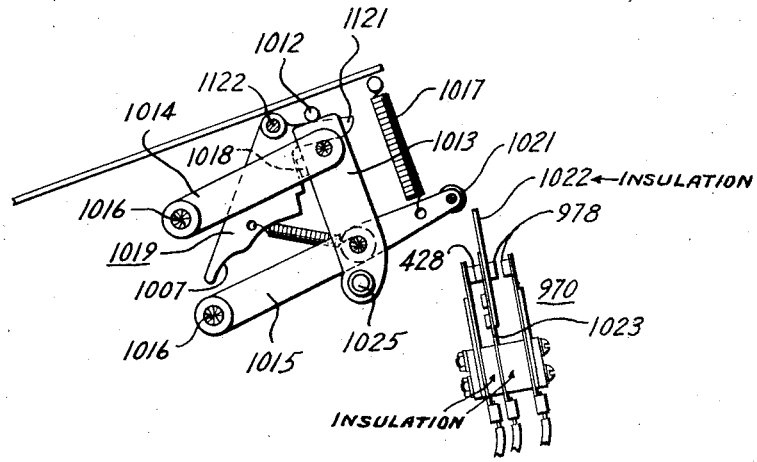
FIG_72_
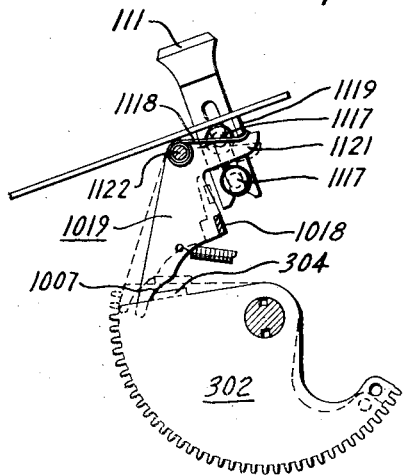
FIG_73_
INVENTOR.
Harold T. Avery.
BY
ATTORNEYS.

March 7, 1944.   H. T. AVERY   2,343,273
CALCULATING MACHINE
Filed July 20, 1938   35 Sheets-Sheet 31
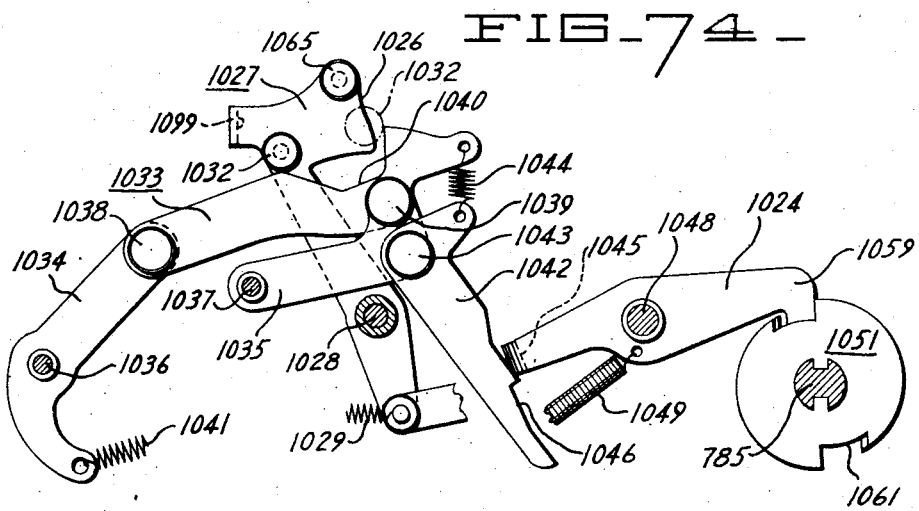
FIG-74-
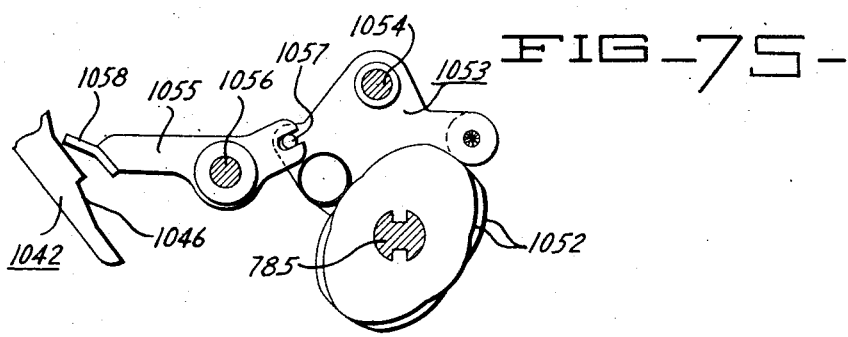
FIG-75-
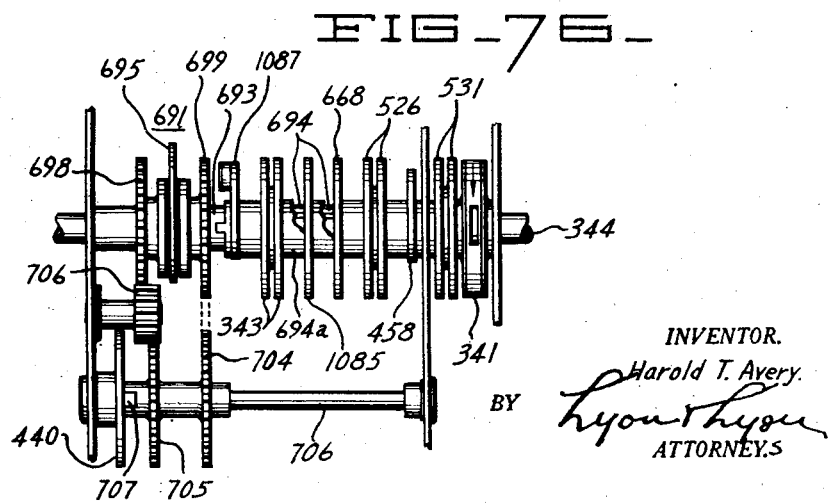
FIG-76-
INVENTOR.
Harold T. Avery.
BY Lyon & Lyon
ATTORNEYS

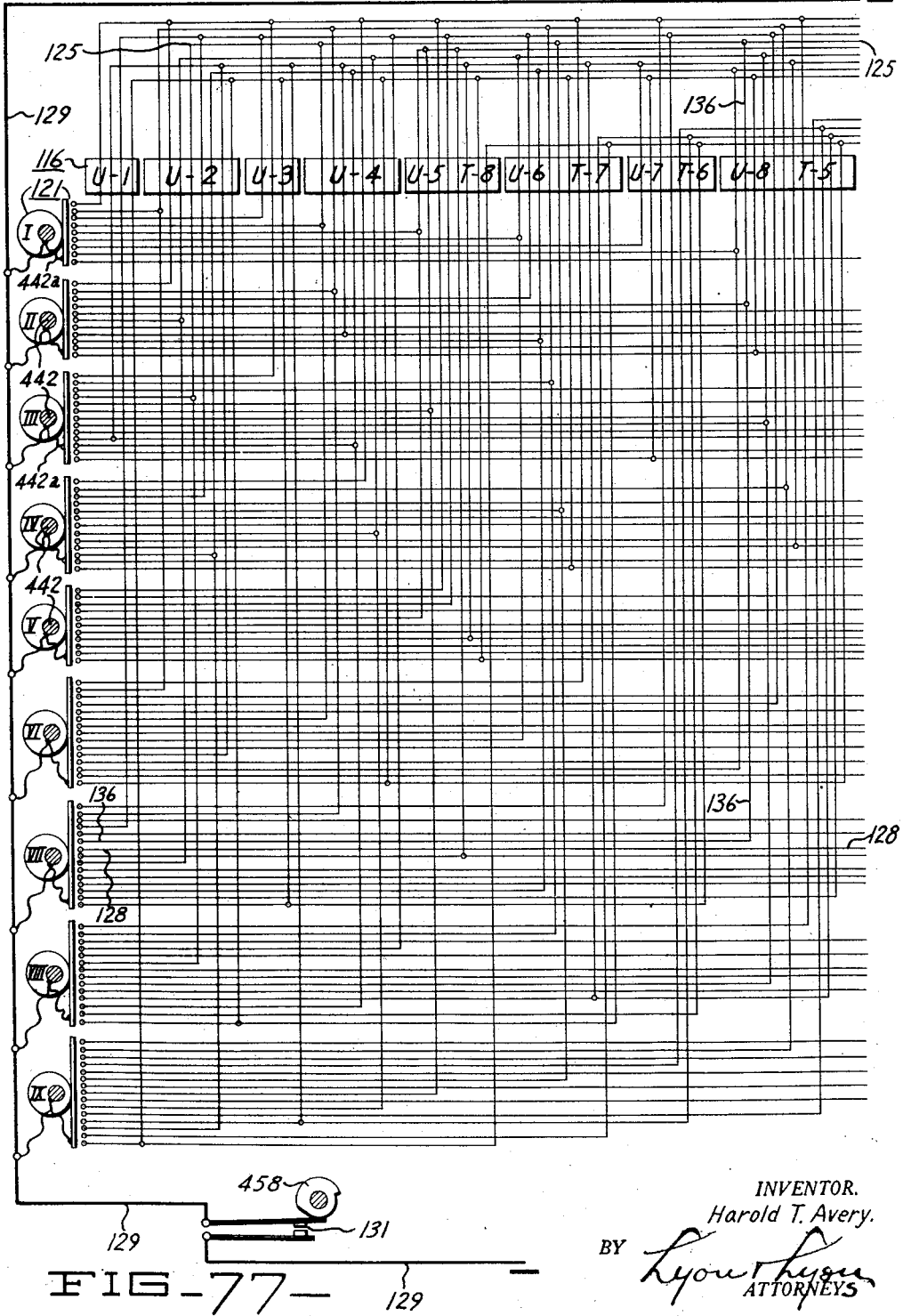

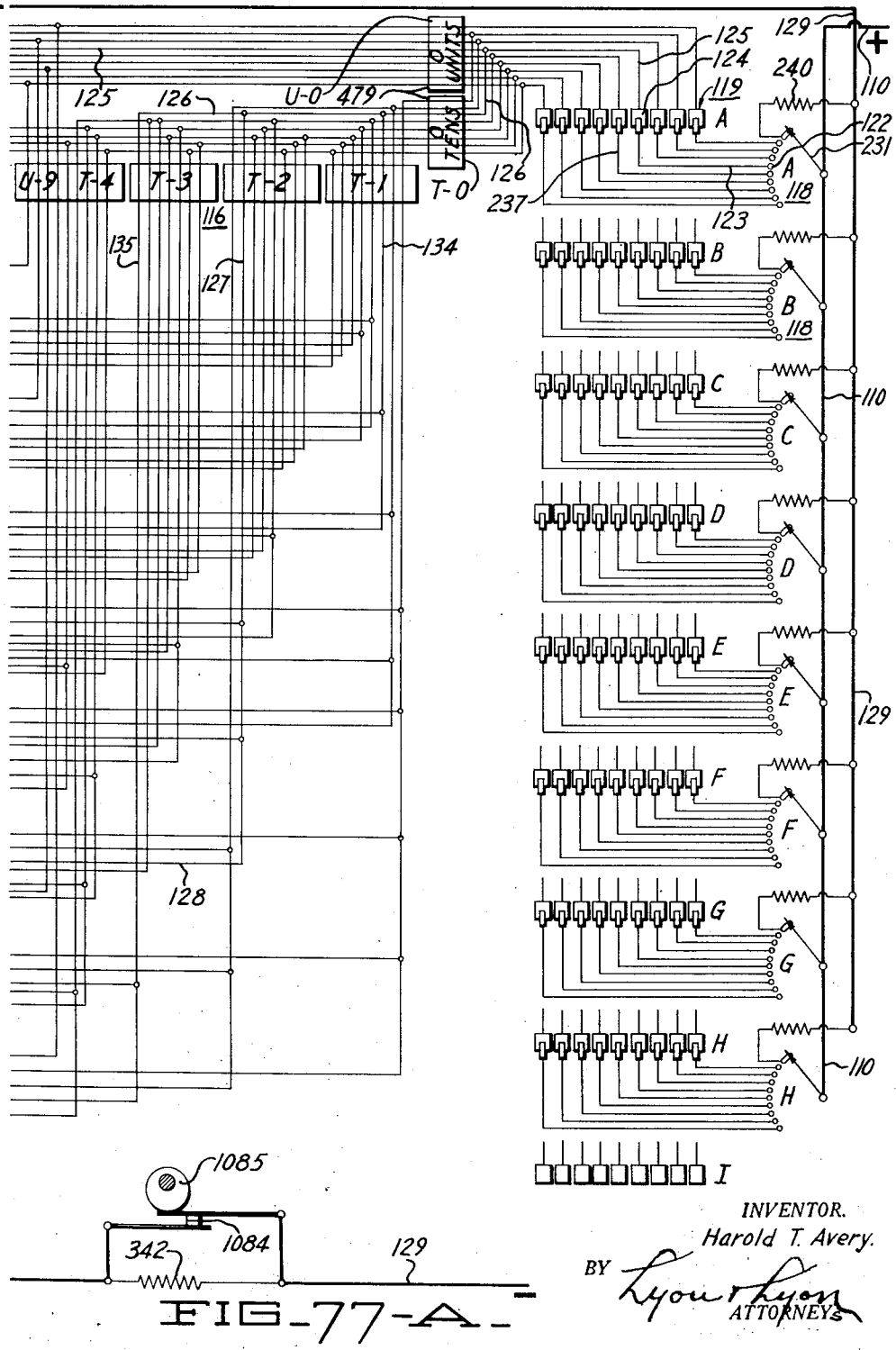
FIG_77_A_

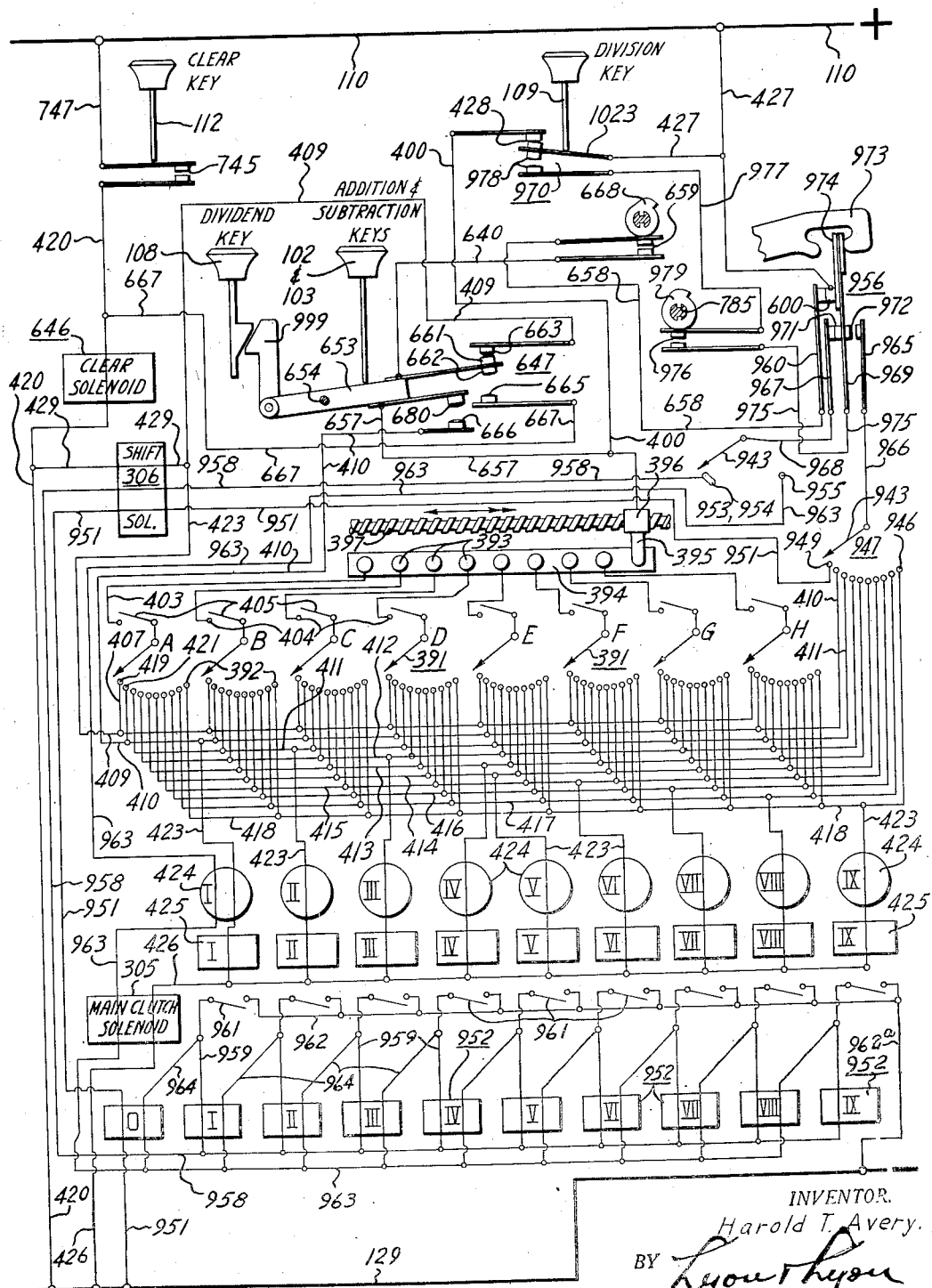
FIG_77_B_

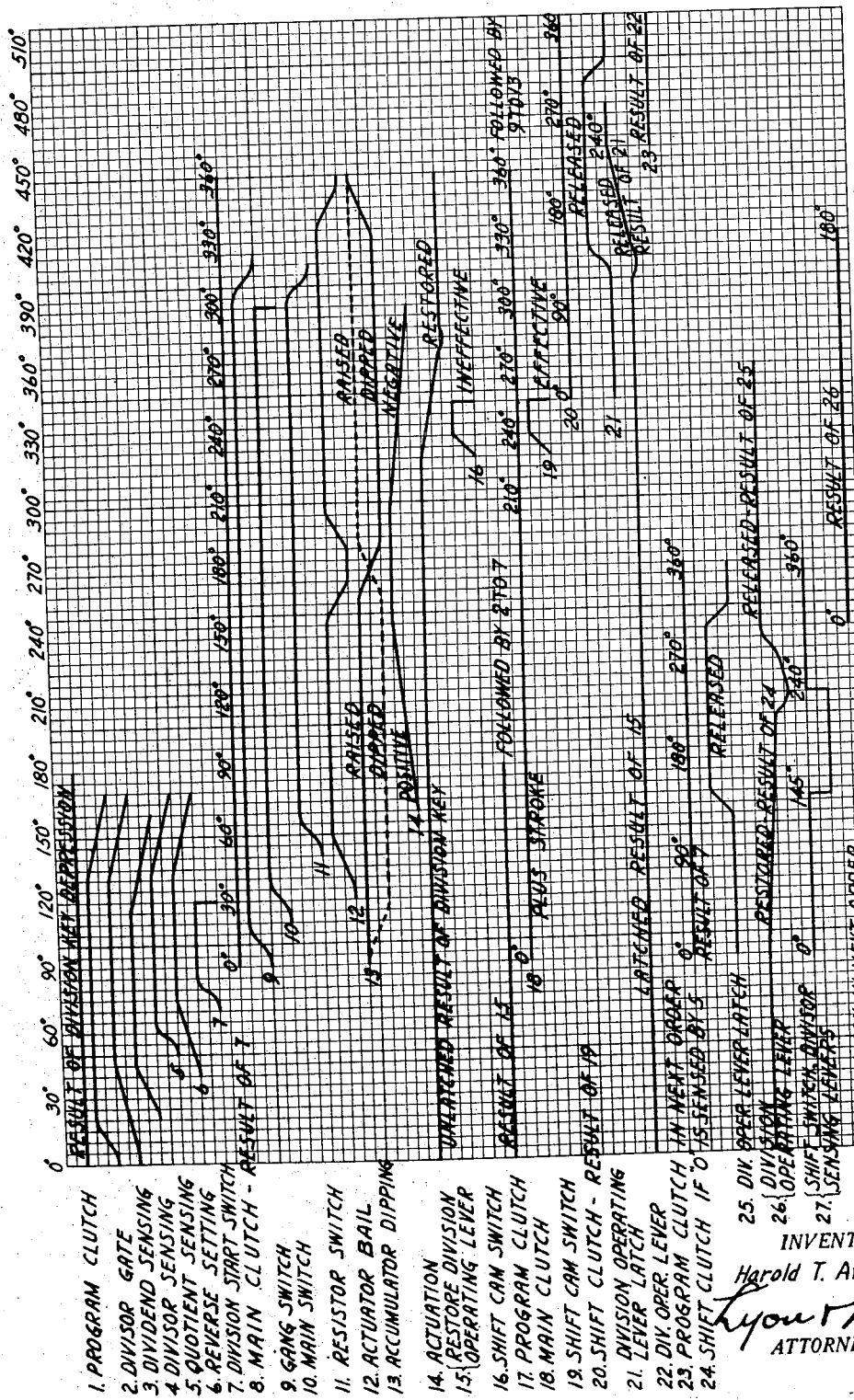

Patented Mar. 7, 1944

2,343,273

UNITED STATES PATENT OFFICE 2,343,273

CALCULATING MACHINE

Harold T. Avery, Oakland, Calif., assignor to Marchant Calculating Machine Company, a corporation of California Application July 20, 1938, Serial No. 220,260

38 Claims. (Cl. 235—61)

This invention relates to calculating machines for automatically solving problems in multiplication, addition, subtraction and division, and has to do more particularly with machines of the type adapted to determine partial products, i. e., the products resulting from the separate multiplication of each digit of a multiplicand by each digit of a multiplier.

A broad object of the invention is to provide a reliable and practicable calculating machine capable of performing multiplication and division operations rapidly and with relatively few mechanical movements.

Some of the important, more specific objects of the invention are:

1. To simplify and render more compact the construction of electrical partial product selection mechanisms;

1a. To provide a partial products device capable of simultaneously registering both the tens digit and units digit of any partial product, in which some of the elements related to units digits and tens digits, respectively, of partial products are common to each other, whereby the total number of such elements required is less than the number of all the tens and units digits required to represent all possible partial products;

2. To mechanically store all factor digits as they are set up in the machine in condition to subsequently control partial product circuits;

2a. To mechanically store all multiplier digits as they are successively set up in the machine and cause the machine to begin operation to determine the partial products of multiplicand digits previously set up and each successive multiplier digit, immediately following set up of the first multiplier digit;

3. To provide a machine employing stationary factor set-up and selection switch mechanisms, one for each factor dial in the machine, in which all of the mechanisms may be actuated from a single 10-key keyboard, the machine selecting the set-up mechanisms in appropriate orders of the factor registers and associating them with appropriate orders of an accumulator register, whereby each factor digit will control the proper order of the accumulator register;

4. To provide for the selective registration of partial products in appropriate orders of an accumulator register by electrical switching, and thereby eliminate the usual shiftable accumulator register carriage;

5. To provide an electrical selection multiplying mechanism of the partial products type, with separate selector switches for storing different digits of a multidigit multiplier and then succsssively switching the selector switches into operative relation with different partial products circuits to register successive series of partial products in successive orders of the accumulator register;

6. To provide a partial products type calculating machine having an accumulator register, a multiplicand factor register, a multiplier factor register, and a single 10-key keyboard that will automatically, in response to a single initial operation, transfer a number to be added or subtracted, or a dividend, from a factor register to the accumulator register, and condition the machine for the further addition, subtraction or division operations, as the case may be;

7. To provide a dividing machine that functions directly to determine each quotient digit in a single cycle of operations, as distinguished from machines employing multiple subtraction, or "cut-and-try" systems;

8. To provide, a dividing machine that functions to directly determine each digit of the quotient, multiply the divisor by each quotient digit as it is determined, and subtract the product out of the dividend as in ordinary "long division" procedure;

9. To provide an electrical dividing machine that directly estimates each quotient digit, subtracts the product of the divisor and the estimated quotient digit from the dividend, checks the remainder, corrects the quotient digit and remainder if the estimated digit was not correct, and registers the correct quotient digit;

10. To provide a dividing machine in which each quotient digit is directly determined in accordance with slide-rule principles by sensing at least the approximate values of the dividend and divisor, producing movements proportional to the logarithms of the dividend and divisor values sensed; producing a third movement proportional to the difference between the first two movements and indicative of the value of the logarithm of the quotient, and producing an indication of the quotient value therefrom;

11. To provide a machine of the type referred to in the preceding paragraph, in which successively lower orders of the dividend are automatically sensed to determine the successive quotient digits in successive division cycles (the expression "division cycles" having the same meaning as in ordinary long division computation), and in which each succcessive quotient digit is exactly multiplied by the divisor and automatically exactly subtracted from successively lower orders of the dividend in successive division cycles;

12. To provide in a machine of the type referred to in the two preceding paragraphs, a simple and practicable mechanism operating to correctly sense each quotient digit and register it in the proper quotient order and subtract the product of the quotient digit and divisor from the proper dividend orders, irrespective of the relative values of the first dividend and divisor digits;

13. To provide, in a calculating machine having factor registers, factor selection switches, an accumulator register, and mechanism and circuits for introducing numbers into the accumulator register which are predetermined functions of the numbers set up in the factor registers; a simple and effective clear mechanism for restoring all parts of the machine, except the accumulator register, to normal condition.

Various other and minor objects and features of the invention will become apparent from the detailed description of a particular embodiment of the invention with reference to the drawings, which follow.

In the drawings:

Fig. 2 is a longitudinal section through the machine showing a typical multiplicand order, the key controlled and shiftable set-up carriage therefor, and the parts associated therewith including the solenoid mechanism and the shift switch, and also showing the accumulator and the actuator therefor;

Figs. 3 and 4 are details showing right side elevations of portions of the factor setting mechanism;

Fig. 5 is a side elevation, as viewed from the right, of the differentially settable multiplicand selection mechanism including the latching and releasing means therefor;

Fig. 6 is a side elevation, as viewed from the left, of a typical multiplicand selection switch, such as is employed in the present invention;

Fig. 7 is a side elevation, as viewed from the left, of a differentially settable multiplicand selection mechanism, as shown in Fig. 5, and limiting stop unit cooperating therewith;

Fig. 8 is a view similar to that shown in Fig. 6, with the contact lever removed in order to illustrate to better advantage the contact carrying block included in each multiplicand selection switch;

Fig. 9 is a section taken on the line IX—IX of Fig. 8;

Figure 1:
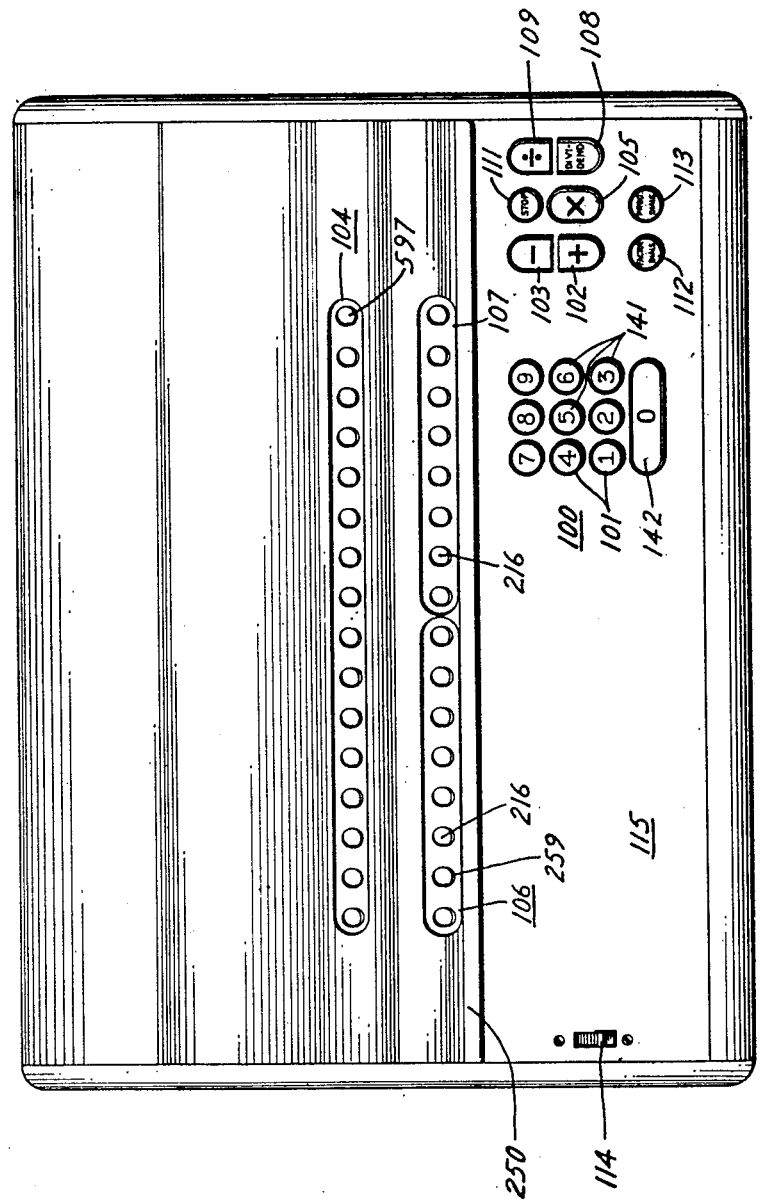
Fig. 1 is an exterior plan view of the machine showing the keyboard, the registering mechanism and the calculation control devices.

Figs. 10 to 13, inclusive, are details, in perspective, of the shift switch employed in the machine;

Fig. 14 is an exterior view of the shift switch, as viewed from the rear end of the machine, with a portion of the housing broken away;

Fig. 15 is a cross-sectional view of the shift switch taken on the line XV—XV of Fig. 14;

Fig. 16 is a detail view partly in section of the stationary shift switch element supporting frame, as viewed from the right;

Fig. 16a is a diagrammatic representation of the shift switch operation;

Fig. 17 is a right side longitudinal sectional view illustrating the shiftable set-up carriage, the shift switch drive mechanism, the spring advancing means, as well as the power restoring means therefor, and the power clearance of the factor set up;

Fig. 18 is a transverse fragmentary sectional view through the machine, as viewed from the front of the machine, showing certain portions of the selection mechanism, and, particularly, the check dial setting means;

Fig. 19 is a fragmentary view, including the three leftmost check dials shown in Fig. 18, and the locking means therefor;

Fig. 20 is a developed plan view of a typical check dial illustrating the sequential order of the digits delineated thereon;

Fig. 21 is a lateral sectional view of a typical solenoid controlled actuator unit, such as is employed in the present invention;

Fig. 22 is a sectional view taken on the line XXII—XXII of Fig. 21, as viewed from the right side of the machine;

Fig. 23 is a right side detail view showing the power reciprocating means for the actuator shaft in mid-cycle position;

Fig. 24 illustrates the power dipping and raising controls for the registering mechanism, as viewed from the right side of the machine;

Fig. 25 is a similar detail sectional view of the actuator lock gate and the control therefor;

Fig. 26 is a right side detail view of the shift clutch solenoid switch and means for operating the same;

Figs. 27, 28, 29 and 30 are sectional views of the accumulator mechanism and the frame supports therefor, as viewed from the right side of the machine;

Fig. 28A is a longitudinal sectional view of a portion of the machine, showing the accumulator clear key and the mechanism controlled thereby, as viewed from the right side of the machine;

Fig. 31 is an enlarged detail front view of the two decimal orders in the registering mechanism, one order being shown in section;

Fig. 32 is a longitudinal sectional view, as viewed from the right side of a typical multiplier order and the displaceable contact switch associated therewith;

Fig. 33 is a similar longitudinal sectional view of a portion of the machine comprising the multiplication key and the mechanism controlled thereby, this view also showing the quotient setup solenoids;

Fig. 34 is a detail view of certain parts of the selection mechanism associated with the multiplication key, as shown in Fig. 33;

Fig. 35 is a right side, longitudinal sectional view of the multiplier setup mechanism including the multiplier setup switch, the multiplier solenoids, and the gang switches controlled thereby upon main clutch operation;

Fig. 36 is a sectional view taken substantially on the line XXXVI—XXXVI of Fig. 35, illustrating the manner in which the gang switches are mounted and their relative position with respect to the banks of partial product solenoids controlled thereby;

Fig. 37 is a sectional view taken on the line XXXVII—XXXVII of Fig. 36, illustrating a typical fixed switch element such as employed in each of the multiplier gang switches;

Fig. 38 is a sectional view taken on the line XXXVIII—XXXVIII of Fig. 36, illustrating a rotatable gang switch element;

Fig. 39 is a longitudinal section through a typical solenoid used in connection with the selection mechanism;

Fig. 40 is a right side detail view of the addition and subtraction keys and the mechanism positioned thereby for control of the reverse mechanism;

Fig. 41 is a similar view of the addition and subtraction keys and the mechanism positioned thereby for initiating main clutch operation and clear clutch operation seriatim;

Fig. 42 is a detail view of the switch release mechanism used in connection with the operation of the addition and subtraction keys, as shown in Fig. 41 of the drawings;

Fig. 43 is a longitudinal section, as viewed from the right side of the machine, illustrating the mechanism for reversing the register dipping mechanism to effect calculations in a negative sense;

Fig. 44 is a transverse section through the reverse clutch taken substantially on the line XLIV—XLIV of Fig. 43;

Figs. 45 and 46 are detail views of certain parts comprising the reverse clutch as illustrated in Figs. 43 and 44;

Fig. 47 is a right side detail view of the dividend and division keys, and the parts which, upon depression of the dividend key, function to escape the setup carriage through the unset multiplicand orders and which upon release of said key effect a unitary main clutch operation to transfer the dividend into the register mechanism;

Fig. 48 is a fragmentary detail view of certain parts illustrated in Fig. 47;

Fig. 49 is a right side view of the clear key and parts associated therewith;

Fig. 50 is a detail view in side elevation, as viewed from the right side of the machine, of the lateral shifting means for the multiplier control switch and the dividend sensing mechanism;

Fig. 51 is a similar view of the power release and restore mechanism for both the dividend sensing and the divisor sensing mechanism;

Fig. 52 is a nomographic chart illustrating the logarithmic relations existing between the principal component parts of the mechanism for direct estimation of the quotient;

Fig. 53 is a detailed illustration, as viewed from the right side of the machine, of the mechanism employed in the machine during division for transferring the sensed dividend and the divisor digits through logarithmic converters into comparators, to determine the quotient digit;

Fig. 54 is a detail view of one of the logarithmic converters for the divisor, shown in its two extreme positions;

Fig. 55 is a sectional view, as seen from the front, of the three leftmost check dials and the planetary mechanism associated therewith for effecting a transmission of fractional decimal values to the highest order sensed;

Fig. 56 is a developed plan view of the dividend sensing mechanism and the shifting means therefor;

Fig. 57 is a developed front sectional view, taken on the left side of the machine, of the two orders of the dividend mechanism for combining the separate dividend digits sensed into movement indicative of the multidigit numbers sensed;

Fig. 58 is a similar view illustrating the mechanism whereby the combined dividend sensings and the combined divisor sensings are logarithmically converted and subtracted to give an accurate indication of the quotient digit to be sensed;

Fig. 59 is a right side view of one of the two dividend converters shown in its two extreme positions;

Figs. 60 and 61 are details of certain parts of the divisor sensing mechanism shown in Figs. 18 and 53;

Fig. 62 is a right side view of the power operated gate for locking of the three leftmost check dials illustrated in Figs. 18, 19 and 55, against rotation during the divisor sensing period;

Fig. 63 is a right side elevation of one of the dividend sensing converters illustrating the function of converting from direct to logarithmic movement;

Fig. 64 is a right side longitudinal sectional view of the quotient sensing mechanism including the quotient selector switch, the overstroke sensing switch and certain of the division controls associated therewith;

Fig. 65 is a fragmentary plan view of the quotient selector switch with a portion thereof broken away to better illustrate some of the pertinent features relating to the quotient sensing mechanism;

Fig. 66 is a front elevation of the quotient selector switch shown in Figs. 64 and 65;

Fig. 67 is a fragmentary detail of certain of the operating parts concerned with the quotient sensing mechanism;

Fig. 68 is an enlarged sectional view taken on line LXVIII—LXVIII of Fig. 58, showing one of the quotient cams and the sensing lever related thereto, the latter being shown in both of its extreme positions;

Fig. 69 is a front elevation of the shiftable setup carriage, the shifting means therefor, and the bail rocked by said carriage when the latter is shifted into the first multiplier order;

Fig. 70 is a right side elevation of some of the division control mechanism including the dividend and division keys;

Fig. 71 is a fragmentary right side view of the mechanism which retains the division operating lever in its leftmost and inoperative location during certain portions of the division cycle;

Fig. 72 is a detail view of the lower section of the division key, of the switch operated thereby, and of certain other mechanism associated therewith;

Fig. 73 is a detail view of the division stop key and the release mechanism for the division key latch;

Figs. 74 and 75 are right side elevations of the mechanism for controlling the program clutch operation;

Fig. 76 is a developed front view of the main clutch and the reverse mechanism shown in Fig. 24, and of the various cams rotated thereby;

Figs. 77, 77A and 77B, when joined side by side in the order mentioned, provide a complete circuit diagram illustrating the tabular electrical circuits for controlling the solenoid operated actuator stops and the various other circuits necessary in the operation of the machine;

Fig. 78 is a chart illustrating graphically the different operating cycles of the machine and the timing thereof in their sequential order during division.

GENERAL DESCRIPTION

Referring to Fig. 1, the machine disclosed therein employs a single ten-key keyboard 100 generally similar to that used in a number of well-known adding machines, by means of which all factors employed in the machine are set up. The keyboard 100 cooperates with a set-up mechanism disposed beneath the top plate 115. In the particular embodiment herein disclosed the set-up mechanism comprises sixteen sections. The eight leftmost sections of the set-up mechanism are used in initially setting up and displaying in a "multiplicand" register 106 all numbers to be added or subtracted, the multiplicand when multiplying, and both the dividend and the divisor when dividing. The eight rightmost sections of the set-up mechanism are exclusively used to perform the same function for the multiplier, in multiplying, and the quotient in dividing, these numbers appearing in a "multiplier" register 107.

Positioned above the multiplicand register 106 and the multiplier register 107 is an accumulator register 104 in which the product is registered at the completion of a multiplying operation, the sum is registered at the completion of an adding operation, the difference is registered at the completion of a subtraction operation, and the remainder is registered at the completion of a division operation.

Disposed in close proximity and to the right of the keyboard 100, are the various calculation control keys, including an addition key 102, a subtraction key 103, a multiplication key 105, a stop key 111, a division key 109, a dividend key 108, a factor dial clear key 112, and an accumulator dial clear key 113. For convenience, the addition key, subtraction key, multiplication key and division key are designated by the usual mathematical symbols. In view of the lack of space, the factor dial clear key is merely marked "Factor dials" and the accumulator dial clear key is merely marked "Prod. dials."

The entire mechanism and its operation in various types of calculations will be described in detail later, but to facilitate grasping the full significance of the detailed operations as they are described, the general operation of the machine in multiplying, adding, subtracting and dividing will now be outlined.

The machine of the present invention is primarily a multiplying machine, the operation of which can be modified to effect addition, subtraction and division. In multiplying, the various keys in the keyboard 100 are successively struck in accordance with the value and the order from left to right of the different digits in the multiplicand. This actuates a traveling set-up carriage associated with the sixteen-section set-up mechanism previously mentioned to actuate as many sections of the set-up mechanism as there are digits in the multiplicand, displaying the multiplicand in the leftmost dials of the multiplicand register 106. The set-up mechanism associated with each dial incorporates a selector switch which is set in accordance with the digit displayed in the dial. After setting up the multiplicand in the manner described, the operator depresses the multiplication key 105 which escapes the traveling set-up carriage through unset orders of the multiplicand set-up mechanism and into the first order of the multiplier set-up mechanism associated with the multiplier register 107. The multiplier is then set up in the multiplier-set mechanisms by successively striking the keys in the keyboard 100 according to the value and order of the digits in the multiplier, from left to right. As soon as the first (leftmost) multiplier digit is registered, the partial products circuits and mechanism immediately start functioning to multiply the entire multiplicant by this digit and successively thereafter by all further digits of the multiplier that may have been set up in the meantime, and to automatically add the partial products to give the complete product, which is indicated in the accumulator register 104.

At the completion of the problem the multiplicand is still displayed in the register 106 and the multiplier is displayed in the register 107. The depressing of the clearance key 112 will then restore the entire system with the exception of the accumulator register to normal, thereby permitting new numbers to be added to, subtracted from, or divided into, the product already displayed in the register 104. When desired, the register 104 may be cleared by depressing the product dial clear key 113.

In "addition," successive numbers to be added are successively entered into the multiplicand register 106 and then transferred into the accumulator register 104, each number after the first being added to the preceding number in the accumulator register so that the accumulator register always shows the sum of the numbers entered. Obviously, numbers could be transferred into the accumulator register 104 from the multiplicand register 106 by depressing the multiplication key 105 and then depressing the "1" key in keyboard 100 which functions to multiply the number in the multiplicand register by one and set it up in the accumulator register, after which it would be necessary to use the clear key 112 to prepare the set-up register 106 to receive the next number to be added. This would, however, serve to enter the numbers with their first digits lined up instead of in the proper decimal relationship for adding, and therefore to simplify the operation and also to provide for the automatic registration of successive numbers to be added in the proper orders of the accumulator register, the operation of transferring each number from register 106 to register 104 is produced by depressing the addition key 102. Depression of this key not only multiplies the number in the multiplicand register by 1 and transfers it into the accumulator register 104 in the proper denominational orders, but also automatically institutes a clear operation to clear the multiplicand register and prepare it for the next number to be added.

In "subtraction," the minuend is set up in the multiplicand register 106 and transferred into the accumulator register 104 by depressing the addition key 102 exactly as in addition. The subtrahend is then set up in the multiplicand register 106 after which the key 103 is struck. This institutes a negative transfer of the number in the multiplicand register into the accumulator register so that the subtrahend is subtracted from the minuend and the difference is displayed in the accumulator register.

Depression of the subtraction key 103 automatically clears the multiplicand register 106 exactly as in addition.

In division, the dividend is first set up in the multiplicand register 106 the same as the multiplicand is set up in the subtraction, and then the dividend key 108 is struck. This automatically causes the transfer of the dividend into the accumulator register and clears the set-up mechanism and the multiplicand dials.

The divisor is next set up in the multiplicand register 106 by depressing the proper keys in the keyboard 100 and then the division key 109 is depressed, which initiates the division operation. Division is carried out by a process of comparing the divisor in register 106 with the dividend in register 104 to pre-estimate the first digit of the quotient; subtracting the product of the divisor by this estimated quotient digit from the dividend; checking the remainder to see if the first quotient is correct, and, if not, correcting it. It may be noted at this point that the comparing mechanism is so designed that it will always estimate either the correct quotient digit or one too high. The correct first quotient digit is then registered in the leftmost dial of register 107 and the new dividend resulting from subtraction of the product of the divisor and the first quotient digit from the original dividend, is displayed in the register 104.

The machine will automatically shift the comparing mechanism into the next lower order of the dividend in the accumulator register 104 to estimate the second quotient digit and the process is repeated until the division has been carried to the last possible decimal order represented by the last dials of the registers 104 and 107.

However, the division operation may be terminated at any time desired by depressing the stop key 111.

A main switch 114 is provided on the left side of the machine in order to completely disconnect the main current supply from the various electrical circuits within the machine. The machine may be energized from any suitable source of power, such as the usual commercial lighting mains.

A suitable motor, not shown, is supplied to furnish torque to the various drive shafts within the machine. This motor may run continuously, but preferably is controlled by the various control keys in a manner old to the art, whereby the depression of any of said keys closes a switch between the electric supply line and the motor.

PARTIAL PRODUCTS CIRCUITS

In the embodiment of the invention herein disclosed, the selection or set-up mechanisms are divided into two groups controlled by a single set of factor keys 101.

The first group of selection mechanisms, which is disposed beneath the left portion of top plate 115 and in lateral alignment with register 106, constitutes the multiplicand selecting mechanism, while the second group of selection mechanisms, which is disposed substantially beneath the right portion of top plate 115 and in lateral alignment with register 107, constitutes the multiplier selection mechanism.

These two groups of selection mechanisms, which will be described hereinafter in detail, jointly control tabular devices in the form of electrical circuits acting through banks of solenoids which operate mechanical stops to properly limit the extent of actuation of the accumulator register 104 in each order in accordance with the units and tens digits of the partial products involved.

Fig. 22 shows a typical solenoid bank 116, and Fig. 21 two such banks, composed of solenoids labeled 0-units, 1-units, 1-tens, 2-tens, etc., which correspond to the units and tens digits of a product.

These solenoids are arranged in an arcuate manner about shaft 438 on which the actuating mechanism rotates. The general arrangement is fully described hereinafter, and at this time it will be sufficient to simply state that the extent of rotation of the actuating gears 506 and 515 in the various orders, which function to transmit the product into the accumulator register, is controlled by the retraction of the plungers of the 0-units and 0-tens solenoids and the ejection of plungers of the other solenoids. Each of the solenoids marked "units" represents the units digit of a partial product and has a plurality of "units" windings selectively energized for the various partial products containing that units digit, while each of the solenoids marked "tens" represents the tens digit of a partial product and has a plurality of "tens" windings selectively energized for the various partial products containing that tens digit. Each winding is included in a circuit adapted to be energized by closure of a switch representing a multiplicand digit and a gang switch representing a multiplier digit. The wiring diagram for a typical bank of solenoids is shown in Figs. 77, 77A and 77B in which are shown the multiplicand switches 118 and the multiplier gang switches 121.

For purposes of illustration, only one bank of solenoids 116 has been shown in Fig. 22, and only two such in Fig. 21, but it is understood that in a machine, such as presented in Fig. 1, there are fifteen banks of solenoids 116, each bank corresponding to a different decimal order of actuation, and each bank in turn being separately connected with a corresponding section in the shift switch 119. Thus in Fig. 77A the first section A of the multiplicand selection switches 118 is shown connected to the first solenoid bank 116, and the other seven multiplicand selection switches are connected to the second, third, fourth, fifth, sixth, seventh and eighth banks of solenoids, respectively (not shown), through the different sections of shift switch 119.

In order to reduce the number of solenoids in each bank to a minimum, but yet provide means to effect the simultaneous ejection of stops corresponding to the units and tens digits of each possible product of two digits, some of the solenoids in each bank carry both "units" and "tens" circuits as is shown in Fig. 22 and as will appear hereinafter.

However, it is important to note at this point that the plungers of the solenoids in each bank marked "Units" (Fig. 22) control the units actuator gears in one order of the accumulator register, and that the plungers of the solenoids in the same bank marked "Tens" control the tens actuator gears in the next higher order of the accumulator register. This will be explained more in detail later.

The arrangement of the circuits is such that upon the setting up of a digit in the multiplicand selection mechanism and of a digit in the multiplier selection mechanism, one of the solenoids in the bank will be energized corresponding in value to the units digit of the product of the two digits, and, if the product is a two-digit number, another solenoid of the same bank will be simultaneously energized, which corresponds in value to the tens order digit of said product.

As previously indicated, each of the solenoids is provided with a plurality of separate windings, mutually insulated from each other, and energization of any one of the separate windings will cause the plunger carrying the control pin to operate. In the case of the zero units solenoid (U0) and zero tens solenoid (T0), the control pin is normally ejected and is retracted upon energization of the solenoid, whereas in all the other solenoids the control pin is normally retracted and is ejected upon energization of the solenoid.

The construction of a typical solenoid such as 2 tens, 4 units, etc. (Fig. 22), used in making up the bank of partial product solenoids 116 may be seen in Fig. 39. Each of these solenoids consists of a central tubular member 461 within which is supported for limited sliding movement a magnetic plunger 463 secured to which is a nonmagnetic pin 462 which is normally maintained in the position shown by a coil spring 464 compressible between a shoulder 465 integral with said tubular member 461 and between a washer 466 affixed to the reduced end portion 467 of plunger 463. A transverse pin 468 secured in reduced portion 467 extends into two diametrically oppositely disposed slots 469 within the external sleeve 471, which is rigidly assembled to the rightmost end of tubular member 461 by shoulder 465 thereof. Sleeve 471 is provided with an annular groove 472 within which is disposed a spring ring 473 which serves to limit the sliding movement of pin 462 and consequently of magnetic plunger 463. A plug 475 of magnetic material is pressed into a recess within outer spacing ring 476. Wound upon the sleeve 461 between spacing rings 476 and 477, are a plurality of individually insulated windings 478; energization of any of these windings results in the ejection of the pin 462 against the action of spring 464.

To avoid confusion, where a plurality of sections of apparatus are associated with different decimal orders, the different sections are distinguished from each other by the alphabetical letters A, indicating the leftmost order, B, the next order to the right thereof, etc., whereas different sections of apparatus relating or functioning in response to the different digits from one to ten are distinguished from each other by Roman numerals I to X. Thus in Fig. 77, the nine gang switches 121 function in response to the different digits "1" to "9," respectively and are therefore identified by Roman numerals. On the other hand, the eight multiplicand selection switches 118 in Fig. 77A are associated with the eight decimal orders of the multiplicand register and are therefore identified by the letters A to H, inclusive. Similarly the eight multiplier selection switches 391 in Fig. 77B are associated with the eight decimal orders of the multiplier register and are identified by the letters A to H, inclusive. The fifteen solenoid banks 116 (only one of which is shown in Figs. 77 and 77A) are identified from left to right by the letters A to O, inclusive, and the second to sixteenth dials, inclusive, of the accumulator register, which are similarly associated with the fifteen solenoid banks, are identified from left to right by the letters A to O, inclusive (Fig. 16A).

As a specific example, the arrangement of the partial product circuits involved in the solution of the problem four times seven equals twenty-eight, will be followed out. Referring to Fig. 77A, the setting up of the number four multiplicand digit moves the brush 231 of the top multiplicand selection switch 118A from the zero contact plate, on which it is shown as resting in that figure, to the fourth contact plate below it designated as 122 in that figure. The remaining seven multiplicand selection switches 118, shown in Fig. 77A, are for receiving the remaining digits of the multiplicand, and if no other multiplicand digits are set up they remain on their zero contact plates as shown.

Similarly, the setting up of the number seven multiplier digit results, in a manner which will hereinafter be more fully described, in the closing of the number VII multiplier gang switch 121 shown as the third gang switch from the bottom at the left of Fig. 77. This serves to connect the fifteen contact points shown opposite this gang switch plate to lead 129, which through the main control switch 131 and a resistor 342 is connected to the minus side of the line. None of the other multiplier gang switches 121 will be closed during the time that the multiplication by this seven multiplier digit is being effected.

Referring again to Fig. 77A, brush 231 in contacting point 122 serves to connect lead 123 to the plus side of the power supply and through closed elements 124 of the electric shift switch 119 it connects lead 125 to the plus side of the supply. Before lead 125 reaches the zero unit solenoid (U—0), lead 126 branches off from it, passes through the zero tens solenoid (T—0) and connects with leads passing through the T—1, T—2, and T—3 solenoids. It will be noted, however, that the branch 134 passing through the T—1 solenoid terminates in two dead points at open gang switches 121. Similarly, the branch 135, passing through solenoid T—3 terminates in two dead points at open gang switches, but the branch 127 passing through solenoid T—2 besides connecting to two leads, which also terminate at open gang switches, connects to lead 128 which leads to the closed number VII gang switch 121, thereby energizing the "2-tens" solenoid.

Similarly, lead 125 itself passes through the zero units solenoid (U—0) and connects to lead 136 which passes through the (U8—T5) solenoid and has one branch connected to the closed VII gang switch 121, thereby energizing the U8—T5 solenoid. The other branches of lead 136, and all the other leads connected to lead 125, terminate in open gang switches.

The (U8—T5) solenoid just energized serves, as its designation indicates, either to set up an "8" units digit in one order of the accumulator, or a "5" tens digit in the next higher order of the accumulator. In this case it serves to set up the "8" units digit only, because, as will be explained later, the "tens" leaf 504 (Fig. 22) is stopped by the "2-tens" solenoid and thereby prevented from reaching the "5-tens" solenoid.

Reviewing the circuit just outlined, it will be evident that current will pass from the plus lead 110, to brush 231, contact point 122, lead 123, shift switch elements 124, lead 125, and then split through two parallel circuits, meeting again at the number VII gang switch 121; one circuit includes leads 126, 127, and 128, and passes through the (T—0) and the (T—2) solenoids, while the other circuit includes leads 125 and 136, and passes through the (U—0) and the (U8—T5) solenoids. All other circuits originating at closed contact point 122 are open at one of the multiplier gang switches 121.

The energization of the (T—0) solenoid serves to retract the zero tens solenoid stop, and the energization of the (T—2) solenoid serves to eject the two tens stop. Similarly, the energization of the (U—0) solenoid serves to retract the zero unit stop, while the energization of the (U8—T5) solenoid serves to eject the 8 units, 5 tens stop. Thus, the solenoids have been energized to set up a two tens digit and an eight units digit thereby preparing for registering the product 28.

In cases where the product is a single digit number it will be found that the wiring arrangement is such that the live lead passing through the (T—0) solenoid will not have any connection to the closed gang switch, and hence no current will flow through the (T—0) solenoid. Similarly, if the units digit of the product is zero, the live lead of the (U—0) solenoid will have no connection to a closed gang switch 121 and hence no current will flow through the (U—0) solenoid. Similarly, if the multiplicand digit set up is a zero none of the leads passing through the section of shift switch 119 will be energized and hence no current can flow through either the (U—0) or the (T—0) solenoids. As has been previously mentioned, the stops of the zero solenoids are normally ejected so that whenever there is no current flowing through a zero solenoid the stops remain ejected and the actuating mechanism is retained in its zero position.

From the foregoing example, the circuit connections by which the solenoids corresponding to the product of any two numbers are energized may be traced by reference to Figs. 77, 77A and 77B, it being understood that this circuit diagram is illustrative of only a single decimal order of the machine which, as will be observed from the description following, is composed of a plurality of multiplicand and multiplier orders controlled by a single group of factor set-up keys 101.

The resistor 342 is shunted by a resistor switch 1084, which is closed at the time switch 131 closes. Shortly after the main switch 131 has been closed, the resistor switch 1084 (Fig. 77A) is opened by the cam 1085 which (as shown in Fig. 76), is secured to operating sleeve 694 driven by main clutch 341. Opening of resistor switch 1084 throws the resistance 342 in series with the partial product solenoids, thereby cutting down the voltage across the solenoids. By the above means, when main switch 131 is closed a relatively high voltage is thrown across the partial product solenoid to give very quick operation; as soon however as the solenoid stops have been ejected the voltage across the solenoid is reduced to where it is just sufficient to reliably hold the stops in the ejected position.

MULTIPLICAND SELECTION MECHANISM

The factor set-up mechanism is controlled by 10 factor keys 101 (Figs. 1 and 2) numerically arranged, in the manner frequently employed in ten key adding machines, to facilitate the operator's speed by permitting him to employ the so-called "key-touch" system of operation in the introduction of factors involved in a calculation.

In addition to the factor keys, the set up mechanism consists of duplicate set-up sections, one for each order of the multiplicand and one for each order of the multiplier, in the present illustration there being eight multiplicand and eight multiplier sections. These sections are disposed laterally across the machine, the multiplicand sections on the left and the multiplier sections on the right. To individually operate the set-up sections a traveling set up carriage is arranged to traverse the machine and cooperate with each set-up section in turn. The factor keys 101 operate elements in the traveling set-up carriage and thereby accomplish the set-up of each digit of the multiplicand and multiplier as the traveling set-up carriage reaches the cooperative position with each of the set up sections, as will hereinafter be described.

Factor keys

Each of the ten factor set-up keys 101, excepting the "0" key, comprises a key top 141, on which is delineated the value of the respective key, ranging in value from one to nine; the zero key top is in the form of a bar 142 which, for the convenience of the operator, is extended laterally in front of the three banks of significant keys 101. The key stems 143 (Fig. 2) of all of the ten keys 101 are mounted in a supporting frame 144 for vertical movement, and are for this purpose slidably supported on studs 145 and 146 which they embrace by means of slots 147 open at the lower extremity of said key stems. Each key stem is equipped with a lateral projection 148 which overlies a lever 149, one of which is associated with each of the ten keys 101. Levers 149 are rigidly secured to transversely extending shafts 151 to 160, inclusive (see Figs. 2, 3 and 4). In order to individually spring tension each of the keys 101, a torsion spring 162 is provided for each of said keys, and is wound around one of the various shafts 151 to 160, inclusive, being rigidly secured thereto at one end, while the free and outwardly extending end thereof is disposed beneath lateral projection 148 so as to exert a steady upward pressure thereon, thus retaining each key in its normally raised position.

Upon depression of any one of set-up keys 101, the corresponding lever 149 is rocked, resulting in a similar rocking movement of one of the shafts 151 to 160, which is associated therewith. Means, including the laterally displaceable set-up carriage to be hereinafter described, are provided for transmitting this rocking movement to the selection mechanism of each set-up section. The transverse shafts 151 to 160 are supported in suitable frame plates (not shown) between which the entire multiplicand and multiplier selection mechanism is disposed, and between which said set-up carriage is shiftably arranged.

Each shaft in the upper group of shafts 151, 152, 153, 154 and 155 (Fig. 3) has rigidly attached to its right end a lever 163 which, through downwardly extending linkage connections 164, is capable of effecting counterclockwise movement of a bellcrank lever 165 which is keyed to the right end of a transverse shaft, comprising one of the group of shafts 166, 169, 172, 174 and 175. Similarly, rigidly secured to each shaft of the lower group of transverse shafts 156, 157, 158, 159 and 160 (Fig. 4) at its left end is a lever 161, each of which is connected by means of a downwardly extending link 150 with a bellcrank lever 140, the entire construction being identical in all respects with the linkage exemplified in Fig. 3.

The general arrangement of this manual selection is such that upon depression of the "0" key, the "3" key, the "6" key, the "8" key, and the "9" key, the linkage mechanism on the right of the machine affecting shafts 166, 169, 172, 174 and 175, respectively, is rocked and likewise upon depression of the "1" key, the "2" key, the "4" key, the "5" key and the "7" key, the linkage mechanism on the left side of the machine affecting shafts 167, 168, 170, 171 and 173, respectively, is similarly rocked. The resulting counterclockwise rotation of these shafts in response to depression of their associated keys is equal, thus affording the same key touch on all keys.

Traveling set-up carriage

Referring to Fig. 2, it will be noted that the selection shafts 166 to 175, inclusive, as well as the other parts of the selection mechanism, are disposed concentrically about the axis of shaft 179 and are extended through the two parallel spaced frame plates 184 (Fig. 69) and 185 of traveling set-up carriage 186. These two plates 184 and 185, which constitute the frame of set-up carriage 186, are rigidly secured to each other by means of two appropriate bushings 187 (Fig. 69) which are internally threaded and are supported on similarly threaded transverse shafts 188 and 189. Thus, upon rotation in either clockwise or counter-clockwise direction of shafts 188 and 189, by means to be hereinafter described, set-up carriage 186 may be shifted transversely either to the right or to the left (Fig. 69) through the various decimal orders of the selection mechanism. The traveling set-up carriage 186 includes ten setting arms 182 disposed between the frame plates 184 and 185, and slidably keyed to the selection shafts 166 to 175; the arrangement being such that as traveling carriage 186 reaches a cooperating position with a set-up section the arms 182 may be rocked by the shafts 166 to 175 to control the set-up in that section.

Multiplicand set-up sections

As referred to above, there is a set-up section for each order of the multiplicand. These set-up sections are all alike in construction and serve to position the multiplicand selection switches 118 and to set up the multiplicand digits in register 106. In each set-up section there is an arcuate plate 191 concentric with shaft 179 (Figs. 2, 5 and 7). Each of these plates is mounted on two parallel shafts 192 and 193, and is equipped with ten stop levers 194 rotatably affixed thereon by means of studs 195. At the upper end of each stop lever 194 is a lateral projection 196, while near its lower end is a similar projection 197. The lowermost extremity of each lever terminates in a rounded nose 198 designed to be engaged by the ear 183 on one of the setting arms 182.

As more clearly shown in Fig. 7, each projection 197 lies in a notch 199 in plate 191, in such a manner that the sides of this notch 199 limit the angle through which stop lever 194 may rock. In order to prevent inadvertent displacement of lever 194 from either of its end positions, there is provided in plate 191 opposite each stop lever an aperture 201 (Fig. 7) into which is inserted a ball 202. The various balls 202 are held in place by a spring strip 203, which is riveted to plate 191, and which has yieldable arms 204 overlying each ball 202, pressing said ball into the aperture 201 and against the stop lever 194 disposed on the opposite side of plate 191. Each stop lever 194 is provided with two smaller holes 207 into one of which ball 202 will extend when said stop lever is in either of its two end positions.

In Figs. 2 and 7 of the drawings, all stop levers 194 are illustrated as being in their initial positions, which are extreme counter-clockwise in Fig. 2, and extreme clockwise in Fig. 7. As traveling set-up carriage 186 is moved into position in any order, all ten setting arms 182 are so located that their respective ears 183 are in cooperative relation with the respective noses 198 of the ten stop levers 194, a sufficient clearance always being maintained between noses 198 and ears 183 to permit unimpeded movement of said carriage.

Rocking of a particular stop lever 194 therefore results from the depression of a corresponding factor key 101 which, as previously explained, will rock the corresponding one of shafts 166 to 175, thereby rocking the corresponding setting arm 182, and, through the action of ear 183 on nose 198, rocking the corresponding stop lever 194 to its extreme clockwise position (Fig. 2).

This rocking of stop lever 194 will place the ear 196 thereon into the path of nose 213 on segment 211, and when the latter is released it will respond to the action of a torsion spring 210, which is wound around shaft 179 (Fig. 18), and will rotate counter-clockwise until arrested in its movement by the ejected stop lever 194.

Each segment 211 is normally held in the position in which it is shown in Fig. 2, by a pawl 214 which is pivoted at 215 to arcuate plate 191. This pawl is constantly urged to rock counter-clockwise and into latching position with respect to nose 213, by a compression spring 216, its counter-clockwise movement being limited by an integrally formed ear 222 which overlies the upper and substantially horizontal edge of plate 191.

Means are provided for effecting disengagement of pawl 214 from its related segment, upon rocking of a stop lever 194 by one of the ten setting levers 182 of the set-up carriage. This pawl-releasing means includes an arcuate release lever 217 (Fig. 5) which is suspended from shaft 179 for independent rocking movement in either direction, there being one of these release levers 217 associated with each set-up section of the machine. Release levers 217 are constantly urged counter-clockwise, as viewed in Fig. 5, by a suitable light spring 218 which is tensioned between a lug 218a on said stationary plate 191 and the rearmost end of said lever 217. Extending outwardly from the periphery of lever 217 are ten lugs 219, located just in front of the ears 197 on stop levers 194, as shown in Figs. 2 and 5. Upon clockwise rocking of a stop lever into its operative position, its lug 197 will be moved forwardly resulting in clockwise rocking of pawl release lever 217 about its pivot 179 to where an upwardly extending finger 221 will engage the lateral ear 222 on pawl 214 and cause disengagement of said pawl from nose 213 of segmental lever 211, whereupon the latter is released and free to respond to the urge of its spring 210 (Fig. 18) and will move in a counter-clockwise direction, as viewed in Fig. 2, until it engages the stop lever which has been set.

It will be evident from the foregoing description that the respective segmental levers 211 are released to move through angles, each indicative of the size of the digit set up in the corresponding order, and that through the segmental portion 212 of lever 211 and gears 208 and 215 the check dials 216 (Figs. 2 and 18) will be positioned so as to properly display the figure set up.

Multiplicand selection switches

One function of the multiplicand set-up mechanism comprising the eight leftmost orders, is that it shall in each order connect the proper one of ten selection circuits to one side of the main supply line. This is accomplished by means of multiplicand selection switches 118 shown diagrammatically in Fig. 77A, and in detail in Figs. 5, 6, 8 and 9. Each selection switch constitutes a part of one set-up section, there being 8 multiplicand sections, as previously explained. Each switch consists of a brush member 231 connected to one side of the supply line and a member 229, made of insulating material, carrying ten contacts 236, corresponding to the multiplicand digits 0 to 9. Brush member 231 is secured to segmental lever 211 previously described, but insulated therefrom by insulating discs 232. The arrangement is such that as lever 211 rotates from its initial position to its stop position, according to the multiplicand digit selection, as previously described, the brush member 231 is carried with it and comes to rest on the particular contact 236 corresponding to the multiplicand digit selected. Connection is made to brush 231 (see Fig. 6), by means of a flexible conductor 230 fastened to terminal screw 228 to which the supply lead 227 from the main suply line 110 is also connected. The contacts 236, excepting the zero contact, are connected to leads 237 carried in a common cable 238 to the shift switch 119 (Figs. 2 and 77A), and then through a cable 239 comprising such leads as lead 125 to the proper solenoids, in the manner hereinbefore described in connection with the partial product circuits.

In order to limit the current flow through the oblong zero contact blocks 236, which have no solenoid windings connected in series therewith, a resistance 240 is connected between each of the oblong zero contact blocks 236 in the multiplicand selection switches 118, and the negative line 129. These resistances 240 are so proportioned, relative to the resistances of the partial product solenoid windings, that the current drawn from the line is approximately independent of the position of the selection switches 118, and the voltage drop across resistor 342 is thereby maintained approximately constant.

Carriage shift mechanism

From the foregoing description it is evident that as a set-up is effected in each multiplicand order, carriage 186 must be allowed to travel in a step by step fashion until every digit of the multiplicand factor has been introduced into the check dials 216, and a circuit established from the supply line to the partial product solenoids in each order corresponding to the multiplicand digit of that order. How this is accomplished will now be more fully described:

At the start of the setting operation, carriage 186 is always disposed at the extreme left of its operating range, in line with the leftmost order of the check dial register 106. As shown in Fig. 17, there is loosely pivoted on shaft 179, near the right end thereof, a segment 241 which is urged by a strong tension spring 242 (directly behind spring 303), in counter-clockwise direction. Rigidly secured to the ends of threaded carriage-drive-shafts 188 and 189 are small gears 243 and 244, respectively, both of which are driven by segment 241 through the compound gear train consisting of gears 245, 246, 247 and 248 connecting with gear 243, and the compound gear train consisting of the gears 245, 246, 249 and 251, connecting with gear 244. The ratio of each of the two gear trains connecting segment 241 with gears 243 and 244 is identical and such that for each step of advance of segment 241 in counter-clockwise direction, shafts 188 and 189 are driven in clockwise direction an amount adequate to shift said carriage 186 from one order into the next order of selection; the arrangement being such that whenever shafts 188 and 189 are rotated clockwise by spring 242, said shafts, by virtue of their threaded connections with bushings 187 in carriage 186 will effect a displacement of the latter to the right.

Such displacement is blocked at each order until the set-up has been made in that order. This is accomplished by a spring-biased blocking lever 252 (Figs. 2 and 7), which is pivoted at 253 to stationary plate 191 and terminates at its upper end in an ear 254 which overlies nose 213 on segmental lever 211. The lower extremity of lever 252 (Fig. 69) cooperates with a spring-biased detent 255 which is pivoted at 256 to a lateral extension 257 on the forward end of carriage 186. A compression spring 258 normally tends to hold detent 255 in its fully raised position, in which position its lower end abuts the frame plate 185, thus preventing counter-clockwise movement thereof, and consequently preventing movement of said carriage to the right unless blocking lever 252 is rocked out of the way. However, detent 255 may yield in clockwise direction to clear blocking levers 252 upon return movement of said carriage to the left during clearance of the entire set-up or selection mechanism, as will be more fully described hereinafter.

It is, therefore, apparent that while carriage 186 may be power-shifted to the left without interference from said blocking levers 252 in each set-up order, during movement to the right thereof, detent 255 is, in effect, a fixed and non-yieldable part of the carriage 186, which, coming against a blocking lever 252 is prevented from further rightward displacement, through the action of spring 242 (Fig. 17). The moment, however, that a set-up takes place in the order concerned, including a zero set-up, pawl 214 is withdrawn from below nose 213 on lever 211, thus releasing lever 211, and permitting counter-clockwise movement thereof, as described hereinbefore (Figs. 2 and 5). Inasmuch as blocking lever 252 is always urged clockwise (as viewed in Fig. 2) by its spring 260, it will follow downward movement of nose 213, thus removing its lower extremity 261 from the path of carriage detent 255, resulting in release of said carriage and unimpeded shift thereof to the right, through the action of spring 242, until detent 255 contacts a blocking lever 252 in the next order in which no set-up has been made, where said blocking lever is maintained in the position illustrated in Fig. 2.

It may be mentioned that following any factor set-up, the carriage and the other parts of the selection mechanism may be power returned to their initial and inactive positions by depression of the "Factor dial" clear key 112, or by some of the other control keys hereinbefore mentioned.

The mechanism which will effect such a power clearance preparatory to a new set-up on the keyboard, will be more fully explained in connection with the description of said "Factor dial" clear key.

Multiplicand check dial register

In order to provide the operator with a visible register of the multiplicand factor which has been set up, a check dial register 106 (Fig. 1), is provided.

Register 106 is provided above the multiplicand selection mechanism and in lateral alignment therewith in such a manner that all of its eight check dials 216 are clearly visible through appropriate sight openings 259 in cover plate 259 (Figs. 1 and 2). It is understood that there are the same number of check dials in register 106 as there are multiplicand set-up sections.

In the present form, as illustrated in Figs. 18, 19 and 55, each of the eight check units 216 is mounted freely rotatable upon a shaft 266 and between upright plates 267, by means of which the entire selection mechanism is supported, and whereby each order of selection is separated from its adjoining orders.

Each check dial comprises a shell 216 upon which is delineated, in sequential order, the figures ranging in value from zero to nine. In Fig. 20 such a dial shell 216 is shown in developed form. An initial and blank space 268 preceding the zero figure corresponds with a similar initial position in each order of said set-up mechanism, as exemplified in Figs. 2, 5, 6, 7 and 8, where segment 211 and its associated parts, including brush 231 of selection switch 118, are also shown in such initial or blank position. The initial position is provided so that the means previously described for releasing the set-up carriage 186 will operate when a zero multiplicand digit is selected or when the set-up carriage is to be shifted through unset orders of the multiplicand, as will be hereinafter described.

Dial shell 216 is firmly clamped between a flange on hub 263 and dial gear 215 by rivets 263a (Fig. 55), thus forming a rugged unit which through idler gear 208 will be rotated in proportion to the rotation of segment 211, which segment, as previously described, rotates an amount corresponding to the multiplicand digit selected. A typical section of the multiplicand set-up mechanism with its respective check dial unit, such as used in registers 106 and 107, is illustrated in the rightmost order of selection marked "A" in Fig. 18. The compound planetary gearing shown in the three orders to the left thereof will be fully explained hereinafter in connection with "Divisor sensing mechanism," and does in no way affect the operation of said check dial 216 as outlined herein.

SHIFT SWITCH

Theory

In calculating machines employing a shiftable accumulator register carriage, the actuating elements are automatically alined with the proper orders in the shiftable register carriage, upon displacement thereof from order to order during computations such as multiplication and division.

The machine of the present invention, as illustrated in Fig. 1, includes a non-shiftable accumulator register 104 with a separate, fixed, actuating unit for each of the sixteen accumulator register dials.

Cooperating with these sixteen orders of actuators are fifteen banks of partial product solenoids. The extent of actuation in each order with the exception of the highest and lowest order is controlled by two stops, one in each of the two adjacent banks of solenoids, the energization of which has been previously described.

In a machine employing a shiftable product register the carriage is shifted before multiplying by the digit of the next denomination so as to properly aline the correct accumulator register dial with the actuating means. In the present case a shift switch is employed to accomplish the same purpose by shifting the circuits representing the multiplicand digits to the next lower order banks of partial product solenoids. The result is that after the product representing the multiplication of all the multiplicand digits by the highest order digit of the multiplier has been entered into the accumulator register 104, all the multiplicand circuits are shifted to make connection with the banks of solenoids in the next lower orders. This results in actuation taking place in the next lower orders of the accumulator register, when multiplying by the next lower order digit of the multiplier.

In visualizing the shift switch and its function, it will be easier if a few points regarding the operation of this machine are kept in mind while following the description. First, the present description covers a machine with 8 multiplicand and 8 multiplier orders. Second, each cycle of operation registers in the accumulator register the product of all the multiplicand digits by one multiplier digit. Third, the first cycle involves the highest order digit of the multiplier. Fourth, each successive cycle involves a multiplier digit of one denomination lower and requires registration in the next lower orders of the accumulator dials. Fifth, where the multiplicand contains a less number of digits than the full capacity of the machine, i. e., less than 8 digits in the present description, the multiplicand set-up is made in the leftmost orders of the multiplicand selection switches 118 (Fig. 77B), as previously described. Sixth, the circuit representing a zero multiplicand is not connected with the partial product solenoids.

Shift switch structure

Bearing the above in mind, the shift switch 119 consists of a stationary member 270 (Figs. 2 and 10 to 16), composed of fifteen sections 271, each section corresponding to a bank of solenoids 116 and carrying nine contact blades 272 (Fig. 11), to which are connected the nine leads from the corresponding bank of solenoids, the leads representing the multiplicand digits 1 to 9; and a shiftable member 290 composed of 8 sections 283, each section corresponding to one of the 8 multiplicand selection switches 118 and carrying 9 switch jaws 285 (Fig. 12) to which are connected leads from the corresponding selection switch, the leads also representing the multiplicand digits one to nine. The stationary sections are arranged in an arcuate manner and the shiftable member 290 arranged to rotate within the stationary member. The arrangement is such that the 8 multiplicand selection switches 118 (Fig. 77A) are connected simultaneously with a group of 8 partial product solenoid banks 116, thus making it possible to connect the circuits representing the selected multiplicand digits to the leftmost group of solenoid banks 116, and then sequentially shift these connections to the group of next lower order banks of solenoids, resulting in actuation taking place in the next lower order of the accumulator register dials, after each cycle of multiplication, the shift switch being arranged to automatically shift after each multiplication cycle.

A switch section 271 is preferably made of a bracket 265 of molded non-conductive material which supports nine sets of switch blades 272 which are disposed in slots 273 (Fig. 10) and are locked in place by the next adjoining section 271 as may be seen in Fig. 15.

After the blades 272 have been inserted into their respective slots 273 (Fig. 10), the completed section 271 is assembled into a semi-cylindrical frame 277. Fifteen such sections are completed and assembled in frame 277 which is secured in a suitable manner, as by screws 281, to arcuate end plates 278 which, in turn, are similarly fastened by screws 280 to two upright frame plates 279 of the machine. The nine leads, hereinbefore mentioned, which are soldered to the respective switch blades 272 of each section, as illustrated in Fig. 11, are carried by a conduit 282 to the outside of said shift switch, where all of the fifteen conduits 282, from all the sections, are combined into a larger conduit 289

(Fig. 2), which extends transversely of the banks of partial product solenoids 116, where each one of the conduits 282 is fanned out to its corresponding bank of solenoids 116.

The movable member 290 of the shift-switch 119, which is connected with the multiplicand selection switches 118 (Figs. 6, 8 and 77A), comprises sections 283 (Fig. 15) which are in a general way similar to the sections 271 of the stationary member 270 with which they are designed to cooperate. Each section 283 is made of a slotted bracket 269 of suitable molded insulating material (Fig. 13), there being nine slots 284 provided in each bracket 269 to receive nine switch jaws 285 (Fig. 12) corresponding to the nine multiplicand selection switch contacts 236 (Fig. 8). Each jaw 285 (Fig. 12) is formed out of a single strip, preferably of spring bronze, and comprises a flat portion 286 to which is soldered a lead 123, from the multiplicand selection switch 118 (Fig. 77A). A tubular enlarged portion 287 provides a suitable means whereby each jaw 285 may be held firmly in its respective slot 284. The upper jaw portion proper of each jaw 285 is curved outwardly at each side, as indicated at 288 and 289, respectively, so as to guide the associated blade 272 during its passage therebetween.

As shown in Figs. 2 and 15 of the drawings, the eight switch sections 283 are assembled in a partial-cylindrical frame 291 which is supported in end plates 294 splined to a shaft 295 and rotatable therewith. A band 292 at each end of the assembly extends over the outside peripheral surfaces of the sections 283 and is firmly secured to cylindrical frame 291 by screws 296. Leads from the nine contact jaws in each section are carried through conduits 297 which, in turn, are carried through a large conduit 298 (Fig. 2) to the multiplicand selection switches.

*Movements of shift switch*

When traveling set-up carriage 186 (Figs. 2 and 17) is in its initial position in line with the leftmost section of the multiplicand set up mechanism, rotatable member 290 is in its extreme counter-clockwise, i. e., initial position (Fig. 2). Means hereinafter to be described, are provided whereby movable member 290 will be rotated step by step in clockwise direction in unison with the shifting of the traveling set-up carriage 186 as the multiplicand digits are set up. When the eighth or last multiplicand digit has been set up, the movable shift switch member 290 will have reached its extreme clockwise position as viewed in Fig. 2. In case the multiplicand factor has less than eight digits, means are provided, to be hereinafter described, whereby rotating member 290 will complete its shift to its extreme clockwise position. Of all the sections 271, that located in the extreme clockwise position in stationary member 270 is connected to the highest order, i. e., the leftmost bank of partial product solenoids 116, and of all the sections 283, that located in the most clockwise position in the rotating member 290 is connected to the leftmost, i. e., highest order of the multiplicand selection switches 118. Thus after completion of an eight digit multiplicand set-up the shift switch has reached a position where the eight multiplicand selection switches are connected to the eight leftmost, i. e., eight highest orders of solenoid banks 116, in which position actuation will take place in the highest orders of the accumulator dials.

The above description covers the positioning of the shift switch while the multiplicand set-up is being made. At this point the circuits corresponding to the multiplicand digits have been established through the windings in the leftmost eight banks of solenoids up to the multiplier gang switches. After the first cycle of multiplication by the highest order digit of the multiplier has been completed, means are provided whereby the rotating member 290 of the shift switch is shifted one step back in a counter-clockwise direction, thus establishing connection from the multiplicand selection switches to windings of the group of solenoid banks one denomination lower. A shift takes place after each multiplication cycle, and thus, by means of the shift switch, actuation of the accumulator dials in successively lower order occurs successively as multiplication by successively lower order multiplier digits takes place in successive cycles.

*Mechanism for moving shift switch*

Rigidly secured to shaft 295 (Figs. 2, 14, 15 and 17) is a gear 301 which is driven through intermediate gears in clockwise direction by a segment 302. The latter is pivotally secured to shaft 179, being disposed thereon directly in front of and adjacent to segment 241. Segment 302 is also spring urged in counter-clockwise direction by a spring 303, but is normally prevented from such counter-clockwise rotation by an ear 304 which overlies the upper edge of set-up carriage segment 241.

Segment 241 cannot respond to the tension of its spring 242 except as each blocking lever 252 is disengaged from set-up carriage 186, as hereinbefore described in connection with the multiplicand set-up mechanism. Hence, when no multiplicand is set up, carriage segment 241 is in its initial position, in which it is shown in Fig. 17, and shift switch segment 302 is also in the same position, since it is restrained by its connection 304 with the former. As previously described, segment 241 is advanced in a counter-clockwise direction (Fig. 17), step by step, as the multiplicand digits are set up. Segment 302, being restrained only by segment 241, will advance together with segment 241 in response to spring 303. Counter-clockwise movement of segment 302 results in clockwise rotation of gear 301 and shaft 295, due to the two idler gears 308 and 309 which are interposed between segment 302 and gear 301, thus resulting in clockwise rotation of movable member 290 of the shift switch, which is secured to shaft 295, in a step by step manner as the multiplicand digits are set up, until it has reached its extreme clockwise position as previously described.

In this position the first digit of the multiplier is introduced into the machine, and a main clutch solenoid 305 (Fig. 77B), to be hereinafter described, is energized to initiate a unitary main clutch operation which results in an actuation cycle whereby the first cycle of multiplication takes place, at the completion of which the shift switch solenoid 306 (Figs. 17 and 77B) is energized, by the automatic closure of switch 659, operated by cam 668, attached to the main clutch 341.

Energization of solenoid 306 causes retraction of its normally ejected plunger 307. Pivotally secured at 307a to the downwardly extending plunger 307 is a link 307b which is secured by means of a pin and slot connection 311 to a clutch dog 312 fulcrumed at 313 and tensioned clockwise by a spring 314, which tends to hold foot 315 within the housing of said clutch 316 where it will prevent a driving connection from being established between the driving and the driven elements of said clutch. However, when solenoid 306 is energized the upward force exerted thereby upon plunger 307 and link 307b causes clutch dog 312 to rock counter-clockwise against the tension of spring 314 and removes foot 315 on the rightmost end of dog 312 from contact with clutch 316 thus permitting engagement of the driving element therein with the driven element, resulting in a unitary rotation of said clutch in the direction of the arrow and in unison with shaft 317 on which said clutch is journaled. Reference is hereby made to the United States Patent No. 1,643,710 to Friden, patented September 27, 1927, for a more detailed disclosure of the type of clutch, such as the shift clutch 316, illustrated in Fig. 17 of the drawings.

Counter-clockwise rotation of the movable member 290 of shift switch 119 is accomplished by an eccentric 318 which is rigidly secured to the housing of clutch 316 and is rotatable therewith. Mounted on this eccentric is a pawl 319, which is spring urged clockwise by a spring 321 so as to rock against a fixed shaft or stud 322. The consequence is that each rotation of shift clutch 316, which results in one full counter-clockwise rotation of eccentric 318, produces a clockwise circuital movement of the hooked tip 323 of pawl 319. Owing to this movement the tip 323 engages one of the teeth of, and shifts a ratchet 324 (integral with shaft 295), advancing the shift switch 119 one step in counter-clockwise direction.

Because of gear 301 on shaft 295 and idler gears 308 and 309, as hereinbefore mentioned, segment 302 participates in any power advance of movable switch member 290. Thus, for each cycle of the shift clutch 316, segment 302 is moved one step in clockwise direction against the tension of spring 303. Means are provided for retaining segment 302, and consequently shift switch member 290, in each position until further motion during the next shift cycle.

This means includes a bellcrank lever 325 which will remain ineffective while the multiplicand is being set up, with consequent counter-clockwise rotation of segment 302 and shifting of the set-up carriage 186, but which will be released into operation (upon the first cycle of operation of shift clutch 316) so as to latch segment 302 against counter-clockwise rotation during the power return movement of shift switch 119.

Bellcrank lever 325 is pivoted on the same stub shaft 326 on which idler gear 308 is mounted. A spring 327 tensioned between the downwardly extending arm 328 of lever 325 and a stud 329 in the machine frame (not shown) urges lever 325 clockwise, about its pivot 326, to where a point 331 thereon can move into engagement with segment 302. This is prevented, however, from taking place until the first shift cycle by a latch lever 332 (Fig. 17), which is mounted freely rotatable on stud 333 and is urged by a spring 334 in clockwise direction to where an upwardly extending arm 335 thereon abuts the stationary stud 322. Another forwardly and substantially horizontally extending arm of latch lever 332 is equipped at its extreme forward end with a lateral projection 336 which, as shown in Fig. 17, lies directly in front of the tip 337 of lever 325, thus retaining lever 325 in its inoperative position, in which it is illustrated, until the shift clutch 316 is operated after the first multiplication cycle.

When the set-up carriage 186 has been shifted into the first multiplier order as a result of an eight digit multiplicand having been set up (or as a result of depression of the multiplication key 103, as will be explained hereinafter), both segments 241 and 302 will have been spring advanced in unison. Segment 302 is now positively prevented from further counter-clockwise rotation by a stop pin 328 in the machine frame, (not shown), which extends into the operating plane of ratchet 324 and stops it when shift switch 119 has reached its extreme clockwise location. Depression of a key 101 to set up the first multiplier digit will have the effect of closing a multiplier circuit, which, in turn, will energize the main clutch solenoid 305 (Figs. 64 and 79B), to initiate a single rotation of main clutch 341 in the manner already described. Near the end of this unitary main clutch operation, a shift clutch operation is started, resulting in reciprocation of lever 319, (Fig. 17) by eccentric 318. During the very first portion of such reciprocation of lever 319, it is moved forwardly and then up into engaging position with respect to ratchet 324; during this forward movement of lever 319 the lateral extension 338 of lever 319 slides over the upper angular surface 339 of latch lever 332 and causes it to rock downwardly an amount sufficient to disengage its ear 336 from the lower extremity 337 of bellcrank lever 325. This operation results in clockwise rocking of lever 325, by virtue of spring 327, and engagement of segment 302 by pawling tip 331 of lever 325. Segment 302 is thus prevented from being moved in counter-clockwise direction by spring 303, but can be power returned step by step upon each successive shift clutch operation, with pawling lever 325 constantly remaining in engagement with said segment 302 and maintaining it in each of its progressively advanced positions.

At the completion of a calculation, means have been provided to return the set-up carriage 186, and the shift switch 119, to their initial positions. Thus, splined to shaft 179 is a lever 346 which has a laterally extending ear 347 adapted to engage both segment 241 and segment 302 when the lever 346 is rocked clockwise through the action of a clear clutch 348, as will be described in connection with the "Factor dials" clear key 112. Clockwise rocking of lever 346 causes ear 347 to engage each of the segments 241 and 302 and restore them to their initial positions in which they are illustrated in Fig. 17.

It is also necessary that pawl lever 325 be returned to its initial position in which tip 337 of lever 325 is engaged by ear 336 of lever 332, and thus hold pawling finger 331 away from the gear teeth of segment 302, so that the latter will be free to rock counter-clockwise during a subsequent set-up in the multiplicand selection.

To this end a stud 349 is provided on the inside face of segment 241 in such a position that it will press against the upwardly extending and curved arm 351 of pawl lever 325 when segment 241 is being restored to its initial position by lever 346, causing lever 325 to rock counter-clockwise about its pivot 326 a sufficient amount to permit the tip 337 thereof to cam the lever 332 downwardly so that its ear 336 can again move in front of tip 337, thereby latching lever 325 in its inoperative position, as illustrated in Fig. 17.

Operation of shift switch in multiplication

The purpose and construction of the shift switch 119 has already been fully described. It is believed, however, that a brief description of the shift switch operation during multiplication will be desirable, particularly so if it is given in connection with a multiplication problem such as illustrated diagrammatically in Fig. 16A of the drawings.

Recapitulating, the shift switch 119 comprises in the present instance fifteen stationary sections 271 which are electrically connected with corresponding banks of partial product solenoids 116 (Fig. 2), and a shiftable member 290 composed of eight sections 283 which are connected with corresponding multiplicand selection switches 118, (Fig. 77A).

For the purpose of illustration, let it be assumed that the multiplicand 34862 is to be multiplied by the multiplier 612. The first factor key 101 depressed will be the No. 3 key, with the result that movable shift switch member 290 will be advanced one step from its initial position (see Fig. 16A), to where the leftmost section A thereof will be aligned with the eighth section H of stationary part 271. Thereafter, upon depression of the factor key 101, representing the second multiplicand digit 4, member 290 is again advanced one step in the direction of the single arrow, and this process is repeated until the last and lowest order multiplicand digit 2 has been introduced into the machine. The arrangement is such that the particular section of member 290 corresponding to the last digit set up will always cooperate with the eighth section H of stationary member 271; while the sections corresponding to the higher multiplicand digits first set up will be successively shifted to the left thereof as is clearly illustrated in Fig. 16A.

The operator now depresses the multiplication key 105, which results in shifting the set-up carriage into the first multiplier set-up section and shifting the movable shift switch member 290 into its extreme clockwise position, in which position, referring to diagrammatic drawing 16A, the leftmost section A, representing the highest order multiplicand digit 3 will be in cooperative relationship with the leftmost stationary section of member 271 marked "A."

The set-up carriage 186 and the shift switch 119 are now in the respective positions in which the operator will enter the first, i. e., highest order digit contained in the multiplier "612." Upon depression of the No. 6 key, representing the highest order multiplier digit, the selected partial product circuits will be completed by closure of the respective gang switches 121 and main switch 131 at the beginning of the unitary main clutch cycle, and the multiplicand factor 34862 will be multiplied by six, with the product appearing in the accumulator register 104. Near the end of the same main clutch operation a unitary shift clutch operation is instituted and the movable shift switch member 290 is now power shifted in the direction of the double arrow, one step, where the second multiplication, this time by the multiplier digit 1, takes place. This cycle is repeated for each multiplier digit set up until the entire multiplication has been completed. In this example, the member 290 will have been power shifted three places to where its highest and leftmost section A is cooperating with the third section C of the stationary shift switch part 271. In this manner the different sections of the inner and movable shift switch member 290 will have come successively into cooperation with different sections of the stationary shift-switch part 271 with the same effect as that produced when the product carriage of a machine employing a displaceable carriage is shifted.

At the completion of this multiplication problem the product will be visible in register 104, while the multiplicand and the multiplier will appear in registers 106 and 107, respectively.

Depression of the clear key 112 (Fig 1) will now serve to clear the multiplicand and the multiplier selection mechanism including the registers 106 and 107 associated therewith. This clearing operation will also result in the restoration of segments 241 and 302 by means of the ear 347 on lever 346 (Fig. 17) with consequent return to initial positions of the set-up carriage 186 and of the shift-switch member 290, in which the leftmost section A of the latter will again be connected with the section I of stationary part 271.

MULTIPLICATION KEY

The multiplication key 105 (Figs. 1 and 33) is provided to afford the operator a manual control by means of which the set-up carriage 186 may be shifted through any unset multiplicand set-up sections and into the first multiplier set-up section, and the movable member 290 of the shift switch simultaneously shifted to the extreme clockwise position, in which position the connections are established for the first cycle of multiplication. In case the multiplicand factor contains a number of digits equal to the full capacity of the machine (eight in the machine described), the last multiplicand digit set up releases the set-up carriage into the first multiplier order, in which case the multiplication key 105 is held against depression.

As shown in Fig. 33 the multiplication key 105 has a stem 356 slidably mounted on studs 352 secured to a plate 253 depending from top plate 115. A spring 354 tensioned between the upper stud 352 and a laterally extending ear 355 on the lower portion of the stem 356 tends to hold the key in its raised position, as shown. The ear 355 overlies a link 357 which is supported by two parallel levers 358 and 359 for limited downward and forward movement upon depression of key 105. The front lever 358 is mounted freely rotatable about shaft 192 while the rear lever 359 is similarly mounted on the shaft 179, on which segmental levers 211 are pivotally secured, as hereinbefore mentioned. A stud 361 on the forward end of link 357 overlies a forwardly extending arm 362 formed integrally with a rocking plate 363, which is also pivoted on shaft 179. A stud 365 on plate 363 is engaged by a bifurcated portion of a lever 366 which is keyed to shaft 192 near its right-hand end. Also keyed to shaft 192 are eight snail cams 367 (Fig. 2), one in each multiplicand set-up section. Snail cam 367 is contiguous to the zero stop lever 194 and is adapted to displace it in clockwise direction in order to bring ear 196 thereon into operative location with respect to nose 213 of the segmental lever 211. It will be recalled in connection with the operation of set-up carriage 186, that rocking of any of the ten stop levers 194 will result in rocking of the pawl release lever 217 (Fig. 5) and disengagement of pawl 214 from tip 213 of segment 211. Rocking of each segment 211 is accompanied by rocking of the corresponding blocking lever 252; thus releasing the set-up carriage and allowing it to shift until stopped and held by a blocking lever 252. Since depression of multiplication key 105, to be described more fully, results in rotation of all the blocking levers 252 in the multiplicand set-up sections, from their blocking position, the set-up carriage will shift until stopped by the blocking lever in the first multiplier set-up section.

Upon depression of multiplication key 105, stud 361 on link 357 (Fig. 33) forces arm 362 downwardly and consequently causes plate 363 to rock counter-clockwise about shaft 179. This causes rocking of bifurcated lever 366, and shaft 192 in counter-clockwise direction. The eight snail cams, being rigidly secured to shaft 192, are thus simultaneously rotated an amount sufficient to displace the leftmost or zero stopping levers 194 in all multiplicand orders in clockwise direction (Fig. 2). This simultaneous rocking of all of the eight zero stop levers 194 is followed by disengagement of any pawls 214 not yet released, resulting in clockwise rocking of blocking levers 252 (Fig. 2) in the unset orders of the multiplicand set-up sections. The carriage is now free to shift through these unset orders and into the first and leftmost multiplier set up section where a blocking lever 252 will arrest further movement thereof. By means hereinbefore described, movable member 290 of the shift switch will have shifted, simultaneously with the shifting of the carriage, to its extreme clockwise position, in which position connections are established to the eight highest orders of solenoid banks 116 ready for the first cycle of multiplication.

In order to prevent the possibility of a selection key 101 being depressed while carriage 186 is being shifted through unset multiplicand orders, locking means are provided. Each of the ten shafts 166 to 175, inclusive, which are rocked by the ten respective selection keys 101, has keyed to it, near the right end thereof and beyond the extent of travel of carriage 186, a lever 368 (Fig. 33) similar to the sliding levers 182 mounted in carriage 186, except that these levers 368 are not slidable on their respective shafts 166 to 175. The plate 363, previously referred to, is in the plane of these levers 368 and is equipped at its lower radial edge with ten projections 371. The arrangement is such that when key 105 is depressed, plate 363 is rocked a sufficient distance in counter-clockwise direction to cause the projections 371 to come into blocking relationship with the ears 369 on levers 368, thus preventing the rocking of any of the shafts 166 to 175, inclusive, until plate 363 is returned to its normal position.

Plate 363 is held in either of its two extreme positions by a pawl 372 which is pivotally secured to depending plate 253 by a stud 373. A spring 374 tensioned between a pin 374a on said pawl 372 and an ear 376 on plate 363 constantly urges pawl 372 into engaging position with respect to tip 375 of plate 363, so as to yieldably hold it in either of the two rocked positions into which it may be placed.

Means are provided to forcibly restore plate 363 to its initial position when carriage 186 enters into the first multiplier set-up section. Extending across and in front of the entire multiplicand and multiplier set-up mechanism is a bail 377 (Figs. 2, 32, 33 and 69), supported by arms 378 pivoted on studs or stub shafts 379 which are assembled into frame plates 381. The upper edge 382 of bail 377 is adapted to engage the arm 362 of plate 363 when the latter is in its operative, i. e., extreme counter-clockwise position, while the lower edge 383 of bail 377 rests upon a forwardly extending projection 384 on the carriage frame plate 185 (Figs. 32 and 69). A camming surface 385 on the lower edge of bail 377 is extended downwardly and to the right (when viewing Fig. 69) in such a manner that as carriage 186 approaches the first multiplier order, it will cam the bail 377 upward, as indicated by the dotted lines in Fig. 33, thus restoring the plate 363 and consequently all the parts cooperating therewith, such as shaft 192 and link 357, to initial positions. Thus, depression of key 105 serves to simultaneously lock shafts 166 to 175 against operation by depression of set-up keys 101 and shafts 166 to 175 will remain so locked until carriage 186 enters the first multiplier order, when the camming of bail 377 by projection 384 serves to return plate 363 and release shafts 166 to 175 for operation.

MULTIPLIER SELECTION MECHANISM

The multiplier set-up mechanism is practically a duplicate of the multiplicand set-up mechanism previously described and consists of set-up sections, one for each order of the multiplier, there being eight in the present illustration. These sections, as previously explained, are positioned to the right of the multiplicand set-up sections in order that the same movable set-up carriage 186, after cooperating with the multiplicand set-up sections, can continue to shift through the multiplier set-up section, step by step, and thereby cooperate with each multiplier set-up section in turn, to set up the multiplier digits. The multiplier set-up sections serve to operate the check dials in register 107 so as to give the operator a visible record of the multiplier factor, and to select circuits corresponding to multiplier digits.

A selected multiplier circuit functions, through means hereinafter to be described, to close a gang switch 121 (Fig. 77) corresponding to the same multiplier digit and thereby complete circuits to partial product solenoids, which circuits were partially completed by the multiplicand selection switches 113. The circuits thus completed correspond to the partial product digits of the multiplicand factor times a multiplier digit and energize the particular solenoids in each bank corresponding to those partial product digits, which solenoids control the extent of actuation in each order of the accumulator register, whereby the product of the multiplicand factor times a multiplier digit is entered into the accumulator register.

Fig. 32 shows a typical multiplier set-up section, which is identical with the multiplicand set-up section previously described, with the exception of the switch brush 391 and a few parts which will be described hereinafter.

There is provided in each multiplier set-up section a multiplier selection switch consisting of a brush member 391 (Figs. 32, 35 and 77B), adapted to cooperate with ten stationary contact points 392 corresponding to the multiplier digits. The function of the multiplier selection switches is to prepare, although not necessarily complete, energizing circuits to multiplier solenoids 424 corresponding to the multiplier digits set-up. Thus leads extend from the stationary multiplier switch contacts 392 through the windings of the corresponding multiplier solenoids 424, and thence, by way of circuits hereinafter described, to the minus supply line 129. The brushes 391 are adapted to be connected, one at a time, through switches 405 to the positive supply line 110, by means of leads 403, contact blocks 393, set into a rectangular bar 394 made of insulating material, and a slidable contact member 395, which is arranged to travel over and successively contact the different blocks 393 during successive multiplication cycles, as described in detail immediately hereafter. Slidable contact member 395 is connected by means of lead 400 to the positive supply line 110 through back contact 428 of the division key 109. Contacts 393 and 395 constitute what may be termed, for convenience a "Multiplier shift switch."

*Multiplier shift switch*

The purpose of slidable contact member 395 is to connect the different multiplier selection switches to the supply line consecutively, starting the leftmost switch containing the highest order multiplier digit in successive cycles of multiplication.

At this point it may be well to note that during the set up of the multiplicand digits the brush 395 is shifted from its initial position, as shown in Fig. 77B, in the direction of the single arrow, so that it comes to rest on the leftmost contact block 393, which is connected to the first order of multiplier selection switches, when the traveling set-up carriage has reached the first multiplier set-up section, and when movable member 290 of the shift switch 119 has reached its extreme clockwise position.

Sliding contact member 395 (Fig. 77B) is mounted on a member 396 which is constructed to ride as a nut on a threaded shaft 397. Rigidly secured to the rear end of shaft 397 is a gear 387 (Fig. 50) which is driven by the shift-switch segment 302, through the compound gear train comprising the gears 388, 389, 390 and 380. This driving connection between segment 302 and gear 387 will result in rotation of threaded shaft 397, and consequently advancement of member 396, whenever segment 302 is advanced as a result of a shift cycle. A guide plate 398 is provided to keep member 396 from rotating with shaft 397, consequently the rotation of shaft 397 forces member 396 to shift longitudinally. Thus the contact member 395 is shifted to make connection with the next lower order multiplier selection switch at the same time that rotatable member 290 of the shift switch 119 is shifted to connect the multiplicand selection switches to the next lower order group of partial product solenoids.

Whenever one of the selection keys 101 is depressed to set up a multiplier digit after carriage 186 has advanced into the first multiplier set-up section, it will serve to rock pawl 214 (Fig. 32) in that multiplier set-up section, thus releasing segment 213 and permitting brush 391 to pass over contact points 392 (Fig. 35) until the blocking of tip 213 by the selected stop lever 194 causes brush 391 to come to rest on the selected contact point 392. In order that brush 391 will not close the circuits when passing over the various contact points 392, but will close the same when it has come to rest upon the properly selected contact point 392, a yieldable tip 399 is pivoted to segmental lever 211 by means of a stud 401. Spring 402 serves to normally hold this tip in its extreme counter-clockwise location, but the strength of coil spring 210 (Fig. 18), shown in connection with the multiplicand set-up, which tends to advance segmental lever 211 in counter-clockwise direction, is great enough to collapse spring 402 when the rotation of said segment is blocked by a stop lever 194. Rigidly secured to yieldable tip 399, but insulated therefrom, is a contact leaf 405 so arranged that when yieldable tip 399 is rocked about stud 401 in clockwise direction as a result of contacting a stop lever 194, leaf 405 will make a connection between arm 406 of brush 391 and contact block 404, which is mounted in the insulating disc 232 of segment 212 (Figs. 32 and 77B) and connected to contact block 393. The effect of this arrangement is to leave the circuit open at leaf 405 while brush 391 is passing over those contact points 392 which lie between its initial position and the selected contact point, and to close the circuit as soon as brush 391 has come to rest on the selected contact point 392 which corresponds to the value of the selected multiplier digit.

*Actuating circuits for multiplier solenoids*

From the ten contact points 392 on the stationary member of each multiplier selection switch, wires 407 are carried through a connecting conduit 408 (Fig. 35) to ten bus lines 409 to 418, inclusive (Fig. 77B). For example, the "zero" contact points 419 in all multiplier orders A to H, inclusive, are connected to the bus line 409, and the "one" contact points 421 are connected to the bus line 410, etc. Bus line 409, representing the number zero contact point 419, is connected by one of the leads 423 to one of the windings on the shift solenoid 306, energization of which initiates an operation of shift clutch 316 (Fig. 17) for the purpose and in the manner described hereinbefore in connection with the shift-switch 119. This winding on shift solenoid 306 is connected by way of lead 429 to lead 420, one end of which connects with the negative supply line 129. Each of the remaining nine bus lines 410 to 418 is connected by a wire 423 to a different one of the nine multiplier solenoids 424, numbered from I to IX, inclusive; these circuits are extended from the multiplier solenoids 424 through nine corresponding relays 425, the purpose of which will be explained hereinafter in connection with "division" operation, to a common wire 426, and thence through one of the windings of main clutch solenoid 305 to the minus supply line 129.

It is evident from the foregoing description that closure of any one of the selection switches 391 in any multiplier order as a result of depression of key 101 (Fig. 35), will permit the current to flow from the positive supply line 110 through lead 427 to normally closed switch 428, and thence through lead 400 to shiftable brush 395. From this point the current will pass through the particular contact block 393, on which brush 395 is disposed through the associated lead 403, contact block 404, and switch leaf 405, to the selectively settable brush 391, and thence through the selected contact 392 to one of the leads 407, and from there, through one of bus lines 409 to 418, and through one of the leads 423 to the multiplier solenoid 424 corresponding to the value of the multiplier digit set up, and thence through the associated relay 425 to the common lead 426 which passes through main clutch solenoid 305 and connects with the negative side of the supply line 129.

If the multiplier digit selected is "zero," current is conducted from the zero contact point 419 to bus line 409, and thence through shift solenoid 306 and through lead 420 to the minus supply line 129.

The multiplier selection switch in each multiplier set-up section functions to close the selected contacts 392 as soon as the traveling set-up carriage reaches that set-up section, and a factor key 101 is depressed. The multiplier circuits in each order are completed, however, through the shiftable contact member 395, as it makes contact consecutively with the blocks 393 upon being automatically shifted to the next order after completion of each multiplication cycle. Thus the operator may complete the setup of the multiplier factor without waiting for the machine to complete each cycle of multiplication.

As previously mentioned, following completion of the multiplicand set-up, brush 395 has been shifted from its initial position (Fig. 77B) to the leftmost contact 393 which is connected to the leftmost multiplier selection switch 391, marked A. When this first multiplier switch A is selectively positioned, upon depression of a key 101 corresponding in value to the first digit of the multiplier, the circuit is completed in this order and the respective solenoid 424 and the main clutch solenoid 305 are energized.

Energizing a multiplier solenoid 424 functions to close the gang switch 121, corresponding to the value of the respective multiplier digit set up during a cycle of operation of the main clutch. The manner in which the multiplier solenoids functions to perform this task will appear directly hereinafter.

*Multiplier solenoids and gang switches*

Referring to Figs. 35 and 36, the multiplier solenoids 424 are shown supported between arcuate plates 431 and 432, which are secured to transversely extending shafts 433 in the machine frame, to hold said solenoids in fixed relationship therewith. Fig. 36 is a fragmentary view from the rear of the machine. Each solenoid has a plunger 434 which is ejected, when the solenoid is energized, into the path of a rocking lever 435 of which there is one associated with each of the nine multiplier solenoids 424. Levers 435 are pivoted by means of studs 436 to a substantially semicircular plate 437 which, in turn, is pivotally mounted about shaft 438. One end of the lever 435 terminates in a fork 435a, which engages a stud 439 on a lever 441 keyed to one of nine shafts 442 grouped around solenoids 424.

Each lever 441 is constantly urged in clockwise direction by a suitable tension spring 440 which will normally maintain the lever 441 in its initial and inactive position where a tail 441a thereon will contact a stud 447.

Mounted on shafts 442 are the multiplier gang switches 121 (Figs. 2 and 35); the rocking of said shafts through a small angle in the counter-clockwise direction serves to close the multiplier gang switches 121 to complete the partial product circuits partially established through the multiplicand selection switches by the multiplicand set-up. The ejection of a multiplier solenoid plunger 434 and the rocking of plate 437 will result in closure of the set of gang switches corresponding to the multiplier solenoid energized. The following description shows how this is accomplished:

Setting up of a multiplier digit results in energization of the corresponding multiplier solenoid 424 and ejection of its plunger 434. Simultaneously, main clutch solenoid 305 is energized and initiates a main clutch cycle. A pair of complementary cams 343 (Figs. 35 and 76), mounted on a sleeve 694 integral with the main clutch 341, are rotated in unison with the driven element of the main clutch in counter-clockwise direction. This rotational movement of cams 343 causes the cam follower 445 to rock about its pivot stud 446. This rocking movement of cam follower 445 is transmitted to plate 437 by a linkage 449, with the result that plate 437 is rocked in clockwise direction about its axis 438, carrying with it levers 435. The plunger 434 of the solenoid 424 that has been energized extends into the path of lever 435, blocking the lever and forcing it to rock in clockwise direction about its stud 436 as the latter is being moved away from its initial location during the clockwise rocking of companion plate 437. This produces counter-clockwise rocking of the corresponding lever 441 and of shaft 442, thus closing that particular set of gang switches. All of the other levers 435 will be free to pass over the ends of the plungers 434 of their corresponding multiplier solenoids 424, and, therefore, will not rock their associated levers 441. In Fig. 35, the levers 435 and 441, operating the number eight multiplier gang switches, are shown in the two positions which they may assume when plate 437 is rocked clockwise upon main clutch operation. The position of lever 435, designated A, is the position into which lever 435 is moved when associated solenoid plunger 434 is ejected, forcing lever 435 to rock clockwise about its pivot 436 with consequent rocking of lever 441 and shaft 442 in counter-clockwise direction. The position of lever 435, indicated at B, is the position which lever 435 assumes when it is free to move past its associated plunger 434, in which position lever 441, and consequently shaft 442, will not be affected.

Each of the nine shafts 442 (Figs. 36 and 77) is electrically connected by a flexible wire 442a to the main current supply line 129. The several shafts 442 are each mounted in insulated bearings 448, and certain of the associated levers are made of insulative material, to prevent grounding of shafts 442 to the frame of the machine.

Each set of gang switches comprises fifteen units, one for each bank of partial product solenoids. Each unit is made up of one movable member 451 and two stationary members 454 and 455 (Figs. 36, 37 and 38). The movable member 451 is secured to and in electrical contact with the shaft 442, and has a number of spring tabs 452 concentrically grouped about the axis of shaft 442 and adapted to contact cooperating switch points 453 of the stationary members 454 and 455 disposed on either side thereof. Members 454 and 455 are secured by screws 450 to the frame members 456 and 457, respectively, and are made of nonconductive material within which the contact points 453 are embedded. Contact points 453 are connected with the proper partial product solenoid leads, such as 128 (Figs. 77 and 77A). The arrangement is such that upon rotation of a shaft 442 all contact units 451 affixed thereto are rotated sufficiently to bring their spring tabs 452 into contact with their cooperating contact points 453 on insulated discs 454 and 455 so that directly thereafter, upon closure of the main switch 131 by cam 458 (Figs. 76 and 77), the respective partial product circuits are completed, and the solenoids controlled thereby are energized to eject stops and thus limit the stroke of the actuating elements associated therewith. The timing relationship between the complementary cams 343 for operation of gang switches 121 and the main switch cam 458 is such that the gang switches 121 are closed before the main switch 131 is closed, and the main switch 131 is reopened before the gang switches are reopened, as is indicated at 9 and 10 in Fig. 78, where the operating cycle is diagrammed. By thus timing the operation of main switch 131 it is possible to both close and open the various other switches in circuit therewith while the circuits are dead. All arcing will then be confined to the main switch 131 which may have connected in parallel therewith a condenser to prevent excessive arcing.

ACTUATORS

There is an actuator unit for each of the product or accumulator dials. In the machine of the present description there are sixteen. Each actuator unit is permanently arranged in cooperating position with its associated accumulator dial and can function, in a single operation, to transmit to its associated dial an amount equal to the sum of two digits. For example, if a multiplicand factor of 73 is multiplied by the digit 4, the product is 292 and may be written out as follows:

```
   73
    4
   ──
   12
   28
   ──
  292
```

The product digit 9 is the sum of the tens digit 1 of the product 12, resulting from the lower order multiplicand digit 3 times 4, and the units digit 8 of the product 28, resulting from the higher order multiplicand digit 7 times 4. The two product digits 1 and 8 are simultaneously transmitted to the accumulator dial by its associated actuator unit to thereby register a 9 digit. From the above it is obvious that each order of the actuator is controlled by two multiplicand orders simultaneously receiving the units digit of the product of the higher order and the tens digit of the product of the lower order. Thus in the following description the controlling partial product digits for an actuator order will be called the units partial product digit of the higher order and the tens partial product digit of the lower order. The above-referred to controlling partial product digits are those selected by the banks of partial product solenoids previously described, and the controlling means are the solenoid stops in each bank of solenoids, the stops ejected being those corresponding to the partial product digits.

It is only necessary that the highest order of the actuator be controlled by the tens partial product digit of the lower order and that the lowest actuator order be controlled by the units partial product digit of the higher order. Thus the sixteen actuating units are controlled by fifteen banks of partial product solenoids.

Fig. 22 shows a single bank of partial products solenoids 116 corresponding to one of the banks 116 shown in Figs. 77 and 77A and a single order of the actuator. Since each bank of solenoids controls the "units" registration in one order of the actuator and the "tens" registration in the actuator in the next higher order, the "units" spring leaf 505, which, in Fig. 22, appears to lie against the plunger 518 of the "0-units" solenoid shown, is really lying against the plunger 518 of the "0-units" solenoid in the next bank back of the bank shown, whereas, the "tens" spring leaf 504 is lying against the plunger 518 of the "0-tens" solenoid in the bank shown.

Fig. 21 shows how a single actuator order is controlled by two banks of solenoids. Thus the bank of solenoids on the right controls the "tens" spring leaf 504 and the bank of solenoids on the left controls the "units" spring leaf 505 of the same actuator unit. It should be noted that whereas in Fig. 22, the spring leaves 504 and 505 are shown in initial position against the "0-tens" and "0-units" stops, in Fig. 21 the leaves are shown moved against the stops of the 4-tens and 9-units solenoids in the two adjacent solenoid banks. The bank of solenoids shown to the right in Fig. 21 also controls the "units" spring leaf (not shown) of the next actuator order to the right and the bank of solenoids shown to the left also controls the "tens" spring leaf (not shown in Fig. 21) of the next actuator order to the left. Of course the leftmost actuator never registers units as its "tens" spring leaf is associated with the leftmost bank of solenoids. Conversely, the rightmost actuator never registers tens as its "units" spring leaf is associated with the rightmost bank of solenoids.

The use of a single arcuate bank of solenoids for each order of partial products actuator conserves space laterally of the machine. The arcuate length of each bank is reduced by making five solenoids control both the units spring leaf one actuator unit and the tens spring leaf of the adjoining actuator unit. This dual use of 5 of the solenoids is possible by virtue of the fact that the "tens" and "units" spring leaves 504 and 505 move toward each other from opposite ends of the solenoid bank and the greatest combined distance they will ever move is thirteen steps (when the partial product is 49, under which condition both spring leaves 504 and 505 (Fig. 22) will be stopped by the plunger of the 4-tens, 9-units solenoid). With all other possible two digit products of a single digit multiplicand and a single digit multiplier, the two spring leaves 504 and 505 controlled by any bank of solenoids will be stopped short of each other with at least one solenoid intervening.

Each actuator unit comprises two planetary compound gear trains. The planetary gear train selectively positioned by the solenoids representing the tens partial product digit of the lower order comprises a stationary gear 481 (Figs. 21 and 22), which is held against rotation by a stud 482 attached to machine bracing member 483 and engaging a slot 484 in gear 481. Gear 481 is supported by a sleeve 485 which surrounds transverse shaft 438. Enmeshed with gear 481 is the smaller of the two planetary gears 486 and 487 which are rigidly secured to each other to rotate in unison and are journaled in a bushing 488 carried by the arm 489, which arm is affixed to a sleeve 491 mounted freely rotatable on sleeve 492. To the left end of this sleeve 492 are assembled the two intermediate drive gears 493 and 494. The larger of the two planetary gears 486 and 487 meshes with a wide sun gear 495 which rotates about sleeve 496 to which is rigidly secured the arm 497. Said arm 497 carries a bushing 501, in which are journaled the two planetary gears 498 and 499 rigidly secured to each other to rotate in unison. The larger one of these two planetary gears meshes with sun gear 495, while the smaller gear is held in constant driving relationship with gear 494. Arm 489 is rotatably positioned in accordance with the tens digit of the lower order and arm 497 in accordance with the units digit of the higher order, to provide for which each of the two arms 489 and 497 has a lateral ear 502 and 503, respectively (Fig. 22), formed integrally therewith, to which is riveted an outwardly extending spring leaf 504 and 505, respectively. Spring leaf 504 is adapted to cooperate with the ejected pins 462 of solenoids representing the tens partial product digit of the lower order, while the leaf 505 is adapted to cooperate with the pins 462 which are ejected by the solenoids representing the units partial product digit of the higher order, as will be more fully explained hereinafter. The gear 493, which is secured to the companion gear 494, preferably by spot welding, is enmeshed with a drive gear 506. The latter is supported on a sleeve 500 which is rotatably mounted on a sleeve 508, forming a part of a disc 509 which is splined to the drive shaft 510 for rotation therewith. Disc 509 is equipped with an outwardly extending lug 511 normally held in contacting position with a stud 512 on gear 506, by a suitable torsion spring 513, which has one end attached to the stud 512 and the other end attached to the disc 509, as indicated at 514; thus a yieldable connection is provided between the drive shaft 510 and the gear 506, which will permit relative movement between these parts when, during actuation, the gear 506 is stopped by the ejected pins 462 of associated solenoid banks 116 and shaft 510 is completing its uniform excursion in counter-clockwise direction.

A transmission gear 515 mounted on shaft 516 serves to transmit digital values into the corresponding dial of the accumulator register 104 when the latter is brought into operative relationship therewith. A bail 517 is provided to centralize the transmission gears 515 during the time that accumulator register 104 (Fig. 1) is being brought into mesh therewith.

Bail 517 (Fig. 25) is supported on two arms 521 which are pivoted at 522 to suitable studs in the machine frame. The front side arm 521 (when viewing Fig. 25), has in its lowermost extremity an oblong slot through which projects a pin 523 carried by a cam follower 524, which is adapted to rock about shaft 525 when driven by a pair of complementary cams 526, which are given a complete rotation in the direction of the arrow by the main clutch 341 (Figs. 64 and 76). Thus, during the main clutch cycle, bail 517 is operated early in the cycle to disengage bail 517 from gears 515 and then rocked back to engaging position with respect to gears 515 at mid-cycle. The bail is again rocked out and back again during the last half of the main clutch cycle. The exact timing of this operation is readily understood when viewing the diagrammatic representation of the main clutch cycle as illustrated at 8, 12 and 14 in Fig. 78.

The arrangement is such that when, early in the operating cycle, the selected partial product circuits are completed by closure of the main switch 131 (Fig. 77), the plungers 513, of either the 0-tens solenoid or 0-units solenoid, or of both, are retracted in all the banks of solenoids 116 corresponding to orders into which partial product digits are to be entered, and the plungers 462 are ejected which correspond to the units and tens partial product digits. Shortly thereafter the bail 517 is rocked out of engagement with transmission gears 515, and the shaft 510 is rotated in counter-clockwise direction through approximately 360° and returned in clockwise direction to its initial position, during a cycle of the main clutch, by means to be hereinafter described. The counter-clockwise movement of shaft 510 during the first half cycle of main clutch 341 is imparted to the drive discs 509 and to torsion springs 513. In all those orders of the machine in which a zero plunger 518 is retracted, gears 506 are free to respond to the action of their respective springs 513 until stopped by ejected plungers 462 corresponding to the units and tens partial product digits. Counter-clockwise movement of a gear 506 will result in proportional clockwise movement of the two companion gears 493 and 494. This movement is transmitted to small planetary gear 493 in such a manner that, if sun gear 495 is locked against rotation (as would be the case if the plunger 518 of the associated zero tens solenoid has not been retracted), both planetary gears 498 and 499 will revolve orbitally around sun gear 495 in clockwise direction, resulting in displacement of their axis and consequently of their carrier arm 497 in the same direction, until the leaf 505 thereon encounters an ejected stop pin 462, thus stopping further rotation of arm 497 and associated actuating gears.

Shaft 510 will complete its rotation in counter-clockwise direction by virtue of the yieldable spring 513 interposed between the disc 509 and the gear 506. Therefore, in the above case, transmission gear 515 will have been advanced in clockwise direction a number of teeth corresponding to the value of the units partial product digit of the higher order. If the zero "tens" solenoid is energized, with consequent retraction of its plunger 518, and the zero units solenoid is not energized, its plunger remaining in blocking position, then upon rotation of gears 493 and 494 in the hereinbefore mentioned manner, both planetary gears 498 and 499 will rotate in counter-clockwise direction about their now fixed axis, which will result in sun gear 495 rotating in clockwise direction. Clockwise rotational movement of sun gear 495 results in movement of planetary gear 487 enmeshed therewith and, consequently, of companion gear 486. With gear 481 held against rotation by the frame stud 482, planetary gear 486 will orbitally revolve about gear 481 with the result that its carrier arm 489 will be displaced counter-clockwise. Such movement will continue until stopped by leaf 504 engaging that plunger 462 which is ejected as a result of energization of the particular solenoid which corresponds to the tens digit of the partial product of the lower order.

In case both the zero solenoids are energized, both carrier arms 497 and 489 will be free to rotate until stopped by ejected plungers, and gear 506 will rotate an amount corresponding to the sum of the rotation of both arms, thus advancing gear 515 an amount corresponding to the sum of the units partial product digit of the higher order and the tens partial product digit of the lower order.

Shortly following the angular advance of arms 497 and 489 in the manner described, drive shaft 510 is rotated back to its initial position, which returns planetary gear carrier arms 497 and 489 back to their initial positions in which they are shown in Fig. 22 of the drawings. This results in gears 506 and 515 being rotated back by the same number of teeth they were advanced during the first half of the reciprocating cycle of shaft 510. By bringing the accumulator register 104 (Fig. 1) into mesh with gears 515, either during their forward rotation or their return, values can be selectively transmitted into the register in either a positive or negative sense.

In the diagrammatic representation of the operating cycle of the machine in Fig. 80, it may be clearly seen what angular portions of the 360° of main clutch operation 8 are involved in the different functions taking place during said main clutch operation. These functions include the closure of the gang switches, the closure of the main switch, the operation of the bail 517, the dipping of the product register 104 into engagement with transmission gears 515, and the actuation of drive shaft 510. In Fig. 78 these functions are designed in their proper order by the numerals 8, 9, 10, 12, 13 and 14, respectively.

The means whereby drive shaft 510 is rotated in counter-clockwise direction and back to initial position is shown in Fig. 23. A pair of complementary cams 531 mounted on the sleeve 694 and secured to the driven portion of main clutch 341 (Fig. 76), are driven in the direction of the arrow (Fig. 23) in unison with main clutch 341. As shown in Fig. 76, cams 531, and several other cams described elsewhere in this specification, are keyed to sleeve 694 which is integral with the housing of clutch 341, and the cams are spaced on said sleeve by a number of spacers 694a. The unitary operation of this clutch is initiated by energization of the main clutch solenoid 305 (Figs. 64 and 77B) in the same manner in which the operation of shift clutch 316 is initiated, as has been described in connection with Fig. 17. As with the clutch there described, this action serves to couple the housing and sleeve 694 integral therewith to the constantly rotating shaft 344 for one complete rotation.

During each rotation of cams 531, cam follower 532, which is supported on shafts 520, is positively rocked first in counter-clockwise direction to a mid-cyclic position, as shown in Fig. 23, and back again to its initial and extreme clockwise position, in accordance with the timing chart in Fig. 80, operation No. 14. Cam follower 532 is equipped with an upwardly extending arm which terminates in a segment 533 adapted to drive shaft 510 and gears 506 thereon through the compound gear train comprising the gears 534, 535 and 536, the latter being keyed to shaft 510.

ACCUMULATOR REGISTER

From the foregoing description of the actuating mechanism, it will be apparent that numbers in excess of "10" may be entered into a given order of the accumulating mechanism via transmission gears 515 during a single cycle of operation and it is, therefore, necessary to provide accumulating and tens carry mechanism suitable for this type of operation. The accumulator, herein disclosed for the purpose, is of the type generally referred to as "duplexing" wherein the carrying operation may go on simultaneously with the introduction of amounts to be accumulated.

In the present embodiment of the machine, this function is accomplished by accumulator mechanism contained within the dipping but laterally non-displaceable register 104 (Figs. 1 and 27 to 31, inclusive).

The accumulator, or product, register 104 comprises in the present instance 16 units, one for each product order, which may be individually or collectively driven by the associated actuator transmission gears 515, for purpose of entering the partial product digits, each unit being interdependent with the mechanism of the adjoining units for purpose of the tens transfer. A series of brace plates 542 are mounted at even intervals, each having a lug 543 projecting through a spaced slot in the frame plate 544 and supported at the rear of the registering mechanism by an angular piece 544a attached to the frame plate 544, as shown. A lock spacing comb 545 extends through slots in each brace plate and is locked in place by a rod 546.

Supported in the brace plates 542, is a cross rod 547; this serves as a pivotal support for a series of plates 548, which are mounted on said rod 547 and adjacent to the carriage brace plates 542. Plates 548 are spaced and braced by comb 549 interlocking with slots in each plate 548, and held in place by rod 551. Plates 548 are interconnected at their rear ends by a common shaft 552, with spacers 553 interposed to hold the plates 548 in proper alignment with each other. By means of shaft 552, it is possible to oscillate all of the plates 548 simultaneously about shaft 547 during operation, as hereinafter described in connection with the dipping of the accumulator register into operative relationship with the actuator gears 515.

The accumulator units are assembled on a shaft 554 supported by plates 548, there being one of such plates 548 between each pair of adjacent units, so that each unit forms a separate assembly between two of said plates. Each unit is adapted to be driven by one of the actuator transmission gears 515 (see Fig. 24) when the accumulator mechanism is dipped (as will be hereinafter described) so that gears 555 are brought into mesh with gears 515. Gears 555 are rotatably mounted on shaft 556, which is supported by plates 548.

Since both the partial product digits and the tens transfer from the accumulator dial of the next lower order must be simultaneously entered into each accumulator dial, a planetary gearing arrangement is provided cooperatively associating each accumulator dial 564 with a gear 565 (Fig. 31) secured to the dial of the next lower order. This arrangement is described as follows:

Rotatably mounted on shaft 554 is a hub 559 to which is rigidly secured a spider 558 (Fig. 31). Spider 558 carries an internal ring gear 561 on its right-hand side, which is spot welded or riveted to the offset portion 562 of each of the spider arms. A right angular extension 563 on one of said arms projects to the right from said spider and slightly beyond the right side face of a thin shell 564 (which is fixed to the spider 558 and the internal gear 561 mounted thereon), and serves as a zero stop in resetting operations hereinafter described. The periphery of shell 564 has marked thereon the digits ranging from "zero" to "nine." Meshing with internal ring gear 561 are two planetary gears 577 which are mounted between two plates 572 and 575 and are rotatable on shoulder rivets 576 which secure the plates together. These plates 572 and 575 are secured to gear 557, thus forming a unit including plates 572, 575, planetary gears 577 and the gear 557. This unit is rotatably mounted on a sleeve 573 which, in turn, is rotatable about a sleeve 574. Sleeve 573 carries a sun gear 578 as an integral part thereof, with which planetary gear 577 also meshes; thus rotation may be simultaneously and independently imparted to ring gear 561 and attached numeral dial 564 by rotation of gear 557 (which is driven by the actuator) and by gear 578, which is driven from the dial of the next lower order by the following means:

Secured to the right end of the sun gear sleeve 573 is a spider 579 to which is secured a ring gear 581, the spider and ring gear being provided with four equally spaced lugs 582 which serve as stops, as will appear hereinafter. Rigidly secured to the end of sleeve 574 is an arm 583 which is equipped with a bushing 584 in which is rotatably supported a stub shaft 585 to which are fixed two planet gears 586 to 587. The planet gear 586 meshes with the internal gear 581 on spider 578, while the planet gear 587 meshes with the sun gear 565, which is rigidly secured to the dial of the adjacent lower order. Thus, rotation of a dial in a certain order will transmit rotation to the dial in the next higher order by an amount corresponding to the ten to one gear ratio of the train of gears 565, 587, 586, 581, 578, 577 and ring gear 561, provided that arm 583 which carries the planetary gears 586 and 587 is held from rotation about the axis 554, as will be hereinafter explained. Planetary-gear-carrying arm 583 is made rotatable through a limited angle about axis 554 to permit accurate alignment of the digits on the shells 564 with the sight openings 597.

Thus, from the above description of the tens transfer it is evident that unless means were provided to properly align the dials after completion of a problem, each dial would show up in the register advanced an increment of a digit corresponding to the amounts shown in the dials of the next lower orders. For example, if the resultant value entered is 2475, the first dial would stand .475 of the way from the "2" to the "3" registration. The second dial would stand 0.75 of the way from a "3" to a "4" registration, the third 0.5 of the way from a "7" to an "8" registration, and the fourth dial squarely at a "5" registration. Therefore, when the calculation is completed and the dipping register 104 is raised, it is desirable to back up each dial by the fractional amount it has been rotated beyond an even registration with the sight openings 597. This is accomplished in the following manner: The rear part of arm 583 is equipped with a segmental portion 589 meshing with teeth 591 (Fig. 30) formed on a rocking lever 592 pivoted to shaft 556, which is mounted parallel to the shaft 554 in the plates 548. Lever 592 has an ear 593 extending to the right through plate 548 to engage a lever 594 (Fig. 29) which is also mounted on shaft 556, but just to the right of plate 548 so as to cooperate with the next lower order accumulator unit. Lever 594 carries a roller 595 which operates against a snail cam 566, which is yieldably secured to spider 558 in the following manner: Cam 566 (Fig. 31) is secured on a sleeve 567, which sleeve is mounted for rotation about a cut-away portion of the sun gear 565. A lateral extension 568 on the spider 558 projects through an enlarged aperture 569 in the cam to permit limited movement of the cam with respect to the spider. A light coil spring 571, disposed around sleeve 567 and secured between the projection 568 and a stud 572 (Fig. 29) on the cam, urges the cam into the position shown in Fig. 29. This construction has the advantage that, under certain conditions during the dipping operation of registering mechanism 104, spring 571 may be temporarily overcome and the cam moved slightly without moving the rest of the functional unit just described. Lever 592 is urged clockwise (as viewed in Fig. 30) by spring 596 so that the roller 595 carried by lever 594 is pressed thereby into contact with the adjacent snail cam 566.

Figs. 29 and 30 show the snail cam 566, roller lever 594, segmental lever 592, and member 583 in the positions they occupy when the dial displays zero. It will be evident that if the dial was displaying a larger digit, roller 595 would contact cam 566 at a point of shorter radius, thereby resulting in roller lever 594 and segmental lever 592 standing in positions displaced clockwise from the positions in which they are shown in Figs. 29 and 30, and the upward extending arm 601 of segment 592 would be positioned closer to shaft 602 a distance dependent upon the size of the digit displayed by the register dial 564.

As the accumulator mechanism is rocked down about shaft 547 into its lower position for purpose of actuation, extension 601 strikes the shaft 602 thereby rocking the segmental lever 592 in a counter-clockwise direction until slot 603 at the upper end of extension 601 engages shaft 602, upon completion of the dip. In this position, segmental lever 592 has been rocked counter-clockwise just slightly beyond the position which it normally occupies when the dials to the right of it register zero, and roller 595 stands just slightly clear of the maximum radius of cam 566. Thus, if the dials to the right display zero, levers 592 are scarcely displaced by this operation. But if any dial displays a higher digit, the segment 592 in the next higher order is rocked counter-clockwise by an amount proportional to the digital value registered in the lower order, and, dipping of the accumulator mechanism results in rocking of segment 592, and carrier arm 583 geared thereto, and, through the gears 587 (Fig. 31), 586, 581, 578, 577 and ring gear 561, previously described, advances dial 564 by the same increment. In lowered position of segment 592, notch 603 therein rests over shaft 602, thus preventing movement of segment 592 and the carrier arm 583 associated therewith. The accumulator is now ready for an actuation cycle whereby each dial will be advanced simultaneously by the amount of the partial product digits through gear 587 and by an increment of one tenth the amount of movement of the dial in the next lower order, through the 10 to 1 planetary gearing, as previously described.

After actuation has been completed and before the accumulator has been raised, each dial will be in a position corresponding to the digits of the product as previously explained (with the example of a product value of 2475) and each of the snail cams 566 will also have been positioned according to the digit displayed by its associated dial 564.

As has been explained, segment 592 is locked in its extreme counter-clockwise position by shaft 602. Arm 594 is also in its extreme counter-clockwise position. As the accumulator is raised, segment 592 will be rotated clockwise by spring 596 until stopped by contact of roller 595 on arm 594 against snail cam 566, segment 592 being held from further rotation by the ear 593 resting against arm 594. Thus upon raising of the accumulator the segment 592 is rotated back an amount depending on the position of snail cam 566, and since the cam is positioned according to the dial in the next lower order, segment 592 is rotated back an amount proportional to the digit registered in the dial in the next lower order. As previously explained, rotation of segment 592 causes rotation of planet gear carrying arm 583, thus backing off dial 564 the fraction of a digit proportional to the digits registered in the lower order. Thereby the digits will be lined up and show in the accumulator register 104. If a dial and its associated cam has rotated more than a complete revolution, the dial in the next higher order will have advanced more than a digit, but when the accumulator mechanism is raised, the said higher order dial will be backed off a distance which corresponds to only that portion of the movement made by the snail cam in the lower order after it completed its first revolution; thus the advance due to a complete revolution will remain registered in the next higher order dial.

In order that the backing-off movement may be transmitted to the accumulator dial 564, it is necessary that digitation gears 557 be prevented from rotation when the accumulator mechanism is being raised. To this end means are provided to prevent movement of gears 557 except while values are being introduced during actuation. This means comprises spring pressed pawls 598 (Figs. 27 and 30) freely mounted on shaft 599, each of which is adapted to engage the associated intermediate gear 555 in each order. Means to be described are provided for releasing the pawls 598 during actuation.

*Dipping mechanism*

The means whereby the intermediate gears 555 may be brought into driving relationship with the transmission gears 515 (Fig. 24) includes the aforementioned dipping shaft 552. Suitably secured to shaft 552 at one or more points is a downwardly extending link 537 which is connected to the rearwardly extending and substantially horizontal arm 438 of a cam follower 439 pivotally supported on shaft 525. Cam follower 439 is provided with two rollers cooperating with the surface of a reversible cam 440 so as to effect positive movement of the follower. The cam 440 is so proportioned that upon movement thereof in the direction of the single arrow, the follower will be immediately rocked and the accumulator register 104 dipped to bring the gears 555 into mesh with gears 515 at the beginning of the actuating cycle, so that as the transmission gears 515 are rotated in clockwise direction by their actuators 506, the gears 555 will be meshed therewith and a registration will be effected during the first half of the cycle. At the end of the first half cycle, cam followers 440 are rocked back to their original positions, thereby raising the gears 555 out of mesh with the gears 515 before the latter are restored to their original positions by the actuator gears 506 during the last half of the actuation cycle. Thus no registration will be transmitted to the dials 564 (Fig. 31) during the return of transmission gears 515.

If cam 440 is rotated in the direction of the double arrow the condition is reversed and no movement of the follower 439 takes place during the first half of the cycle (while the transmission gears 515 are being rotated in clockwise direction an amount equal to the product digit to be registered). However, after clockwise movement of gears 515 has been completed, and while they are momentarily held stationary, further rotation of the cams 440 rocks follower 439 and causes the accumulator register to be dipped, bringing gears 555 into mesh with transmission gears 515 during the last half of the cycle while the transmission gears 515 are being returned (by rotation in counter-clockwise direction) to their original position; thus the accumulator dials are rotated in a negative direction an amount equal to the product digit to be registered. It is thus apparent that either additive or subtractive accumulation is possible and is determined by the direction of rotation of cam 440, which is controlled by a suitable reverse mechanism to be fully explained in connection with the operation of the addition and subtraction keys 102 and 103, respectively. By referring to Fig. 78, the timing relationship between the accumulator dipping operation 13 and actuation 14 may be better visualized.

As the accumulator register 104 is dipped by the means above described, the lower arms 615 of pawls 598 (Fig. 24) are brought against shaft 616, mounted in the frame, rocking the noses of said pawls out of engagement with the intermediate gears 555 to free them for operation.

*Clearing mechanism*

It may be seen from the foregoing description that if ring gears 581 (Fig. 31) are locked against movement while segments 592 (Fig. 30) are rocked, then carrier arms 583 and planetary pinions 586 and 587 will be rotated about shaft 554, tending to carry with them ring gears 581 and sun gears 565 (Fig. 31). If ring gears 581 are blocked from movement, planetary pinions 586 will roll inside the ring gears and cause pinions 587 integral with pinions 586 to transmit the entire movement to sun gears 565. To favor this movement, the gears 555 and 557 (Fig. 27) are freed from the braking action of pawls 598. Sun gears 565, being integral with spiders 558 and their attached numeral wheels 564, rotate same backwardly, toward the positions in which their zero digits align with the sight openings 597. If a stopping means be placed in the path of lugs 563 carried on said numeral wheels to prevent them from being driven beyond zero position, the braking pawls 598 may be restored to operative position and the lock withdrawn from ring gears 581, leaving the numeral wheels 564 aligned in zero position. To accomplish this the following means are provided:

Keyed upon shaft 599 (Fig. 28) which is supported in plates 548, are rocking levers 606. Shaft 599 is rocked in clockwise direction in the resetting operation, and resultant movement of each rocking lever 606 thereon is tranmitted to a pawl 598 (through a lateral projection 607 thereon (Fig. 27) which may be engaged by the associated lever 606) to free gears 555.

Lever 606 also acts to lock the ring gears 581 and place zero stops for the numeral wheels. For this purpose it is provided with an extension 608 engaging the fingers 609 of lever 611 mounted on shaft 556, so that, upon clockwise rocking of lever 606 lever 611 is rocked in a counter-clockwise direction and lateral projection 612 thereon is placed in a dial-stop position. The lateral projection 612 is of sufficient width to engage the zero stop projection 563 on the dial assembly as well as to engage one of the four projections 582 on the ring gear 581, and limit the former against movement past zero position during clearing of the accumulator, thus providing the above mentioned stopping means. Rebound of the dials is prevented by a pawl 613, which is yieldably secured at 610 to the lever 611 and engages the opposite side of projection 563 from that engaged by projection 612.

The dials are returned to zero position by mechanism comprising lateral projections 614 on each lever 592, which are engaged by extensions 615 on pawls 598, to rock levers 592 counterclockwise on shaft 556 against the pull of spring 596. Segmental levers 592 rock arms 583 and planetary pinions 586 and 587 about axis 554, Since ring gears 561 are locked, and gears 555 are free to rotate, planetary pinions 586 and 587 drive sun gears 565 to rotate spiders 556 and their attached numeral wheels 564 backwardly to the position in which the zero digits align with sight openings 597.

The shaft 599 and lever 609 are then rocked counter-clockwise, by appropriate means, to remove projections 612 and 613 from cooperative relationship with lugs 563. This permits pawls 589 to reset between the teeth of gears 555 and permits the segmental levers 592 to return under tension of springs 536 until the roller 595 engages the periphery of snail cam 536 and further movement of segmental lever 592 is blocked by engagement of lug 593 thereon with the roller-carrying lever 594.

The clockwise rocking of shaft 599 to effect clearance of the accumulator register in the manner above described is arranged to take place upon the depression of accumulator clear key 113 as follows:

A clutch 1600 (Fig. 28A) is mounted on shaft 1601, which is constantly rotated during motor operation. This clutch may be of the well-known ratchet and dog type, previously mentioned, in which a spring pressed dog within the clutch engages a ratchet keyed to shaft 1601 whenever clutch release dog 1602 is rocked clear of the clutch, thereby causing the clutch to rotate with shaft 1601 until again de-clutched by clutch release dog 1602 upon completion of a revolution. Clutch release dog 1602 is normally held in engagement with clutch 1600 by means of spring 1603 and is arranged to be rocked clear of the clutch in response to depression of accumulator clear key 113, by the action of an ear 1604 on the key stem 1605. This ear 1604 presses down on the forward arm of a lever 1606 thus rocking it in a counter-clockwise direction on its pivot 1607, and, through a stud and fork connection, rocking clutch release dog 1602 in a clockwise direction on its pivot 1608, thereby rocking dog 1602 clear of the clutch 1600 and causing the clutch to engage shaft 1601 for a full revolution therewith.

Integral with clutch 1600 is a cam 1610 arranged to cooperate with roller 1611 on lever 1612, which is pivotally mounted on stud 1608, and carries at its upper end another roller 1613 arranged to cooperate with lever 1614 keyed to shaft 599. Roller 1611 normally lies opposite the portion of lowest radius of cam 1610, so that as the clutch rotates, the roller 1611 is gradually forced to the left, thereby rocking lever 1612 in a counterclockwise direction on its pivot 1608 and forcing roller 1613 against the lower portion of lever 1614, and rocking shaft 599 in a clockwise direction to effect a clearance in the manner previously described.

After the high point of the cam passes under roller 1611, lever 1612 is permitted to recede, and lever 1614 gradually returns to its normal position under the tension of a spring 1615, which is tensioned between an ear 1616 on the lever 1614 and shaft 552 of the accumulator.

SUMMARY OF MULTIPLICATION OPERATION

The details of operation of the various elements of the machine involved in multiplication having been described, a complete multiplication operation will now be summarized:

The factor keys are first depressed to successively set up different digits of the multiplicand in the multiplicand register 106. Depression of any factor key 101 (Fig. 2) rotates one of the transverse slotted shafts 168 to 175. These shafts extend through the traveling set-up carriage and actuate the arms 182 in the carriage, which arms are slidably keyed on the slotted shafts.

The arm 182 that is rotated, shifts the appropriate stop lever 194 of the leftmost multiplicand set-up section, with which the traveling carriage is initially alined. Actuation of any stop lever 194 causes it to shift the arcuate release lever 217 (Fig. 5) to release pawl 214 from the nose 213 on the segmental lever 211, whereupon the latter is spring rotated counter-clockwise until nose 213 engages and is stopped by the stop lever 194 that was actuated. The movement of segmental lever 211 actuates the leftmost dial in register 106 to visibly indicate the first number set up, and also shifts the brush 231 (Fig. 6) carried thereby into contact with the particular contact 236 corresponding to the first multiplicand digit.

The movement of nose 213 in the first section of the set-up mechanism also releases the blocking lever 252 (Fig. 2) in that section, which in turn releases the carriage detent 255 and permits the carriage to be moved to the right into the next order where it is stopped by the blocking lever 252 in that order.

The shift switch is initially in position to connect the first 7 orders of the multiplicand selection switches to the lowest 7 orders of the bank of partial product solenoids, so that the first-order multiplicand selection switch 118 is connected to the 9th order (I) solenoids bank associated with the 9th order of the accumulator register (Figs. 16A and 77A). However, when the set-up carriage was released and shifted into the second multiplicand order, the segment 302 (Fig. 17) rotated with the carriage shift segment 241 to move the shift switch one step, thereby connecting the first (A) order multiplicand selection switch 118 to the 8th (H) order solenoid bank which is associated with the 8th or H order of the accumulator register.

The foregoing operations are repeated until all the multiplicand digits are set up. They are not only displayed in the multiplicand register 106 but are "stored" by the multiplicand selection switches 118 which retain their settings during the ensuing operation.

Next the multiplication key 105 (Figs. 1, 2 and 33) is depressed, (assuming the multiplicand contains less than 8 digits), which rotates shaft 192 and the snail cams 367 thereon to displace the zero digit stop levers 194 in all the orders of the multiplicand set-up mechanism, thereby disengaging the pawls 214 from segments 211 in all multiplicand orders and rocking all the blocking levers 252 in all the unset orders of the multiplicand, thereby shifting the set-up carriage into the first order of the multiplier set-up mechanism and simultaneously shifting the shift switches 119 to associate the eight multiplicand selection switches 118 with the first 8 orders of partial products solenoid banks. This same operation takes place automatically without depressing the multiplication key if the multiplicand is an eight digit number.

*Multiplying operation*

At the completion of the multiplicand registering operation, the multiplicand is displayed in the multiplicand register 106 and the multiplicand selection switch brushes 231 (Fig. 77A) are set according to the numbers set up, but the partial products circuits are open at the multiplier gang switches 121 and the contact 131 (Fig. 77).

Next, the factor set-up key corresponding to the first digit of the multiplier, is depressed, setting up this digit in the multiplier register and shifting the leftmost multiplier selection brush 391 (Fig. 77B) onto the particular contact 392 corresponding to the digit set up.

Previously, movement of the traveling carriage into the first multiplier order moved sliding contact member 395 of the multiplier shift switch to the left onto the leftmost contact 393 thereby connecting lead 403 associated with the first order multiplier selection brush 391 to the positive side of the current supply line. At the completion of movement of the A order brush 391 onto the proper contact 392, leaf 405 associated therewith closes on contact 404, thereby completing connection from the positive line to the particular one of the multiplier solenoids 424 corresponding to the first order multiplier digit and thence through the associated relay 425 and the main clutch solenoid 305 to the negative side of the current supply line.

As previously pointed out, the multiplier selection switches in successive sections are set up as fast as the traveling set-up carriage reaches successive sections, and the factor keys are depressed, but each multiplier circuit is only completed through the shiftable contact member 395 which does not shift until multiplication by each multiplier digit has been completed. The only purpose, therefore, of employing the plurality of multiplier selection switches A to H, inclusive (Fig. 77B) is to permit of "holding" the digit in each order of the multiplier as it is set up, until multiplication of the multiplicand by the digits in all orders of the multiplier have been completed, the shiftable contact member 395 permitting the different switches to become effective to select the appropriate multiplier solenoid I to IX, inclusive, one at a time.

Energization of the particular multiplier solenoid 424, corresponding to the first digit of the multiplier, ejects the plunger of this solenoid (Figs. 35 and 36), causing the associated shaft 442 to be rocked as the plate 437 is rocked clockwise by cams 343 on shaft 344, as the latter is rotated in response to energization of the main clutch solenoid 305. Rocking of the selected shaft 442 closes all of the particular gang switches 121 (in all 15 banks of the solenoids 116) corresponding to the digit in the first order of the multiplier, and directly thereafter the main switch 131 (Fig. 77) is closed by cam 458, thereby completing the partial products circuits corresponding to all digits of the multiplicand and the first digit of the multiplier.

Because of the position of the shift switch, the partial products circuits energized are those associated with the leftmost group of orders in the accumulator register. These partial products circuits function in a manner already clearly described to multiply the entire multiplicand by the first digit of the multiplier and display the product in the accumulator register. If this product contains the same number of digits as the multiplicand, the product will be displayed from left to right in the accumulator register with the first order of the product in the second or A accumulator dial (Fig. 16A). If this product contains one more digit than the multiplicand, it will be displayed with the leftmost product digit in the leftmost accumulator dial.

Near the end of the main clutch cycle which instituted the first multiplication cycle described, the shift switch is actuated by closure of contacts 659 (Fig. 77B), which completes an energizing circuit from the positive line over conductor 427, normally closed contacts 600 and 960 of switch 956, contacts 659, normally closed contacts 661 and 663 of the addition and subtraction key switch, through a winding on the shift solenoid 306 to the negative side of the line. Actuation of the shift switch associates the multiplicand selection switches 118 with a new group of partial products circuits one order lower, and shifts the contact member 395 of the multiplier shift switch one step to the right, thereby conditioning the system of multiplication of the multiplicand by the second digit of the multiplier.

The second digit of the multiplier may have been entered prior to completion of the first multiplication cycle; if not, the machine waits for such entry. If so, a circuit is immediately completed through the second order (B) multiplier selection switch 391, the multiplier solenoid 424 and relay 425 corresponding to the value of the second multiplier digit, and the main clutch solenoid, to energize the proper partial products circuits to multiply the entire multiplicand by the second digit of the multiplier and add the product in orders of the accumulator register one order lower than the previous product was registered.

Should the second multiplier digit be zero, there is of course no calculation to be performed and the shift solenoid 306 is energized through the zero digit contact of the multiplier selection switch to condition the machine for multiplication of the multiplicand by the third digit of the multiplier, without energization of the main clutch solenoid 305 and, therefore, without instituting a main clutch cycle.

The foregoing operations are repeated until the product of the multiplicand and the last digit of the multiplier has been added into the accumulator register and the calculation is completed. At this time the complete product is displayed in the accumulator register, the multiplicand is still displayed in the multiplicand register, and the multiplier is displayed in the multiplier register.

The machine may then be restored to normal condition by depressing the clear keys 112 and 113 to institute clearing operations, as previously described in detail.

ADDITION AND SUBTRACTION

In performing problems of addition the number to be added is first set up by depression of keys 101, as previously described for the multiplicand set up. This number is then added into the accumulator register 104 by depression of the addition key 102 which causes the number set up to be multiplied by one and entered into the accumulator register 104 after which the set up mechanism is automatically cleared. The second number to be added is then set up in a similar manner and added into the accumulator register 104 by again depressing the addition key 102. This process is continued until all the numbers have been added into the accumulator register 104. Problems of subtraction are performed in a similar manner except that after setting up the subtrahend the subtraction key 103 is depressed, which in addition to the above function, controls means whereby the accumulator mechanism operates in a negative direction and thereby subtracts out the last number set up.

Successive addition must take place in the correct decimal relationship and means to be described are provided for this purpose.

The addition key 102 and the subtraction key 103 (Figs. 1, 40 to 43) are provided for the purpose of affording manual control of the means whereby the above is accomplished.

After the number to be added or subtracted has been set up, depression of the addition key 102, or the subtraction key 103, will result in closing an electrical circuit through the number "I" (Fig. 77B) multiplier solenoid 424 and the main clutch solenoid 305, which will result in closure of the number "1" multiplier gang switch 121 (Fig. 77), and main switch 131, and cause an actuation cycle whereby the number set up will be added into or subtracted from the accumulator register 104.

After a number has either been added into register 104 or subtracted from a value in said register, a single clear clutch operation is automatically instituted to return the selection mechanism and the factor or check dials 216 in register 106 back to their initial positions.

*Addition and subtraction keys*

The addition key 102 and the subtraction key 103 (Figs. 40 and 43) are mounted for limited downward sliding movement upon frame studs 621 projecting through an appropriate oblong slot 622 in key stems 623 and 624, respectively. A spring 625 tensioned between the upper frame stud 621 and an ear 626 integral with each of key stems 623 and 624, tends to normally maintain them in their raised positions.

Key stems 623 and 624 are each provided with a laterally extending lug 627. The lug 627 of key stem 623 is disposed above a shoulder in the upper end of an interponent link 628 (Fig. 41), and the lug 627 of key stem 624 is disposed above a shoulder in the upper end of a similar link 629. These links 628 and 629 are pivotally connected at their lower downwardly extending ends to supporting arms 631 and 632 respectively. Arm 631 is freely rotatable about the shaft 192 (Figs. 2 and 41), and arm 632 is freely rotatable about the shaft 179, which serves as a supporting axis for each of the multiplicand and multiplier selection switch units, as related hereinbefore. An ear 633 on the forward part of each of the two rocking arms 631 and 632 is provided for attachment of springs 634 which springs tend to hold arms 631 and 632 in contacting position with stop pins 635. Each of the two rocking links 628 and 629 is individually spring biased to counter-clockwise direction by a suitable spring 636 tensioned between a stud 637 and an ear 638 on each of arms 631 and 632. Thus, links 628 and 629 are constantly maintained in engagement with the ears 627 for operation thereby.

A bar 641 is mounted for horizontal downward and rearward movement upon linkage comprising connecting arms 642 and 643 which are rotatable about shafts 192 and 179 respectively. The arm 643 is equipped with a downwardly extending portion carrying a lug 644, and attached thereto is a spring 645, which urges the entire unit counter-clockwise into position where the upper edge of bar 641 will tend to press against studs 637 on links 628 and 629.

As stated hereinbefore, both keys 102 and 103 must, when depressed, effect closure of circuits which will first result in energization of the number 1 multiplier solenoid 424 and main clutch solenoid 305, followed, after actuation of those solenoids, by energization of clear clutch solenoid 646 (Fig. 77B). Means are, therefore, provided which will function to operate a multiplier contact switch 647 for this purpose. Upon depression of one of said keys 102 and 103, arm 643 (Fig. 41) is rocked clockwise in response to downward pressure upon bar 641 by either of the pins 637. Ear 644 of arm 643 operates against a roller-carrying arm 648 mounted freely rotatable on the same shaft 179 on which link 643 is pivoted. A roller 649 on arm 648 is normally disposed to rest upon a shelf 650 integral with an arm 651, which is secured by screws 652 to a switch block 653 of non-conductive material. Block 653 is rockable about shaft 654 and is urged clockwise by a torsion spring 655 into its normal position, in which it is illustrated.

Switch-operating arm 648 is independently spring urged to its position against ear 644 by the torsion spring 630 in order to prevent the possibility of incorrect functioning of these parts, as well as to permit separate operation of said arm 648 when the dividend key 108 (Fig. 47) is depressed, as will appear hereinafter in connection with the description thereof.

From the foregoing it is apparent that depression of either key 102 or 103 (Fig. 41) will result in counter-clockwise movement of switch block 653 through the action of the respective interponent links 628 and 629, bar 641, linkage 642 and 643, ear 644, arm 648, roller 649, shelf 650 and arm 651.

Rigidly attached to the upper face of block 653 is a contact leaf 656 provided with a contact 680 which is connected to the positive supply line 110 through lead 657, lead 400 (Fig. 77B), switch 428, and lead 427. A second contact leaf fastened to the bottom face of block 653 is provided with two contacts 661 and 662, and may also be connected with the positive supply line 110 during main clutch operation, as will be described hereinafter, by means of connections comprising a lead 640, the cam-operated switch 659, lead 658, switch 660, and finally the lead 427. Contact 661 is normally held against contact 663, which is in circuit with the shift solenoid 306 previously referred to.

The switch arrangement is such that upon depression of either of the two keys 102 or 103, arm 651 is rocked counter-clockwise (Fig. 41) an amount sufficient to open contacts 661 and 663, thereby opening the circuit to the shift solenoid 306; close contacts 666 and 680 to complete the circuits to the number I multiplier solenoid 424 and main clutch solenoid 305; and close contacts 662 and 665 to partially complete but not close the circuit to the clear clutch solenoid 646, final closure of which is made by the cam-operated switch 659 upon completion of the actuation cycle more fully described below. By reference to Fig. 77B it will be observed that the movement of contacts 661 and 662 has the effect of connecting cam operated switch 659 to clear clutch solenoid 646 instead of to shift solenoid 306, so that when switch 659 is automatically closed near the end of the main clutch cycle, as described under "Multiplying operation" above, it will now serve to engage the clear clutch, instead of engaging the shift clutch, as it does during multiplication.

Operation of switch 647 thus results in energization of the number I multiplier solenoid 424 and main clutch solenoid 305, and as previously explained the number to be added or subtracted is multiplied by one and added to or subtracted from the accumulator register 104. Due to the fact that the clear clutch solenoid 646 (Fig. 77B) includes in its circuit the normally open switch 659, this circuit has not been completed by closure of the double switch comprising the contact points 662 and 665, and the clear clutch solenoid 646 has thus remained unenergized.

As has been described in connection with the shift operation in multiplication, means are provided which will function near the end of each main clutch cycle to automatically close switch 659. With switch 653 set for addition or subtraction, however, this acts to complete the circuit partially completed by contacts 662 and 665 to the clear clutch solenoid 646. To this end cam 668 is secured to the driven side of main clutch 341 on sleeve 694 integral therewith (Figs. 26, 76, and 77B). The contour of this cam is such that when the main clutch has nearly completed its cycle, the cam 668 closes switch 659, retaining it in such closed position until clear clutch solenoid 646 (Fig. 17) is energized and has retracted its plunger 669 and forced clutch dog 671 to disengage from the housing of clear clutch 348 to permit coupling of the driving and the driven elements within said clutch 348 for a single rotation. Near completion of such a single rotation of clear clutch 348, the strong tension spring 673 forces dog 671 to re-enter the housing of said clutch and disengage the drive therefrom in the manner fully covered in the United States Patent No. 1,643,710 to Friden, to which reference has been made hereinbefore in connection with the description of the shift clutch 316 (Fig. 17), which is identical in construction and function with both the main clutch 341 and the clear clutches 348 and 1600.

The clear clutch 348 functions to return the multiplicand set-up mechanism, including the set-up carriage 186 and selection switches 118, to their initial positions, and to return movable member 290 of the shift switch 119 to its initial position. Since the clear clutch does not operate until near the end of the main clutch cycle, it is necessary to provide means which will function upon depression of either of the two keys 102 or 103, and independently thereof, to maintain the two switches comprising the contacts 680, 666, and the contracts 662, 665, respectively, closed until the clear clutch solenoid has been energized to start operation of the clear clutch.

This is accomplished by a latch 675 (Fig. 41) which depends from a pivot point at 676 and is urged clockwise, into contacting position with a lateral ear 677 of bar 641, by a suitable spring 672. The moment bar 641 is rocked downwardly, latch 675 is immediately free to respond to the action of spring 672 to bring its shoulder 678 on top of ear 677, to thus retain the entire mechanism controlled by bar 641 in operative condition in which the two switches, comprising the contacts 680, 666, and 662, 665, respectively, are held closed, and the switch comprising the contact points 661, 663 is held open. This condition prevails until the above enumerated automatic functions have taken place, and the shaft 179 is rocked clockwise as a consequence of a clear clutch operation. This operation functions in the present instance to not only disengage latch 675 from ear 677 but to also forcibly disengage both of the links 628 and 629 from the ears 627 of the associated key stems 623 and 624, so as to limit an addition operation to only a single main clutch operation, and a single clear clutch operation, irrespective of continuous pressure exerted on the depressed key 102 or 103.

The mechanism that will positively operate during each clear clutch cycle to unlatch the three members 628, 629, 675 is illustrated in Fig. 42. It comprises a slide bar 679 slidably mounted on the same pins 681 on which the bar 641 is supported. Slide bar 679 is equipped with three upwardly projecting fingers 682, 683 and 684. The rightmost finger 684 has a lateral ear 685 which is disposed in front of latch 675; while the two other fingers 682 and 683 are disposed in front of the pins 637 of interponent links 628 and 629, respectively. The arrangement is such that when the shaft 179 is given a uniform excursion in clockwise direction during the clear clutch operation (in a manner to be fully described hereinafter in connection with clear key 112), an arm 686, keyed to the shaft 179, will engage lateral lug 687 of slide bar 679 and will force this bar to the right (when viewing Fig. 42) which movement will cause simultaneous disengagement of interposed links 628 and 629 from the ears 627 of their associated key stems 623 and 624, and disengagement of latch 675 from the ear 677 of bar 641. Thus, all the parts controlled by bar 641 will be able to respond to the action of their respective springs 634, 645 and 655. The action of spring 655 will serve to break the electrical connections made by contact points 680 and 666, and by contact points 662 and 665, and re-establish the electrical connection with shift clutch solenoid 306, by reclosure of the switch contacts 661 and 663, as soon as the restraining influence of roller 649 has been removed from the shelf 650 of arm 651.

*Operation of shift switch*

Before proceeding further with the description, it will be briefly related how the shift switch 119 operates during problems involving successive addition or subtraction as instituted by depression of one of the keys 102 or 103. Its operation during the setting up of numbers to be added or subtracted is the same as during the setting up of the multiplicand in multiplication, but in the present instance the set-up carriage and shift switch are not permitted to advance through the unset orders as is done prior to setting the multiplier, in multiplication.

It will be noted, when referring to Fig. 16A of the drawings, that the shiftable member 290 of shift switch 119 is at the limit of movement to the right when in its initial position, to which it has been power-restored after each computation. In setting up any number the digits are set up successively always starting with the highest order digit. Upon depression of the first key 101 (Fig. 1) movable switch member 290, composed of sections 283, is advanced one step to the left in the direction of the single arrow (Fig. 16A), to where the leftmost section A, which always corresponds to the highest order digit, is brought into operative relationship with the eighth section H of the stationary part 271. Upon depression of the second key 101, member 290 is again advanced by one step to where the leftmost section A is advanced to cooperate with section G of part 271; and section B of part 290, corresponding to the second digit set-up, is in position to cooperate with the eighth stationary section H of part 271. It is thus evident that upon introduction of the various numbers, the digit in the lowest decimal value of each number is always set up last and the section of movable switch part 290 corresponding thereto will always be in the position to cooperate with the eighth stationary section H of part 271, while the section A of movable part 290 corresponding to the highest order of the number is always displaced to the left an amount in accordance with the number of digits contained in the particular number, as is clearly illustrated in Fig. 16A.

For instance, in considering the first number "570" listed under "Successive addition" at the bottom of Fig. 16A, it will be noted that the section A of part 290 corresponding to the highest order digit "5" is displaced three steps to the left into the hundreds position; that section B corresponding to digit "7," the second highest decimal value in this number, is displaced two steps to the left and into the tens position; and section C corresponding to "0," the lowest decimal value set up, namely, the units order, is displaced one step to the left into the units position.

The digits of the three numbers listed below the numeral "570" in Fig. 16A, are set up in the same manner and in each case the switch section, corresponding to the digit of the units order, is always in position to cooperate with the eighth section H of stationary shift switch part 271. As previously described, each section of stationary switch part 271 is connected to a particular bank of partial product solenoids; for example, the eighth stationary switch section H is connected to the eighth bank of partial product solenoids and always functions to control the entry of a partial product into the 9th dial H of the accumulator register 104 (Fig. 16A). Thus, in addition problems, the last digit set up in each number is always entered into the 9th order (from the left) accumulator dial H.

After each number has been set up by depression of corresponding factor keys 101, as described, the operator must depress the addition key 102, if it is desired to add the amount into accumulator register 104, or the subtraction key 103, if it is desired to subtract the amount out of accumulator register 104. Irrespective of which of the two keys is depressed, such depression is always followed by an operation of main clutch 341 and an operation of clear clutch 348. Operation of the clear clutch 348 causes shaft 179 to rock a uniform amount in clockwise direction and this rocking of shaft 179 is accompanied by similar rocking movement of lever 346 (Fig. 17) and engagement of segments 241 and 302, in their displaced positions, by the ear 347 of lever 346, with consequent return to their initial positions, in which they are illustrated. By virtue of the cooperative relationship existing between segment 302 and shift switch 119, the movable member 290 thereof is also power restored to its initial position in the direction of the double arrow (Fig. 16A) so that it is in position to set up the next number.

Subtractive operation controls

As stated hereinbefore, depression of the subtraction key 103 causes a reversing clutch to be conditioned to control the operation of the dipping mechanism in order that values may be transmitted into the product register 104 in a negative sense.

The dipping mechanism, as illustrated in Fig. 24, is controlled by the cam 440. Rotation of this cam in the direction of the single arrows brings the gears 555 into mesh with the actuator transmission gears 515 at the beginning of the actuating cycle, resulting in positive digitation; whereas rotation of cam 440 in the direction of the double arrow results in the gears 555 being brought into mesh with transmission gears 515 when the actuator has reached midcycle position and is about to commence its return movement back to initial position, thereby effecting negative digitation as has been fully described in connection with the dipping mechanism.

The direction of rotation of cam 440, therefore, determines the timing of the dipping operation and consequently the additive or subtractive character of operation. To accomplish this, a selectively settable reversing unit 691 is provided, as shown in Figs. 43 to 46, inclusive, whereby the direction of rotation of cam 440 may be controlled.

As shown in Fig. 76, this reversing unit is mounted coaxially with main clutch 341, receiving power therefrom through the coupling 692. Referring to Fig. 44, the unit proper has a central sleeve 693 driven by the hollow shaft 694 (Fig. 76). Integral with sleeve 693 is a driving clutch plate 695. Notched drive discs 696 and 697 are rotatably mounted on sleeve 693 on opposite sides of plate 695, disc 696 having a gear 698 fixed thereto, and disc 697 having a gear 699 fixed thereto. Means are provided for independently driving either disc 696 or 697 by the driving clutch plate 695. For this purpose, clutch plate 695 has pivoted thereto at 701 a lever 702 (as shown in Figs. 43 and 45), said lever 702 being formed with offset ends, each of which is provided with an integral dog 703, one of said dogs being adapted to engage with a notch in the periphery of disc 696, and the other dog being adapted to engage with the notch in the periphery of the disc 697. Thus, when one of the dogs 703 is in engagement with the notch in disc 696, the driving connection is established between plate 695 and disc 696, and thence to gear 698; when the other dog 703 of lever 702 is in engagement with the notch in the periphery of disc 697, the driving connection is established between plate 695 and the disc 697, and thence to gear 699.

The driving connection between the dipping cam 440 and the two aforementioned gears 698 or 699 is established through intermediate gears 704 and 705 (Fig. 76). The gears 704 and 705 are integrally formed with each other and therefore rotate in unison about the shaft 706, and are affixed to the dipping cam 440 by means of the coupling 707. If the gear 699 is engaged to be driven by the plate 695, movement is transmitted to cam 440 in clockwise direction through gear 704; whereas if the gear 698 is engaged to be driven by plate 695, movement is transmitted to cam 440 in the opposite direction thereto through idler gear 706 and gear 705. Thus by selective rocking of the control lever 702, the direction of rotation of cam 440 and the additive or the subtractive character of operation of the machine are determined.

Selecitve engagement of disc 696 or disc 697 by the respective dogs 703 of lever 702 is obtained by means of a reverse control assembly shown in Fig. 43. It comprises a lever 709 pivotally mounted on shaft 711 and having offset arms 712 and 713 adapted to engage studs 714 and 715 on the offset ends of dogs 703 and thereby rock lever 702 to selectively engage either of the dogs 703 with the notch of its cooperating disc 696 or 697. An upwardly extending arm 715 on lever 709 is provided with a pin 716 embraced by a bifurcated lever 717, which is pivoted at 718 in the machine frame and is adapted to be rocked about its pivot by a link 719 (Figs. 40 and 43) connected to its upper end. The opposite end of link 719 is pivotally connected at 721 to a pendular lever 722, which is freely rotatable about a stub shaft 723 assembled in the machine frame (not shown). A spring 720, tensioned between the upper extremity of lever 717 and a stud 724, normally maintains the reversing unit in its additive position and returns it to such position after a subtractive operation.

As shown in Fig. 40, the subtraction key 103 controls the reversing unit just described by means of a bellcrank lever 725 pivotally mounted on a pin 726. The substantially horizontal arm of said bellcrank 725 underlies ear 627 on the subtraction key stem 624, while the downwardly extending arm of bellcrank 725 is disposed in front of a lateral lug 727 on the link 719. Thus, upon depression of the subtraction key 103, link 719 is moved to the right, thereby rocking levers 717 (Fig. 43) and 709 to move the lever 702 of the reversing unit to subtractive position.

The reversing unit will be maintained in its subtractive position for one complete cycle, even though the subtraction key 103 be released. This is due to the fact that the disengaged dog 703 will immediately move away from its respective notch in disc 696 or 697, when the reverse unit commences to rotate, and it therefore is not opposite said notch so that reversal could take place until the cycle is completed, except for an instant at the middle of the cycle when the notch and dog pass each other traveling in opposite directions, at which time studs 714 and 715 of lever 702 are removed from control arms 712 and 713 so that no force can then be exerted to cause a reversal. At the conclusion of such an operation with the subtraction key 103 released, the entire control mechanism will be returned to initial, i. e., additive, position by spring 720.

In addition to its function of positioning the reverse unit upon depression of the subtraction key 103, the link 719 also acts to interlock keys 102 and 103 to prevent simultaneous depression thereof. For this purpose the pendular lever 722 (Fig. 40) is provided with an arm 728 having a notch 729, which is engaged by the ear 627 upon depression of the addition key 102, thus locking link 719 against movement. Inasmuch as the lateral lug 727 is disposed directly behind the downwardly extending arm of bellcrank 725, the latter is also prevented from rocking counter-clockwise, thus blocking subtraction key 103 from being depressed. Conversely, with the subtraction key depressed, link 719 is displaced rearwardly with counter-clockwise movement of pendular lever 722 about its pivot 723, with the effect that the upper edge of arm 728 is brought directly below the ear 627 on addition key 102, locking the latter against depression.

SUMMARY OF ADDITION OPERATION

In "addition," the digits of each number to be added are set up one at a time in the multiplicand register by successively depressing the proper factor set-up keys 101, as described in multiplication, but after setting up each number, the addition key 102 is depressed.

This opens the circuit to the shift solenoid 306 (Fig. 77B) at contacts 661 and 663 on switch 647 (thereby preventing movement of the shift switch during the main clutch cycle following) and closes a circuit from the positive line over lead 427, normally closed contacts 428 of division key 109, lead 400, contacts 680 and 666 of the addition switch 647, lead 410 and lead 423, through the (I) multiplier solenoid 424, its associated relay 425, and the main clutch solenoid 305 to the negative line; instituting a main clutch cycle to multiply the number in the multiplicand register by 1 and thereby enter it into the accumulator register.

Near the end of the main clutch cycle cam 668 (Fig. 77B) on main clutch 341, closes contact 659 to complete the actuating circuit of the clear clutch solenoid 646, which circuit was previously partially completed by closure of contacts 665 and 662 of the addition key switch 647. Actuation of the clear clutch solenoid 646 results in a clear operation, as previously described in detail, which restores the multiplicand set-up mechanism and the shift switch to their initial positions and releases the operating mechanism from the control of the addition key, thereby restoring the various parts to normal and conditioning the machine for the insertion of the next number to be added.

It is important to note that whereas in multiplication, depression of the multiplication key 105 automatically actuates the shift switch to enter the product of the multiplicand by the first digit of the multiplier into the leftmost or highest order of the accumulator register, in addition, depression of the addition key 102 does not actuate the shift. Therefore the last digit of the number entered into the accumulator register always appears in the (H) dial of the accumulator register (Fig. 16A), and a series of numbers to be added are always automatically registered in proper orders in the accumulator with respect to the decimal point.

Succeeding numbers to be added are entered by repeating the procedure described for the first number, each new number being multiplied by 1 and added into the accumulator dials so that the accumulator register always shows the sum of the numbers that have been entered.

At the completion of the problem the accumulator register may be restored to normal by pressing the clear key 113, which institutes a clearing operation, as previously described in detail.

SUMMARY OF SUBTRACTION OPERATION

In subtraction, the various digits of the minuend are set up in the multiplicand register by successively depressing the proper factor set-up keys 101 and then depressing the addition key 102 exactly as described under addition. This will be obvious from consideration of the fact that numbers can be set up in the accumulator only as the result of operation of the partial product circuits and therefore any number to be entered into the accumulator register must be multiplied by 1.

After entering the minuend, the subtrahend is set up in the multiplier register 106 by depressing the proper factor keys, and thereafter depressing the subtraction key 103. This multiplies the subtrahend by 1 and enters it into the actuator mechanism exactly the same as the number would be entered therein in addition, the switches that control these operations being actuated by the subtraction key 103 in the same manner they are actuated by the addition key 102.

However, the subtraction key, when depressed, performs the further operation of conditioning the dipping mechanism to engage the actuator gears 515 (Fig. 24) with the accumulator register gears 555 during the return or "negative" movement of the latter instead of during their initial "positive" movement so that the actuator gears 515 drive the register gears 555 in reverse direction, thereby subtracting the subtrahend from the number (the minuend) previously set up in the accumulator register. More specifically, the depression of the subtraction key 103 shifts the bellcrank lever 725 (Fig. 40) counter-clockwise, shifting link 719 to the right and rocking levers 717 (Fig. 43) and 709, whereby lever 709 rocks lever 702 counter-clockwise to disengage the right dog 703 from disc 697 (Fig. 44) and engage the left dog 703 with disc 696. This causes the sleeve 694 (which is driven through the main clutch 341) to rotate gear 698, which rotates gears 705, through direction-reversing idler gear 706, in reverse direction, to rotate the dipping cam 443 in counter-clockwise direction (Fig. 24), thereby dipping the accumulator register gears 555 into engagement with the actuator gears 515 during the latter part of the main clutch cycle, at the time when the gears 515 are returning to normal, or zero position.

The reversing lever 717 is automatically returned to normal (adding) position by release of the subtraction key 103. The clearing operation takes place automatically at the end of the subtraction cycle, exactly as described under the addition operation, by energization of the clear clutch solenoid 646 by the contacts 659 controlled by the main clutch.

FACTOR DIALS CLEAR KEY

Upon depression of the factor dials clear key 112 (Figs. 1 and 49), an electrical circuit is closed through the clear clutch solenoid, which institutes a unitary cycle of the clear clutch. Such operation results in an automatic clearance back to initial position of the various elements associated with the multiplicand and the multiplier set-up mechanisms.

The elements returned to initial position in response to depression of clear key 112 include: the multiplicand selection switches 118 and the factor dial register 106 set thereby, the multiplier selection switches 391 and the multiplier or quotient dial register 107 set thereby, all selective stops 194 in both multiplicand and multiplier orders, the traveling set-up carriage 186 (Fig. 2), the shift-switch 119, the slidable multiplier control switch brush 395 (Fig. 77B), and the dividend sensing lever carriage 731 (Fig. 50) to be described hereinafter. The mechanism whereby the above enumerated parts are restored will be fully explained hereinafter in connection with the mechanical representation thereof in Figs. 1, 2, 17, 49, 50 and 77B.

As fully illustrated in Fig. 49, clear key 112 is slidably mounted on frame studs 732. A spring 733, tensioned between the upper stud 732 and a lug 734 integral with the key, tends to maintain the clear key in its raised position, as shown. Lug 734 normally overlies a shoulder 735 on an interponent switch operating lever 736, which is pivotally secured at 737 to a substantially horizontal rocking arm 738 and is constantly urged to engage with lateral lug 734 by the tension spring 739. Rocking arm 738 is pivoted medially at 741 and is spring tensioned counter-clockwise by a spring 742. A roller 743 made of non-conductive material is disposed beneath the flexible contact leaf 730, which is secured to the fixed terminal block 746 of switch 745. The upper contact leaf 740 (also secured to terminal block 746) is connected with the positive supply line 110 via the lead 747, while the lower contact leaf 730 completes the circuit by way of lead 420 through the clear clutch solenoid 646 (Fig. 77B).

Depression of key 112, therefore, closes switch 745, resulting in energization of clear clutch solenoid 646 (Fig. 17) which, as previously described, releases dog 671 from the clear clutch 348 for a single cycle of rotation. Rigidly secured to the housing of clutch 348 is a cam 748, which is adapted to cooperate with the two rollers 749 of a cam follower 751 for positive rocking movement thereof about the axis 674. An upwardly extending arm 752 on said follower 751 is connected, by means of link 753, to the hereinbefore described lever 346 keyed to shaft 179. Rotation of cam 748 results in lever 346 being positively rocked through approximately one-half of a turn in clockwise direction, which causes ear 347 on lever 346 to restore segments 241 and 392 back to their initial position, in which they are illustrated in Fig. 17. Return of segment 241 back to initial position causes simultaneous and equal rotation of the worm shafts 188 and 189 through the medium of the two compound gear trains comprising the gears 245, 246, 247, 248 and 243, and the gears 245, 246, 249, 251 and 244, respectively. The extent of rotational movement of shafts 188 and 189 is such that set-up carriage 186 is fully returned to its leftmost position in line with the highest multiplicand set-up order. Likewise, return of segment 392 back to the position in which it is shown in Fig. 17 fully restores the movable member 299 of shift switch 119 to its initial, i. e., extreme counter-clockwise position, in which it is shown in Figs. 2 and 15.

As related hereinbefore in connection with the description of the multiplier selection mechanism, member 396 (Fig. 50) and brush 395 carried thereby are adapted to be laterally displaced by the worm shaft 397, by virtue of the driving relationship between segment 392 and the intermediate gears 388, 389, 390, 389 and 387. Thus, whenever segment 392 is restored by the clear clutch 348, brush 395 is also restored to its initial position directly to the right of that contact block 393 in circuit with "H" multiplier selection switch 391.

Inasmuch as segment 392 is also entrained with gear 308 (Fig. 50) and the latter is adapted to drive the worm shaft 757 through intermediate gears 758, 759, 761, 762 and 763, the worm shaft 757 will be rotated to such an extent that the dividend sensing lever carriage 731, will be returned to its initial position in line with the three leftmost dial units of product register 104, as will appear hereinafter in connection with the dividend sensing operation.

Since lever 346 is keyed to the shaft 179, the rocking of this lever by clear clutch 348, as just described, results in shaft 179 being similarly rocked, first through approximately one-half a turn clockwise (as viewed in Figs. 2 and 17), and then back to its initial position. Keyed to the shaft 179 in each order of the selection set-up mechanism is a selection clear lever 754, which includes a lateral extension 755 adapted to engage the tip 213 (Fig. 5) on the corresponding segmental lever 211 and return same to its initial position, as an incident to the clockwise rocking of shaft 179. During this clockwise clearance stroke of levers 754 the lateral extensions 755 thereof engage the corresponding ejected stop levers 194 (Fig. 2) and wipe them back to their initial positions. This normalizing of stop levers 194 permits the return of pawl release levers 217 (Fig. 5) and the return of pawls 214 to their operative positions, ready to re-engage the noses 213 of segmental levers 211 when restored to their normal positions. Each lever 211, during its restoring movement, engages ear 254 of carriage blocking lever 252 (Fig. 7), thereby bringing the downwardly extending arm 261 into blocking relationship with point 255 (Fig. 69) which, as previously described, is so arranged as not to interfere with leftward, i. e., return movement of the carriage 186, but to block rightward movement thereof.

Means are provided in the construction of the clear key mechanism to limit the operation of the clear clutch 348 to a single cycle of rotation even though the operator may inadvertently continue to hold key 112 depressed.

To this end, there is connected to lever 346 (Fig. 49), by pivot 764, a link 765, which as a slot 769 at its forward end. A stud 766 on the upper end of a lever 767, which is pivoted to the machine frame at 768, operates in slot 769 and projects outwardly therefrom to where it is firmly held, by the stem of clear key 112, in operating position against the upper extremity of interponent lever 736. The arrangement is such that when lever 346 is power rocked in clockwise direction by the clear clutch, link 765 is pulled to the right into engagement with stud 766 and thereby rocks link 736 in clockwise direction sufficiently to disengage shoulder 735 thereon from ear 734 on key 112, thereby freeing link 736, which responds to the tension of spring 742 and returns to its raised position, in which roller 743 on the forward end of arm 738 has moved downwardly until stopped against stop 750, thus opening the contact 744 of switch 745 and de-energizing clear clutch solenoid 646. As soon as the operator releases key 112, lug 736 thereon will again move into position for cooperative engagement with the shoulder 735 of lever 736, ready for the next clearance operation.

DIVISION

General description

Heretofore, to the best of my knowledge, calculating machines of the partial product type have always employed a division mechanism which entailed a series of subtractive operations from the dividend set up to reduce the same to a value below that of the divisor.

The division mechanism of the present invention is designed to perform automatic division by directly estimating each quotient digit, and then subtracting the product of the estimated quotient digit times the divisor from the dividend in the accumulator register, in accordance with usual "long division" procedure.

This method of division is particularly applicable to partial products machines in that it takes full advantage of the inherent characteristics of such machines by permitting the subtraction of the product of the divisor by each estimated quotient digit in a single partial products operation.

In the present machine, division is performed by setting up the dividend in the multiplicand selection mechanism, as previously described for the multiplicand set-up, and then depressing the dividend key 108 (Fig. 1), to be described later. This results in shifting the carriage through the unset dividend orders, closing the No. 1 multiplier circuit, transmitting the dividend into the accumulator register and automatically restoring the multiplicand set-up mechanism to initial position. The divisor is then set up, resulting in closure of the multiplicand selection switches 113 (Fig. 77A) in accordance with the divisor digits selected, and rotation of factor dials 216 of register 106 to display the divisor digits. Subsequent depression of the division key 109 will then institute a process of division, outlined hereinafter, by which each digit of the quotient is determined and registered in the quotient register 107 (Fig. 1).

Theory of quotient determination

The direct determination of each quotient digit is accomplished by (1) sensing the dividend and converting the sensing to movement in logarithmic proportion to the dividend; (2), similarly sensing the divisor and converting it to a logarithmic movement; and (3), subtracting the latter movement from the former, giving a movement in logarithmic proportion to the quotient digit, which may then be sensed. By sensing the quotient movement with any desired degree of accuracy up to one-half digit high, a working margin may be secured which will insure that the remainder left in the accumulator dials will always be less than the divisor, but will result in overdrafting in certain instances, which overdrafting can be corrected by a selective restoration stroke.

The principle of logarithmic comparison employed will be familiar to users of the slide rule, since the graduations of the slide rule are placed in logarithmic spacing, and division is performed on the slide rule by subtracting the distance corresponding to the logarithm of the divisor from the distance corresponding to the logarithm of the dividend, the difference corresponding to the logarithm of the quotient.

In Fig. 52 the same type of relationship is illustrated in graphic manner. The figures on the vertical line "D" represent the dividend as appearing in accumulator register 104, those on the vertical line "S," the divisor as appearing in register 106, and those on the vertical line "Q," the quotient as appearing in register 107. Any straight line intersects the three vertical lines at readings corresponding to the simultaneous positions that the three sets of mechanism assume in the working out of any problem. For instance the line 771 indicates the solution of the problem 40÷5=8.

It will be noted that the extreme range of the divisor, as indicated on line "S" is from 1 to 10, which, neglecting the effect of the decimal place which is separately taken care of, provides for all possible divisors. The divisor, as shown on line S, thus represents the divisor digit set up on the leftmost check dial 216 (Fig. 1) corrected by one or more dials to the right. Correcting off to one order to the right only, would subdivide the space between two digits on scale "S" into ten logarithmic steps in accordance with the second digit of the divisor, while correcting off a third order, would similarly subdivide each of these subdivisions in accordance with the third digit of the divisor, thus giving a very accurate representation of the logarithmic size of the divisor. The divisor does not go below 1, since the first significant digit cannot be less than 1, and goes up to approximately 10, since the highest possible first digit "9," corrected by the two orders to its right may be increased to 9.99 or substantially to 10.

As noted in Fig. 52 by the lines marked "units" and "tens" to the left of vertical line "D," two comparators are used, the lower comparator receiving its dividend setting primarily from the accumulator dial operatively associated with the highest digit of the divisor (the second dial of the accumulator register 104 during the initial cycle of division), and the higher comparator receiving its dividend setting primarily from the next accumulator dial to the left (the extreme left, or first, dial of the accumulator register, in the initial cycle of division). In the embodiment of the present invention the dividend value introduced into the lower comparator is corrected in accordance with the reading of one product dial to the right, while that introduced into the higher comparator is corrected by the two dials to its right.

The dividend digits, as recorded on the vertical line "D," are expressed with a decimal value corresponding to the use of the same decimal place as used in recording the divisor digits. That is, the dividend digits 1 to 9 in the "lower comparator" range, correspond to the digits on the particular dial of the accumulator register that is operatively associated with the highest digit of the divisor, and the dividend values 1 to 9 in the "higher comparator" range, correspond to the digits on the next dial to the left thereof. Unless otherwise specified, when reference is made to an accumulator dial "operatively associated" with a divisor digit, the dial referred to is the one the "units" actuator of which is controlled by the solenoid bank associated (through the shift switch) with the divisor digit mentioned.

Whereas, on a true logarithmic scale the distance from 1 to 0 is infinite, the logarithmic conversion mechanism hereinafter described is so arranged as to give truly logarithmic movement from 10 down to 1, but to so depart from the logarithmic proportion below 1, that in dropping from 1 to 0 the mechanism moves the same distance as in dropping from 2 to 1. Therefore the range of each of the dividend mechanisms and the quotient mechanism is shown as extending below its respective unity position by the same distance that separates 1 from 2 on its scale. It is to be understood that the movement below unity does not enter into logarithmic comparison, but it is indicated in order to properly locate the position that the mechanism assumes when a "0" digit is involved.

It will be noted that the highest quotient digit in combination with the highest divisor digit requires the highest dividend value in the higher comparator (Fig. 52), while similarly the lowest quotient and divisor digits in combination require the lowest dividend in the lower comparator. However, if the entire range of dividend digits is employed in combination with the entire range of divisor digits, the resulting quotient range is logarithmically some three times the usable quotient range. The highest figure on the lower comparator, which is substantially 10 (or the lowest significant figure 1 on the higher comparator) spans the active quotient range with the active divisor range, the extremes of the dividend range, combined with the opposite extremes of the divisor range, giving rise to ranges of quotients both above and below the active range.

As hereinafter described, each of the dividend, divisor, and quotient mechanisms are limited to move within their 0 to 10 range, being so designed that when the quotient would normally lie outside the 0 to 10 range, either the dividend or divisor mechanism will be displaced so as to permit the quotient mechanism to remain at the limit of its active range.

The quotient sensing mechanism moves in to sense both of the comparators simultaneously, and is so arranged that it is controlled by the largest digit appearing on either of the quotient mechanisms. If the dividend includes a digit to the left of that operatively associated with the highest order of the divisor, that digit (functioning in its proper decimal relation with respect to the divisor, and controlling the higher comparator) will always give a larger quotient than will the digit operatively associated with the highest order of the divisor, when compared against that same divisor by the lower comparator. The higher comparator, being in this case the one that takes into account the highest significant figure of the dividend, will give the correct quotient, and (since if there is a significant figure in the accumulator to the left of the divisor, that quotient estimate will always be larger than the one shown by the lower comparator), it will under such circumstances always control.

When, however, the digit of the dividend immediately to the left of the order operatively associated with the highest order of the divisor is "0," the lower comparator, actuated by the digit in the order operatively associated with the highest order of the divisor should control, and since the higher comparator with its dividend mechanism in its "0" position may give a higher quotient reading than the lower comparator (due to the fact 0 on the higher comparator corresponds to 5 on the lower comparator), it becomes necessary to disable the sensing from the higher comparator when its dividend dial is at "0." For instance, if the problem were 2÷1, which problem is represented by line 1700 of Fig. 52, the higher comparator would be unable to assume a position corresponding to this line, because, as previously described, the downward movement of the dividend mechanism in that comparator has been arbitrarily limited to the level indicated as 885 in Fig. 52, which corresponds to a digit of 5 in the lower comparator. Therefore the line 1701 represents the closest approximation that the higher comparator can assume to the line 1700, actually corresponding to the division 2÷1. For this reason the higher comparator would erroneously indicate a quotient digit of 5, as shown by line 1701, if it were allowed to function. This digit being greater than the quotient 2 indicated by the lower comparator, would control, were not provision made otherwise.

As described hereinafter, it is arranged to normally hold the divisor sensing mechanism in or somewhat above its 10 position, and to let it in against its actual sensed position at the time of comparison. Furthermore, the divisor sensing mechanism includes two separate comparators cooperating, respectively, with the higher and lower order dividend sensing mechanisms and in the higher order comparator the dividend sensing mechanism controls a latch such that if the tens digit of the dividend is "0" the latch prevents the divisor mechanism of the higher order comparator moving out of its "10" position or out of such higher position as may be chosen. With the higher order divisor sensing mechanism held so high, the quotient mechanism associated therewith can be made to always display 0, as indicated by line 883 (Fig. 52) in the present instance.

In order to briefly explain why two dividend sensing mechanisms are employed and to provide a background for the detailed description of the division mechanism which follows, it may be well to compare the operation that would be obtained in a simple division problem if only a single dividend order were sensed, with the operation obtained wherein two dividend orders are sensed. Consider first of all the operation that would be involved if the single comparator employed were to correspond to the higher comparator herein disclosed, which comparator is primarily positioned in accordance with the digit appearing in the order of the dividend register immediately to the left of that operatively associated with the highest order of the divisor. Even though the value thus sensed is proportionately corrected for the one or more orders immediately to the right, in case the leftmost of the dials sensed was set at zero, extremely accurate mechanical construction would be required to obtain any accuracy from the machine. This is for the reason that the entire range of digits displayed by the next dial to the right (associated with the highest order of the divisor and which is shown in Fig. 52 as the lower comparator range), would correspond to only one-tenth of a turn displacement of the next higher dial, and each digit change of this lower order dial would then correspond to only one-hundredth of a turn displacement of the leftmost dial being sensed. If the first digit of the divisor is in the vicinity of 1 this small displacement should give an entire digit change of the quotient, but obviously it is too small a displacement to give practical results.

On the other hand if a single comparator, the equivalent of the lower comparator only, were employed (always comparing the highest divisor digit against that order of the accumulator operatively associated with it, and entirely neglecting the reading of the next higher dial of the accumulator), we would get totally erroneous results in the next order of operation following that in which any step of division left a significant remainder digit in the highest order previously sensed. For instance, consider the problem 575 divided by 5

5/575/115
5
—
7
5
—
25
25

In the first cycle, the divisor 5 would be compared with the first digit 5 of the dividend, the quotient digit of 1 estimated and the operation carried out correctly with no remainder resulting from this step. In the next cycle the divisor 5 would be compared against the second dividend digit 7, correctly estimating a quotient digit of 1 and leaving a remainder of 2. In the third cycle, the division digit 5 would be compared against the third dividend digit 5, and (since without a higher comparator there would be no means of taking account of the remainder of 2 and making a comparison against the number 25, instead of the number 5), the comparator would estimate a dividend digit of 1 instead of the correct dividend digit of 5.

However, by sensing dividend digits in two successive orders simultaneously during each cycle, and having the higher order sensing mechanism control in all instances except when the higher order digit sensed is zero, such errors are avoided.

The first dividend digit is normally set up in the second accumulator dial (the first dial normally having a zero setting), and the higher comparator initially senses the first accumulator order and the lower comparator simultaneously senses the second order, so that the lower comparator makes the first comparison between the divisor and the dividend.

Thus in the example $$\frac{5445}{5}=1089$$

the dividend 5445 is set up in the second, third, fourth and fifth orders of the accumulator in a manner that will be explained in detail later and will appear in the accumulator register as 05445. The machine will sense the first three digits 054 appearing in the accumulator register and the higher comparator will remain inactive because the first digit sensed is zero. The lower comparator will be set at 5.4 and the divisor comparator will be set at 5, giving the first quotient digit of 1 and shifting the machine into the second division cycle to next sense the second, third and fourth orders of the accumulator register containing the digits 044 (the first 5 of the dividend having been subtracted out and replaced by a zero).

In this second division cycle, the first digit sensed is again zero and the higher dividend comparator will again be inactive. The lower comparator will be set at 4.4 which of course is less than the divisor 5 and a zero quotient digit is registered in the quotient register and the machine is shifted into the third division cycle.

In the third division cycle the third, fourth and fifth orders in the accumulator register (containing the digits 445) are sensed, and since the first digit sensed is 4 the dividend mechanism of the higher comparator will be set at 4.45, and will control to sense the third quotient digit of 8, which is then multiplied by the divisor 5, and the product 40 subtracted from the first two of the three accumulator dials sensed, leaving a remainder in the accumulator of 00045. The machine is then shifted into the next order for the fourth division cycle.

In the fourth division cycle the fourth, fifth and sixth accumulator dials are sensed containing the digits 450, the higher comparator controls with a dividend setting of 45 and the last quotient digit of 9 is sensed, completing the proper quotient of 1089. The machine then multiplies the divisor 5 by the last quotient digit 9 and subtracts the product 45 from the fourth and fifth dials of the accumulator register, leaving zero remainder in the accumulator dials. This completes the problem.

It may facilitate obtaining an understanding of the ensuing description, by keeping in mind the following rules, some of which will be apparent from the description so far, and all of which will become more clearly apparent as the operation of the machine is explained in greater detail:

1. Only the lower comparator is effective in any sensing operation in which the first of the three dividend digits sensed is zero (the expression "dividend" as here used refers not only to the true dividend which is set up in the accumulator dials initially, but also to the remainder during the division problem, which remainder always appears in its entirety in the accumulator dials).

2. Whenever the first of the three dividend digits sensed is a significant figure, only the higher comparator is effective.

3. If the first of the three dividend or remainder digits sensed is zero, and the second of the three digits sensed (as corrected by the digit to the right), is larger than the first divisor digit (as corrected by the two digits to the right), a significant quotient digit is determined by the lower comparator; the product of the first divisor digit (corrected by the digits to the right) and the quotient digit is less than 10 and is subtracted from the second of the three dividend digits sensed.

4. If the first of the three dividend digits sensed is zero and the first digit of the divisor (as corrected) is larger than the second of the three dividend digits sensed (as corrected), the lower comparator will be effective but will always give a zero quotient, thereby shifting the shift switch and sensing carriage into the next lower order, under which condition the higher comparator will (in the next cycle) sense the same dividend digit previously sensed by the lower comparator and will yield a significant quotient digit which, when multiplied by the first digit (as corrected) of the divisor, will yield a 2-digit product which will be subtracted (by virtue of the shift intervening since those digits were sensed by the lower comparator) from the first two of the three accumulator digits sensed.

DIVIDEND KEY

In a division problem the first step is to set up the dividend in the accumulator register 104. When this is done by the direct setting in of the dividend digits as described below, the highest order digit will appear in the second dial from the left marked A in Fig. 16A, the lower order digits appearing to the right thereof in their proper order.

The dividend digits are set up in the multiplicand selection switches 118 (Fig. 77A) in the same manner as described under "Multiplicand set up." As previously described, the traveling set-up carriage 186 (Fig. 2) and movable member 290 of shift switch 119 are shifted after each digit is set up. Means must be provided, however, to shift the carriage and switch through remaining unset orders. After the above set-up is made the dividend key 108 (Figs. 1 and 47) is depressed. This, as will be fully described, initiates means whereby the shift switch 119 will be operated through any remaining unset orders, followed by (1) transmission of the dividend set up into the accumulator dials, and (2) a clearance operation to clear everything back to normal with the exception of the dividend which will remain in the accumulator register 104.

To accomplish the above, the first function of the dividend key is to position the shift switch 119 so as to connect the selection switches 118 (Fig. 77A) to the leftmost, i. e., highest order, group of partial products solenoids, which cooperate with the highest actuator orders, so that upon subsequent energizing of the number one multiplier solenoid the dividend will be transmitted to the proper accumulator dials as outlined.

The dividend key 108 (Fig. 47) is slidably mounted on frame studs 996 and is provided near its lower extremity with two right angular projections 997 and 998. Projection 997 overlies link 357 which is supported for downward and forward movement on the two parallel levers 358 and 359, hereinbefore described in connection with the operation of the multiplication key 105 (Fig. 33). The other right angular projection 998 of dividend key 108 is adapted to be engaged by a latch 999 upon depression of said key. Latch 999 is pivotally secured to the forwardly extending end of a rocking lever 1001, and is constantly urged into latching position by a tension spring 1002. Rocking lever 1001 is rotatable about the shaft 179 and is normally maintained in its initial position, in which it is shown in Fig. 47, by the spring 1003. A lateral extension 1004 of lever 1001 engages the rearward face of switch-operating lever 648, which has also been previously described in connection with the addition and subtraction keys 102 and 103 (Fig. 41). A torsion spring 630 always tends to maintain switch operating lever 648 against this lateral extension 1004 of lever 1001, but permits lever 648 to yield in clockwise direction when operated by the addition or subtraction keys 102 or 103. The entire unit, comprising the parts 999, 1001, and 648, is constantly urged counter-clockwise by the tension spring 1003, but is limited in this movement by the stop pin 1006. Spring 1003 is of sufficient tension to overcome the action of torsion spring 630 upon lever 1001, when switch operating lever 648 is rocked clockwise by the ear 644 of link 643 (Fig. 41) during depression of either the addition key 102 or of the subtraction key 103, as has been explained hereinbefore.

Upon depression of the dividend key 108, bar 357 is rocked downwardly, and, by virtue of pin 361 on the forward end thereof, lever 363 (see also Fig. 33) is rocked counter-clockwise about shaft 179. Inasmuch as the bifurcated lever 366 (Fig. 33), keyed to shaft 192, is held in engagement with the pin 365 of rocking lever 363, this counter-clockwise movement is transmitted to shaft 192. Rocking of shaft 192, as thoroughly explained in connection with the multiplier key 105, results in the release of shiftable set-up carriage 186, permitting it to travel through remaining unset order of the multiplicand (or dividend) set-up mechanism, and into the first and leftmost multiplier selection order, where it is prevented from further lateral shift movement by the release lever 252 (Fig. 32) in that particular order.

As previously described in connection with the multiplier key, the movable member 290 (Fig. 2) of shift switch 119 is shifted simultaneously with the set-up carriage so as to be properly positioned when the set-up carriage has reached its first multiplier position. As the set-up carriage is being spring-escaped into the first multiplier order, the gate 377 (Figs. 33 and 69) is forcibly rocked upwardly due to projection 384 on the forward end of the carriage frame plate 185 (Fig. 32), moving over the camming surface 385 (Fig. 69) of said gate 377. This upward movement of gate 377 is designed to return lever 363, shaft 192, bar 357 and dividend key 108 to their initial positions.

From the construction of the latch 999, as described above, it is evident that immediately upon depression of dividend key 108, latch 999 is free to respond to the action of its spring 1002 to engage lateral projection 998 on the lower extremity of dividend key 108. Thus, when the dividend key is forcibly returned to its raised position, as just described, latch lever 999, being engaged with lateral projection 998 thereof, is pulled upwardly against the tension of spring 1003, and levers 1001 and 648 are therefore rocked clockwise an amount sufficient to operate the multiple switch 647.

Referring to Fig. 77B, operation of switch 647 will result in the closure of contacts 662 and 665, closure of contacts 680 and 666, and opening of contacts 663 and 661. Closure of contacts 680 and 666 completes an energizing circuit to the No. 1 multiplier solenoid 424, and the main clutch solenoid 305, which may be traced from the positive supply line 110 to the negative supply line 129 by way of the conductor 427, contacts 428, leads 400 and 657, contacts 680 and 666, leads 410, 423 and 426. The partial product circuits conditioned in accordance with the value of the dividend digits set up are completed by closure of the No. 1 gang switch 121 (Fig. 77) as a result of the main clutch operation, and the dividend is multiplied by one and transmitted into the accumulator register 104 (Fig. 1) in the manner hereinbefore explained.

Closure of the contacts 662 and 665 resulting from operation of switch 647 partially establishes but does not close a circuit to the clear clutch solenoid 646. This circuit is completed by switch 659, which, as mentioned hereinbefore, is closed by cam 668 (Figs. 76 and 77B) near the completion of the main clutch operation. Swith 647 must therefore be held in its operated position until the clear clutch has been engaged to operate and perform its various restore functions.

The disengagement of the latch 999 from the ear 998 of dividend key 108 has therefore been made entirely automatic in its function, and can only be accomplished through the action of the clear clutch itself. When the main clutch has nearly completed its cycle, cam 668 (Fig. 77B) closes the switch 659, thus completing the previously conditioned clear clutch solenoid circuit from the positive side of the supply line 110 to the negative side of the supply line 129 through the electrical connections 427, 600, 658, 659, 640, 662, 665, 667 and 420. The clear clutch solenoid 646, when thus energized, institutes a clear clutch operation which, among its other functions, described fully hereinbefore, results in normalizing of the multiplicand selection mechanism through the rocking of the clear levers 754 (Fig. 47). As will be recalled, these levers are keyed to shaft 179 and are given a uniform excursion in clockwise direction during each clear clutch cycle. Operation of one of these levers 754 also serves to disengage latch 999 from the ear 998 of dividend key 108. As illustrated in Fig. 47, latch lever 999 is provided with a forwardly extending arm 1005, which is designed to be held in the operating path of tip 755 of a clear lever 754 when the latter is rocked clockwise as a result of a clear clutch operation, thus causing the latch lever 999 to be rocked clockwise about its pivot and be disengaged from the ear 998 of dividend key 108. Immediately thereupon, through tension of spring 1003, the entire switch operating unit comprising parts 999, 1001 and 648 is restored back to its initial position, in which arm 1001 abuts against stop pin 1006 and allows switch 647 to return to its initial position, as shown in Fig. 47.

From the above description, it is evident that depression of the dividend key will result in operation of the shift switch 119 through unset orders followed by closure of the No. 1 multiplier solenoid circuit, whereby the dividend set up will be multiplied by one and entered into the accumulator register 104, followed automatically by a clear clutch cycle which clears everything back to normal with the exception of the register 104 which will retain the dividend set up.

DIVISION KEY AND INITIATION OF DIVISION OPERATION

The divisor digits are set up in the multiplicand selection switches 118 in the same manner in which the dividend digits were set up previously thereto, except that no divisor digit should be set into the rightmost dial of the multiplicand register 106 (for reasons hereinafter mentioned), meaning that the particular machine illustrated would have a working capacity of seven divisor digits. Thereafter the division key 109 is depressed (Figs. 47, 70, 72 and 77B), which functions to escape the set-up carriage 186 (Fig. 2) through the remaining unset orders of the multiplicand set up mechanism and to initiate the division cycles, whereupon the divisor is successively multiplied by the logarithmically predetermined quotient digits, and the dividend reduced by subtraction of the resultant products therefrom.

Depression of the division key 109 institutes a cycle of operations in the highest order of the dividend, which is automatically repeated in each consecutive order thereafter until the final operation is either automatically terminated in the last order, or is terminated by depression of the stop key 111.

Each division cycle includes all or part of the following series of operating cycles in the sequence listed: (1) a program clutch operation during which an estimated quotient digit is logarithmically determined; (2) a main clutch cycle during which the divisor is multiplied by the quotient, and subtracted from the dividend; (3) a second program clutch operation during which an overdraft is sensed, and a selective plus stroke produced in the event an overdraft has occurred; and (4) a shift operation into the next lower order where the same round of operations is repeated.

*Division key*

The division key 109 (Figs. 47 and 70) is mounted for limited sliding movement on two frame studs 1008, and is normally held in its raised position, as shown, by a suitable spring 1009 which is tensioned between the upper frame stud 1008 and a lateral ear 1011 on the lower extremity of the key stem. Ear 1011 overlies the bar 357, and is adapted to impart downward pressure upon said bar when the division key 109 is depressed, in order to escape the set-up carriage 186 and the shift switch 119 through the remaining unset divisor orders, as described hereinbefore in connection with the dividend key 108 (Fig. 47), and, as will be described later, to shift the dividend sensing carriage into position to sense the first three orders of the accumulator dials.

To initiate the division operation, division key 109 is provided with a rearwardly extending lug 1010 which carries a pin 1012 (Figs. 70 and 72). This pin overlies the stem 1013 (Fig. 72) which is pivotally supported on the two parallel links 1014 and 1015, which in turn are rotatable about the frame studs 1016 for equal downward motion. A tension spring 1017 is provided to maintain the assembly of parts 1013, 1014 and 1015 in the position in which they are shown in Figs. 70 and 72. A lateral ear 1018 on stem 1013 is adapted to be engaged by a latch lever 1019 upon depression of the division key 109, so as to be held down for the remainder of the division operation.

As will appear later from the description of the quotient sensing and the set-up of quotient digits in the register 107 (Fig. 1), it is necessary that the circuit to the multiplier selection switches 391 (Fig. 77B) be opened during division cycles, since they are not used in division. This is accomplished by means of switch 970 upon depression of division key 109. Switch 970 also serves to establish a circuit to a cam operated division switch 976, and is held in its division position during the entire division problem. Switch 970 is operated by a roller 1021 on the end of link 1015 (Fig. 72), upon depression of the lower division stem 1013. Roller 1021 is adapted to impart a rearward rocking movement to the upwardly extending and insulated arm 1022 carried by the flexible, conductive switch blade 1023, which motion will be sufficient to open contacts 428 controlling the multiplier circuit, and to close contacts 978 controlling the division circuit. The switch is held by roller 1021 in this position until the division stem 1013 is released in the manner to be described hereinafter.

*Division control member 1027*

Another function of the division key 109 is to cause disengagement of a program clutch dog 1024 (Fig 74) and permit rotation of a "program shaft," which controls the sensing mechanism, to be described later. The division stem 1013 (Fig. 70) has therefore been equipped at its lowest extremity with a roller 1025, which is normally disposed against the curved face 1026 (Figs. 70 and 74) on the upper portion of a "division control member" 1027. This control member 1027 is rockably mounted upon shaft 1028, and is urged clockwise by a strong tension spring 1029. When the division key is depressed, roller 1025 is forced down, so that when a latch 1030 (Fig. 70) is disengaged from control member 1027, the latter is free to be rocked clockwise by its tension spring 1029 and thereby position the reverse unit for negative operation and initiate a program clutch cycle. Latch 1030 is disengaged from control member 1027 directly after set-up carriage 186 (Fig. 17) and shift switch 119 (Fig. 2) have been shifted through the unset divisor orders and into the first quotient order.

Thus latch 1030 is pivotally supported on a stud 1096; is constantly biased in clockwise direction by a tension spring 1097; and is provided with a stepped latching notch 1098, which is adapted to engage the lateral extension 1099 on the upper portion of division control member 1027 as shown in Figs. 70 and 71. Latch 1030 is also provided with a lateral ear 1101, which is disposed on the rear face of the downwardly extending arm 1102 thereof. Directly following the depression of division key 109, carriage 186 is escaped through the unset divisor selection orders, resulting in segment 302 (Figs. 71 and 17) being spring rocked to its extreme counterclockwise position. Rigidly secured to segment 302 and rotatable therewith is a lever 1103 which is designed to engage ear 1101, just slightly before segment 302 reaches its counter-clockwise position, causing latch 1030 to be disengaged from lateral extension 1099 of division control member 1027. The same step of movement of lever 1103 that causes it to engage and raise ear 1101 also rocks it far enough so that it passes beyond and out of contact with said ear, thus permitting latch 1030 to fall back into operation again. During the time that latch 1030 is raised, however, the division control member 1027, under tension of spring 1029 is immediately rocked clockwise about the shaft 1028. As previously stated, the divisor set up is limited to one less than the full capacity of register 106. Were it not so limited the setting up of the last divisor digit would cause lever 1103 to raise latch 1030 and let it fall back into operation again, which if completed before the division key 109 is depressed to release division control member 1027 would thereafter prevent the release of said member. If, however, no divisor digit is set into the rightmost order of register 106, latch 1030 will not be moved until the division key 109 is depressed, which depression, as previously described, will release member 1027 from the restraint of roller 1025, and will thereafter cause lever 1103 to raise latch 1030, thereby releasing member 1027 into operation.

Attached to the upper portion of control member 1027 is a roller 1032 which overlies an operating bar 1033 (Fig. 76) supported on the right side of the control mechanism by means of levers 1034 and 1035. These levers are rotatably mounted upon the shafts 1036 and 1037, and are pivoted to the bar 1033 at 1038 and 1039, respectively. The operating bar 1033 is urged upwardly by a spring 1041, exerting tension on the lower end of arm 1034, but is restrained in its motion by the overlying roller 1032 on the control member 1027. A notch 1040, provided within said operating bar 1033, permits upward movement thereof as roller 1032 traverses to the right upon release of control member 1027 by the division stem 1013 and latch 1030. When roller 1032, near the end of its rightward movement, contacts the steeply inclined face of the notch 1040, as indicated by the dotted circle, it will again cam the bar 1033 downwardly to the position in which it is shown in Fig. 76, as will be more fully described hereinafter.

This upward and downward movement of bar 1033 will result in rocking of the program clutch dog 1024, by a bellcrank 1042, which is pivoted to the lever 1035 at 1043, and is spring-urged counter-clockwise by the spring 1044 to abut a lateral ear 1045 of clutch dog 1024 just above a recess 1046 within the lowermost extremity of bellcrank lever 1042.

From the foregoing description, it is evident that when control member 1027 is released and is free to respond to the action of its strong tension spring 1029, roller 1032 will move from its initial, extreme leftward position to its extreme rightward position, as indicated by the dotted circle. By virtue of notch 1040, this angular rocking movement of member 1027 will be followed by an upward movement, and immediately thereafter by a downward movement, of bar 1033. This reciprocation of bar 1033 during the rightward travel of control member 1027 results first in upward movement of bellcrank 1042, during which the lateral projection on program clutch dog 1024 becomes latched within recess 1046, and then in downward movement of bellcrank 1042, during which movement dog 1024 is rocked counter-clockwise about its pivot 1048 against the tension of spring 1049, thereby releasing the program clutch 1051 into operation.

In order to limit operation of the program clutch to a single cycle, means are provided for unlatching the clutch dog 1024 from bellcrank 1042 to cause disengagement of the clutch after half a revolution thereof.

The mechanism for effecting this operation includes the pair of complementary cams 1052 (Fig. 75) and the cam follower 1053 which is positively rocked by these cams about pivot shaft 1054. A lever 1055 rotatably mounted on shaft 1056 is provided with a rearwardly extending arm, which is bifurcated to embrace the pin 1057 on cam follower 1053. The opposite and forwardly extending arm of lever 1055 is equipped with a lateral projection 1058 adapted to disengage bellcrank 1042 from extension 1045 of program clutch dog 1024. Since complementary cams 1052 are keyed to the program shaft 785, they will be rotated immediately upon release of program clutch 1051, to rock cam follower 1053; through the action of pin 1057 thereon and lever 1055, bellcrank 1042 is rocked sufficiently to effect release of clutch dog 1024 which, under the tension of spring 1049 (Fig. 74) engages notch 1061 to stop the clutch 1051 and consequently the program shaft 785, upon completion of half a revolution.

It is to be noted that the above described program clutch has a normal cycle consisting of half a revolution, so that if clutch dog 1024 is raised, even for an instant, and then released, the clutch and the elements it drives will make half a revolution before the nose 1059 of clutch dog 1024 can again engage one of the notches 1061 to open the clutch. For a more thorough description of the clutch 1051, reference is hereby made to the copending application of Harold T. Avery, Serial No. 653,207, filed January 23, 1933.

Reversing unit

A further function of the division control member 1027 is to control the reversing unit for either negative or positive operation. In Fig. 43, a cam lever 1063 is shown mounted for pivotal movement about the stud 1064. When the division control member 1027 is released and rocks clockwise, the roller 1065 on the uppermost extremity thereof is brought into engagement with the lower arm of cam lever 1063, to rock it in counter-clockwise direction. Cam lever 1063 includes a lateral extension 1066 which overlies the rearwardly projecting arm 1067 of a pendular lever 1068, which is hinged on shaft 723. Pivotally connected to pendular lever 1068 is a reverse unit control link 1069, which is provided with a centralizing slot 1071 through which is extended a guide pin 1072. A spring 1073, tensioned between stud 724 and an aperture within link 1069, constantly urges the latter upwardly and to the right. Link 1069 is also equipped with an arm 1073 which underlies the lateral ear 1074 of a cam follower 1075, which is rockable about shaft 1054 by a pair of complementary cams 1076, keyed to the hereinbefore mentioned program shaft 785. A downwardly projecting portion 1077 at the rightmost end of link 1069, is adapted to cooperate with one or the other of two bridges 1078 and 1079, which provide integral connections between the arms 712 and 713 of reverse control member 709.

It is apparent therefore that upon clockwise rocking of division control member 1027, link 1069 is pulled in the direction of the arrow so as to place the end 1077 above the bridge 1079. Immediately thereafter, when complementary cams 1076 are rotated by the program shaft 785, the cam follower 1075 is oscillated and link 1069 is forced downwardly by the lateral ear 1074 thereon, to rock the reverse unit control member 709 counter-clockwise, where it is held by cam 1076 until after the main clutch is engaged as shown by items 6 and 8 of Fig. 78. The reverse unit thus rotates out of the position where it can be affected by member 709 and is not reset thereby until after the end of the actuating cycle.

Near the completion of the main clutch cycle which follows the first program cycle, division control member 1027 is power restored by main clutch 341, in the manner to be described directly hereinafter, permitting the reverse unit control link 1069 to respond to the action of spring 1073 and be returned to its normal position, with the end 1077 of link 1069 again disposed above the bridge 1078 of the reverse control member 709, in which position it will be pulled down during the second program clutch cycle to position the reverse mechanism for positive actuation (as will be later described in connection with overstroke sensing) during the second program shaft cycle.

Restoration of the division control member 1027 is accomplished in the following manner: Rigidly secured to the operating sleeve 694 (Figs. 64 and 76), which is driven by the main clutch 341, is a roller lever 1087. Near the end of the main clutch cycle, roller lever 1087 is adapted to engage the rearwardly extending arm 1088 of rocking lever 1089, and rock the same in clockwise direction about its pivot shaft 1090. This movement is transmitted to the lower arm of division control member 1027 by the linkage connection 1092. Division control member 1027 is thus rocked counter-clockwise, and is restored to its extreme leftward position, in which it is latched by latch lever 1030 and remains latched during the balance of the division cycle in that dividend order.

As division control member 1027 is being restored to its extreme leftward position, in which it is shown in Fig. 74, roller 1032 thereon is moved from its rightmost position (in which it is indicated by the dotted circle), to its leftmost, i. e., initial position. It is evident, when viewing Fig. 74, that leftward movement of division control member 1027 will have the same effect upon operating bar 1033 as the rightward movement hereinbefore described in connection with the initiation of division operation, namely, the reciprocation of bar 1033 and lever 1042, with consequent rocking of dog 1024 and release of program clutch 1051 into operation for a single cycle.

The restoration of division control member 1027 is also accompanied by a spring return of reverse unit control link 1069 (Fig. 43). This is due to the fact that during the return of member 1027, roller 1065 thereof has been removed from the downwardly extending camming end of lever 1063, allowing it to regain its original position in which it is shown in Fig. 43. All restraining influence having therefore been removed from pendular lever 1068, link 1069 is free to respond to the action of spring 1073 and return to its original position, in which the operating end 1077 thereof is again disposed above bridge 1078 of lever 709, so that reverse unit 691 may be forcibly conditioned to plus position upon subsequent downward rocking of link 1069 by cam follower 1075, during the second program shaft cycle, in case spring 720 has failed to previously so condition it.

Each cycle of division is followed by a shift clutch operation, initiated by energization of the shift solenoid 306 (Figs. 77B and 17) as will be described later. The shift clutch functions to position the shift switch 119 (and also the dividend sensing carriage 731, to be described later), for the next division cycle. It also functions to again release division control member 1027 to initiate the next division cycle. Rigidly secured to the driven side of shift clutch 316 (Fig. 17) is a cam 1105 (Fig. 70) which is adapted to rock the cam follower 1106 counter-clockwise about its pivot shaft 1107 to effect release of division control member 1027. Cam follower 1106 is constantly urged clockwise by a spring 1108, to hold its roller 1109 in operative position against cam 1105. During the operating cycle of shift clutch 316, cam 1105 is rotated in the direction of the arrow (Fig. 70) and just before mid-cycle, the cam follower 1106 is rocked counter-clockwise, causing pin 1111 thereof to rock bellcrank 1112. Bellcrank 1112, pivoted on shaft 1113, has a forwardly extending arm 1114 provided with a shelf 1115 underlying the tip of downwardly extending finger 1102 on the latch lever 1030. Therefore, as bellcrank 1112 is rocked clockwise by shift clutch 316, shelf 1115 engages latch 1030 and raises it sufficiently to disengage it from lateral ear 1099 of division control member 1027. The latter, being thus released, is free to respond to the action of its strong tension spring 1029, again moves to the right and initiates another division cycle, in the same manner as previously described.

At the same time the shaft clutch operation raises latch 1030, it also rotates segment 302 (Fig. 71) back one step in a clockwise direction as described under "Mechanism for moving shift switch." During the shift operation following the entry of the first quotient digit, this causes lever 1103 to move back under ear 1101 while said ear is raised out of the way due to latch 1030 being simultaneously raised by shelf 1115. It is possible, on the other hand, for segment 302 to be returned in a clockwise direction as an incident to a factor clearance operation as described under the "Factor dial clear key," in which case ear 1101 is not raised into the clear at the time lever 1103 passes back under it. Lever 1103 is located in a plane considerably removed from that of latch 1030 and is provided with a curved camming surface adjacent the tip thereof which engages ear 1101 well out from the plane of latch 1030 and springs the ear rearwardly sufficiently to permit lever 1103 to pass during this first return step. Ear 1101, however, springs back to the position shown after lever 1103 passes below it, so that the tip of said lever may again raise latch 1030 during a subsequent upward movement thereof.

DIVIDEND SENSING MECHANISM

The dividend sensing mechanism is illustrated in Figs. 2, 29, 50, 51, 53, 56 to 59, inclusive.

It will be recalled, from the description of the accumulator mechanism, that each snail cam 566 (Figs. 2 and 29) moves with the associated dial shell, and that each lever 594 carries a roller 595 which rides against the periphery of the associated cam, so that the position of each lever 594 will be an accurate representation of the value of its associated numeral wheel.

Suitable mechanism is provided which will function to sense the position of the roller levers 594 and convert the sensing to movement in logarithmic proportion to the dividend digit operatively associated with the highest divisor order, and the dividend digits in the adjacent orders on each side thereof. This sensing is done by three sensing levers 775, 776 and 777 (Fig. 56). As previously explained, the accumulator register which displays the dividend set up is stationary, there being an actuator unit cooperating with each dial. As the dividend is reduced after each division cycle (in which the product of the divisor times the quotient digit is subtracted from the accumulator dials), the dividend sensing for the next quotient digit must take place one order lower. To accomplish this, the three sensing levers 775, 776 and 777 are arranged in a shiftable sensing carriage 731 which is automatically shifted one order to the right after each cycle of division is completed, at the same time that movable member 290 of shift switch 119 is shifted (as previously described), to carry all the divisor connections to the next lower order of partial product solenoids. In this manner, sensing lever 776 always cooperates with the lower order accumulator dial with which the bank of partial product solenoids representing the highest divisor digit, cooperates. In the initial sensing cycle, this is the second dial from the left.

Sensing levers 775, 776 and 777 are rotatably supported on an internally threaded member 770 arranged to be driven by worm shaft 757 (Figs. 56 and 2). The member 770 is supported between side plates 778 and 779 which are slidably mounted on the shafts 772, 773 and 774. Each sensing lever is equipped with a segmental portion 781 which meshes with one of the pinion gears 782, 783 and 784; gear 782 meshing with segment 781 on the leftmost sensing lever 775, gear 783 meshing with the segment of the middle sensing lever 776, and gear 784 meshing with the segment of the rightmost sensing lever 777. These gears 782, 783 and 784 are splined to the shafts 772, 773 and 774, respectively, are spaced between carriage plates 778 and 779, and are shiftable therewith as part of the sensing carriage.

Sensing levers 775, 776 and 777 are normally positioned so as to be entirely clear of levers 594, thereby permitting lateral shifting of said sensing levers without interfering with levers 594, even though levers 594 may be disposed in their lowest or "0" positions in which they are illustrated in Fig. 2 of the drawings. The sensing mechanism is operated by a program shaft 785 (Fig. 51). Secured to this shaft are a number of cams for carrying out a series of functions, the sequence of which will be hereinafter described. The pair of complementary cams 786 are keyed to shaft 785 and, consequently, are rotatable therewith. A cam follower 787 pivotally mounted on shaft 788, is equipped with two oppositely disposed rollers 789 which are held in cooperative relationship with cams 786 to assure positive rocking of lever 787 during each operation of program shaft 785. An upwardly extending arm 791 on the cam follower 787 is connected by way of a link 792 with a segment 793, which is supported for rotational movement on the shaft 802 coaxial with worm shaft 757 (Fig. 50). Segment 793 is adapted to be rocked a uniform amount in counter-clockwise direction at the beginning of each program shaft cycle, by cam follower 787, thereby rocking shafts 772, 773 and 774 until the sensing levers 775, 776, and 777 geared to the respective shafts 772, 773 and 774 are stopped by the levers 594. Since the movement of each of the three sensing levers will vary according to the value indicated by levers 594, it is necessary to provide a yieldable connection between each of the shafts 772, 773, 774 (to which said sensing levers are geared) and the actuating means therefor. Hence, assembled to the extreme left end of each of the shafts 772 to 774 (Figs. 51 and 56) and adjacent to the leftmost frame plate 795 there is a yieldable drive unit comprising a gear 796, affixed to which is a lever 797 carrying a stud 798. The three gears 796 are free on their respective shafts 772 to 774, and mesh with the segment 793. Pinned to the left end of each one of the shafts 772 to 774 is a cooperating lever 799 which is, by means of a torsion spring 801, yieldably secured to lever 797 and held in abutment with stud 798 thereon. The arrangement is such that at the beginning of the operation of the program shaft 785, segment 793 is rocked counter-clockwise through an angle of approximately 50°, resulting in clockwise movement of gears 796 and levers 797. This clockwise movement is, in turn, yieldably transmitted to the respective levers 799 and their associated shafts 772, 773 and 774 by the torsion springs 801 until (through slidable gears 782, 783 and 784) sensing levers 775, 776 and 777 are stopped against the roller levers 594. Thus each of the three shafts 772, 773 and 774 assumes an angular position which is indicative of the size of the dividend digit shown on the dial being sensed.

In the present instance, this displacement of the shafts 772 to 774 is used to operate the two comparator mechanisms mentioned in connection with the description of Fig. 52. These two comparator mechanisms are disposed to the left of the multiplicand selection mechanism, and are marked "Lower comparator" and "Higher comparator" in Fig. 57.

In order that the comparators may be sufficiently sensitive to give an accurate indication of the dividend being sensed, two special compound planetary assemblies are provided for combining the values of the three dividend digits sensed. These assemblies are mounted on the shaft 802. The right-hand planetary assembly serves to add to the middle of the three dividend digits sensed, one-tenth of the amount of the digit to its right and introduce the total, as the dividend indication, into the lower of the two comparators; while the left-hand planetary assembly serves to add to the leftmost of the three digits sensed, one-tenth of the total thus entered into the lower comparator.

For instance, if the number registered on the three dividend dials sensed is 375, the right-hand planetary assembly will increase the 7 by one-tenth of the 5 and enter 7.5 into the lower comparator, while the left-hand planetary assembly will increase the 3 by one-tenth of this amount and enter 3.75 into the higher comparator.

Keyed to, or otherwise positively connected to shaft 774 (Figs. 53 and 57) is a segment 803, meshing with a segment 804, which is pivotally mounted on shaft 802 and is integral with a sun gear 805. Similarly fastened to shaft 773 is a segment 806, meshing with a segmental portion of a planetary carrier 807, which carries a compound planetary idler, including a planetary gear 808 meshing with the sun gear 805, above mentioned, and a planetary gear 809 meshing with a large sun gear 811, which is integral with a dividend gear 812. It will be evident that this combination of parts will result in the dividend gear 812 being displaced clockwise, by the movements of shafts 773 and 774, through an angle which is the resultant of the movements transmitted to it by the planetary gear 809 and the planetary carrier 807.

The gear 812 on shaft 802 carries a stud 813 which fits within a slot 814 in an arm 815, which arm is integral with a small sun gear 816. Keyed to the shaft 772 is a segment 817, which meshes with the segmental portion of a planetary carrier 818, which carries a compound planetary idler comprising planetary gears 819 and 821. Gear 819 meshes with the small sun gear 816, while gear 821 meshes with a large sun gear 822, which is rigidly secured to a dividend gear 823, which corresponds to the gear 812 in the lower comparator.

The gear ratio employed in the dividend sensing mechanism hereinbefore explained may, for instance, be such that for each increment of product dial movement sensed, sensing levers 775, 776 and 777 will be displaced four and one-half degrees, resulting in shafts 772, 773 and 774 being displaced 18° per step. Segments 803 and 804 being equal in radius, the sun gear 805 will also be displaced 18°.

The ratios between segments 806 and 817 and the segmental portions of the respective planetary carriers 807 and 818 is such that the latter will be advanced an angular amount of 20° per step of sensing of the sensing levers 775 and 776.

While many combinations of gear sizes giving the desired 10-1 reduction in the two planetary assemblies are possible, in a typical arrangement sun gears 805 and 816 may have thirteen teeth each; large sun gears 811 and 822, forty teeth; planetary idlers 808 and 819, thirty-nine teeth; and planetary idlers 809 and 821, twelve teeth. Then, with the planetary carrier fixed, the large sun gear 811 advances one-tenth as much as the small sun gear 805 or 1.8 degrees per step. With the small sun gear 805 fixed, the large sun gear 811 advances nine-tenths as much as the planetary carrier 807, or eighteen degrees per step. Hence the dividend gears 812 and 823 will be displaced eighteen degrees per full step of dividend sensing movement, plus exact decimal fractions thereof representing the correction made on account of digits to the right.

DIVISOR SENSING MECHANISM

As mentioned in connection with the description of the multiplicand selection mechanism and the factor dial register 106 associated therewith, the highest order digit of any factor is always set up on the leftmost check dial 216 in register 106 (Figs. 18 and 19).

Thus, upon introduction of a divisor into the multiplicand selection mechanism, the highest order digit is entered into the leftmost dial 216, and the lower digits of the divisor are entered to the right thereof, in the order set up, so that each of the corresponding dials 216 is displaced an angular amount indicative of the value of the divisor digit in that denominational order.

In order that the divisor value may be sensed as accurately as the dividend value, for comparison therewith, the intermediate gears 208 (Fig. 55) operating into the gears 215, associated with the three leftmost check dials 216, which correspond to the three highest order divisor digits, are equipped with a special compound planetary assembly. By means of this planetary assembly, it is possible to obtain a divisor indication which is proportional to the highest order digit, plus one-tenth of the next lower order digit, plus one-hundredth of the second order digit, without affecting the position of the check dials 216 associated therewith.

When viewing Fig. 55 of the drawings it will be noted that the intermediate gears 208, which serve to position the three leftmost factor dials 216 in accordance with the values of the respective divisor digits set up, are mounted for rotational movement on the reduced portion of a small sun gear 825, which is integral with a larger sun gear 826, and is freely supported on the shaft 820. Rigidly secured to the intermediate gear 208 is a stud 827, and rotatable about said stud 827 is a compound planetary idler comprising two idlers 828 and 829, which are integral with each other to rotate in unison. The planetary idler 828 meshes with the sun gear 825, while the planetary idler 829 meshes with a sun gear 831, which is integral with another sun gear 832. The latter is entrained with an idler 833 which is integral with an idler 834, the two forming a second compound planetary idler assembly rotatably journaled in a sleeve 838 which is carried by a planetary arm 435. A frame stud 436 engages the lower and bifurcated end of said planetary arm 435, and thus prevents it from rotating on its axis 829. Inasmuch as no decimal fractions have to be carried into the rightmost planetary unit from a lower order, this planetary assembly is not equipped with idlers corresponding to the compound planetary idlers 833 and 834; and since there is therefore never any movement transmitted into sun gear 826, this gear, and its companion gear 825, are prevented from rotational movement by the frame stud 837, as shown in the transverse sectional view thereof illustrated in Fig. 55.

It is evident from the foregoing that with proper gear ratios and with sun gears 825 and 826 held fixed, rotation of the gear 208, associated with the rightmost planetary unit, will cause one-tenth of the amount registered on the dial 216 associated therewith to be transmitted into the adjacent higher unit, and will cause one-tenth of the amount registered in that unit to be transmitted into the highest and leftmost order, along with the additional one-hundredth increment carried over from the rightmost planetary unit, thus resulting in a divisor value being transmitted into the divisor sensing mechanism (to be described hereinafter) which is an accurate indication of the value represented by the three highest order divisor digits.

A number of different gear ratios are possible. A typical arrangement would be, for instance, to let the planetary idler 829 have twelve teeth; the sun gear 831 meshing therewith, fifteen teeth; the sun gear 832 ten teeth; the large planetary idler 833 receiving motion therefrom, twenty teeth; the small planetary idler 834, ten teeth; the large sun gear 826 driven thereby, twenty teeth; the small sun gear 825, nine teeth; and the planetary idler 828 with which sun gear 825 is meshed, eighteen teeth. With this arrangement, clockwise displacement of the gear 208 in the highest divisor order will always result in six-tenths as much clockwise displacement of the cooperating sun gear 831 in that order, with additional decimal fractions added thereto from the two lower divisor orders to the right thereof.

During the time that the setting up of the divisor takes place the planetary mechanism just described is freely floating, and offers negligible resistance to the setting of the check dials 216 associated therewith. However, very early in the cycle of the program shaft 785, as shown in Fig. 80, items 1 to 7, inclusive, a divisor lock gate 841 (Figs. 19 and 62) is let into operation, in the manner to appear directly hereinafter, to lock the gears 215 and associated dials 216 in the three leftmost divisor orders against rotation during the sensing operation.

The divisor lock gate 841 is supported by a rocking shaft 842 and is rigidly secured thereto by pins 843. Similarly attached to the extreme left end of shaft 842, is an arm 844, which, by a link 845, is connected with a cam follower 846. The latter is constantly urged counter-clockwise about shaft 847 by a tension spring 848, so as to maintain the roller 849 in constant engagement with a cam 851 which is keyed to said program shaft 785. Directly upon commencement of operation of the program shaft in counter-clockwise direction, the high point of cam 851 is removed from contact with roller 849, and cam follower 846 is free to respond to the action of spring 848 and rock the shaft 842 an angular amount in counter-clockwise direction sufficient to bring the three prongs 852, integral with gate 841, into locking position with respect to the corresponding check dial gears 215. This condition is maintained until near the end of the program clutch cycle when the cam 851 acts to again return the lock gate 841 to its original position, as shown in Fig. 2.

Clockwise displacement of the leftmost sun gear 831 (Figs. 18 and 55), in accordance with the divisor set up, is transmitted by way of gears 856 and 855 to a segment 853 mounted freely rotatable on the shaft 854 (Fig. 53). Gear 856 is coaxially mounted with the gears 208, and is connected, by means of a coupling 857, with the leftmost sun gear 831. The segment 853 is equipped with a stud 858 on its downwardly extending arm 859.

From the above description, it is evident that segment 853 is rotated an amount in proportion to the divisor set up, and therefore the stud 858 carried by segment 853 assumes a position indicative of the divisor and serves as a stop whereby the divisor sensing movement is proportional to the divisor. The following description covers the mechanism whereby this is accomplished.

An arm 861 (Figs. 18 and 53) is pinned to one end of the shaft 854 in cooperative position with the stud 858, whereby the rotation of shaft 854 is limited in accordance with the divisor set up. A yieldable drive is provided for shaft 854 in the following manner: Freely pivoted on the left end of the shaft 854 (Fig. 18) is a hubbed lever 862 into which is riveted a stud 863, and to which also is connected one end of a link 864 (Fig. 51), the other end of which is connected with a downwardly extending arm 865 which is pinned or otherwise made integral with a transverse rocking shaft 866, to the near end of which is secured another but upwardly extending arm 867. A link 868, connecting the arm 867 with the arm 791 of cam follower 787, provides a suitable means whereby the lever 862 may be rocked counter-clockwise a uniform amount during each cycle of program shaft operation, directly after the divisor lock gate 841 has been moved into locking position. Pinned to the shaft 854, to the right of lever 862, is a lever 869 which is pressed against the stud 863 by a torsion spring 871, thereby causing arm 869 to follow arm 862 and rock the shaft 854 until it is stopped by the striking of lever

861 (Fig. 53) against the stud 858. The lever 862 can complete its stroke because of the yieldable spring 871.

In Fig. 53, segment 853, which is freely rotatable on shaft 854, is shown in its normal position with no divisor set up. Arm 861, which is pinned to shaft 854, is also shown in its normal, i. e., initial position. When a divisor is set up, segment 853 is rotated clockwise (Fig. 53) and stud 858 is carried toward arm 861; with the largest divisor set-up, stud 858 reaches a position just clear of arm 861. Thus with a large divisor, shaft 854 rocks only slightly, while with a smaller divisor, shaft 854 rocks proportionately more.

Pinned to shaft 854 are two levers 872 and 873, having a common hub 874 (Figs. 18, 60 and 61). Each of these two levers is provided with a lateral projection 875 which cooperates with spring urged segments 876 and 877, which are freely rotatable on the shaft 854. The segment 876 is urged counter-clockwise by a torsion spring 878 so as to normally contact the ear 875 of lever 872, and the segment 877 is urged clockwise by a torsion spring 879 toward the ear 875 on the lever 873 (Figs. 18, 60 and 61). In Fig. 60, shaft 854 and lever 872 are shown in their extreme counter-clockwise positions, to illustrate how segment 876 may be retained in its initial position by virtue of yieldable spring connection 878, although shaft 854 has been rocked the maximum amount; while in Fig. 61 shaft 854 and lever 873 are shown in their initial and extreme clockwise position and segment 877 is shown restrained in counter-clockwise position, with spring 879 urging it toward ear 875 of lever 873.

The shaft 854 and levers 872 and 873 are normally in their extreme clockwise position, which position corresponds substantially to a divisor indication of ten. As previously described, the normal position of the dividend sensing mechanism in both the higher and lower comparators is in a position corresponding substantially to a dividend indication of zero. Referring to Fig. 52, and considering the lower comparator, it is evident that with a zero dividend and a ten divisor, which is the normal position of the sensing mechanism, the quotient indicator would assume a position much lower than zero (note line 881). However, the quotient mechanism is limited in its movement, by a stop, to its zero position; because of this, the divisor mechanism in the lower comparator is made yieldable to a position corresponding to a divisor indication of 1 or less (note line 882). The segment 877 and spring 879 (Figs. 18 and 61) constitute this yieldable divisor member. Fig. 61 shows the parts in their normal position. Shaft 854 and lever 873 are in their extreme clockwise positions corresponding to a divisor indication of substantially 10, and segment 877 and spring 879 are in their extreme yielded position corresponding to a divisor indication of substantially one.

Next consider the higher comparator (Fig. 52). With a zero dividend and ten divisor, which is the normal position of the sensing mechanism, the quotient indicating mechanism would be at the zero position, as shown by line 883; thus the divisor mechanism for the higher comparator needs no downward yield, as the quotient indicating mechanism would never be forced below the zero position in the higher comparator. No upward yield of the divisor mechanism is necessary, since the downward yield of the dividend mechanism will accomplish the same result, and, mechanically, means merely the forcing of the dividend sensing lever 775 (Fig. 2) downwardly and away from the roller lever 594. For instance, with a divisor of one, the higher comparator will force its dividend mechanism down to line 884, which corresponds to bringing the shaft 712 (Figs. 56 and 57) to a position indicative of a one dividend digit. However, an upward yield, toward the higher range of divisor digits, has been provided for segment 876 for another purpose to be explained directly hereinafter and will alternatively serve this purpose as well as the yield of the dividend sensing mechanism.

Under the heading of "General description," dealing with division, it was stated that the two comparators (Figs. 57 and 58) each give an indication of the quotient digit, and that the larger quotient digit indicated would control. Since the downward movement of the dividend mechanism for the higher comparator is mechanically limited to a position corresponding to line 885 (Fig. 52), the higher comparator would erroneously show too large a quotient if a small dividend and small divisor were actually involved, due to the fact that the movement of the dividend mechanism ceases to be in true logarithmic ratio below unity. Hence it was stated that means would be described for holding the higher order divisor indication at ten or above, whenever the dividend digit, as sensed by shaft 712, is zero; thus holding the quotient indication at or near zero and at least as low as that of the lower comparator.

As previously described in connection with Figs. 57 and 53, the planetary idler carrier 818 is rocked by segment 817, keyed to shaft 712, in accordance with the highest order dividend digit sensed. The advance of segment 817 is clockwise, in the direction of the arrow (Fig. 53). When this segment is in its zero position, as shown, an ear 886 thereon engages a lever 887 adjacent thereto. Lever 887, through a link 888, holds an ear 889$a$ on lever 889 in blocking position with lug 893, thus preventing the divisor segment 876 from moving out of its initial position, which corresponds to a divisor indication of ten. As soon, however, as segment 817 is displaced out of its zero position an angular amount in clockwise direction corresponding to a dividend sensing of one or more in the highest order, the segment latching lever 889 is rocked counter-clockwise by its spring 892 so as to remove its lateral projection 889$a$ from the path of lug 893 on segment 876, in the higher comparator unit. Segment 876 is thus released to move into controlling position in accordance with the divisor sensed.

LOGARITHMIC CONVERTERS

In the operation of predetermining the quotient, there has been disclosed, thus far, mechanism for moving the dividend gears 812 and 823 (Fig. 57) angular amounts directly proportional to the dividend values sensed, and moving the divisor segments 876 and 877 (Fig. 18) angular amounts directly proportional to the divisor value sensed. It next becomes necessary to convert these movements into corresponding movements on a logarithmic scale before comparing them for quotient sensing.

In Fig. 63 is illustrated in diagram the theoretical function of converting angular motion directly proportional to the values sensed into angular motion proportional to the logarithms of the corresponding values. At 894 is located the center of a circle 895 on which are laid off at equal intervals the ten positions designated 0 to 10. In the present instance each of these intervals or steps amounts to approximately eighteen degrees, the ten steps subtending an angle of substantially 180°. If an arm 896 pivoted at the center 894 and carrying a stud 897 is rotated 18° per step, the stud 897 will assume the various positions corresponding to the digits marked. A second circle 898, having a center 899, is a circle of logarithmic movement. This center 899 is preferably located on the radius joining center 894 with point 1 on circle 895 and is located a distance of approximately one-eleventh of the diameter of circle 895 within the circumference thereof. The position of this center 899, however, is so determined that it will be almost exactly ten times as far from point 10 on circle 895 as it is from point 1 on said circle. Therefore, if a lever 901 pivoted on center 899 were rotated by means of the stud 897 riding in a radial slot (assumed, and not shown in the drawing) in lever 901, approximately ten times as much angular movement would be imparted to lever 901 when the stud is in the vicinity of point 1 as would be imparted by the same movement of the stud when it is in the vicinity of point 10 on circle 895. The movement of the lever 901 at these two points would therefore be in proper logarithmic ratio but a straight radial slot would not give true logarithmic ratio for intermediate points. However, if the scale of logarithmic movement is chosen to suit that occurring near points 1 and 10, the slot can be so curved that the stud 897 will vary the amount of movement of lever 901 between intermediate points in a manner adapted to maintain true logarithmic movement throughout. All that is necessary to develop such a slot is to graduate the circle 898 to the logarithmic scale corresponding to the movement which would be transmitted to it in the vicinity of point 1 on circle 895. Then by advancing lever 901 successively about its center 899 by steps in accordance with this logarithmic scale and for each position plotting on the lever a point coinciding with the corresponding point on circle 895, as shown by the dots 903, there can be developed a slot 902 of the shape required to give true logarithmic conversion. It will be noted in Fig. 63, that during the development of slot 902, each of the successive positions assumed thereby for the successive digits indicated on circle 898, are illustrated by the curved line 904 representing the center line of slot 902.

From the foregoing it is evident that if the arm 896 is rotated about its center 894 in accordance with the value sensed, the stud 897 thereon, being closely guided in the slot 902 of the logarithmic conversion lever 901, will force the latter to be displaced an angular amount about its center 899 in exact logarithmic proportion to the value sensed.

Two comparators to be described later are provided for comparing the logarithmic values of the sensed dividend and divisor, and setting up the resulting quotient sensing mechanism, one comparator being for the higher order comparison, and one for the lower order comparison; accordingly, there are provided two logarithmic converters for the dividend sensing and two for the divisor sensing.

The logarithmic converters for the dividend sensing mechanism are shown in Figs. 57, 58 and 59. A segmental lever 896 is pivoted on a frame stud 905 and carries a stud 897 operating in the slot 902 of conversion lever 901. The latter is secured to hub 907, rotatably mounted on shaft 906, on which is also mounted the higher and lower comparator mechanism. Rigidly secured to the hub 907 of each of the two conversion levers 901, and rotatable therewith, is a sun gear 908. Inasmuch as the two segmental levers 896 in the lower and higher comparator orders receive their settings from gears 812 and 823 of the dividend sensing mechanism, respectively, (in accordance with the dividend value sensed) conversion levers 901, and consequently sun gears 908 integral therewith, will be displaced in counter-clockwise direction in logarithmic proportion to the dividend values.

For converting the angular displacement of divisor segments 876 and 877 into corresponding movement on a logarithmic scale, each of these two segments is adapted to drive a separate lever 911 (Figs. 53 and 58) which levers correspond to the levers 896 of the dividend conversion mechanism (Fig. 59). Movement is transmitted from segments 876 and 877 to levers 911 through transmission gears 912 to 914, inclusive. Transmission gear 914 is secured to lever 911, as by rivets 915, and is rotatable in unison therewith about the frame stud 916. Lever 911 is also equipped with a stud 917, which operates in a logarithmic conversion slot 918 of lever 919 in the same manner as stud 897 of lever 896 (Fig. 59). The disc shaped portion 921 of conversion lever 919 is rigidly secured to the hubbed gear 922, and is rotatable therewith about the frame stud 923. Gear 922 meshes with a sun gear 925, which is mounted on the same axis 906 as gear 908 described in connection with the dividend converter. Thus, sun gear 925 will be rotated an amount in logarithmic proportion to the divisor sensed. In Fig. 54 the two extreme positions of lever 911, stud 917 and conversion member 919 are shown.

DIVIDEND AND DIVISOR COMPARATORS

Means are provided for comparing the logarithmically converted dividend and divisor values and for setting up a representation of the resultant quotient digit.

A mechanism which will accomplish the above objectives is shown in Fig. 58, and comprises the two differential comparators mentioned hereinbefore; one comparator being disposed in the order marked "Higher comparator," and the other being disposed in the order marked "Lower comparator."

Both comparators are coaxially mounted on the shaft 906, and each comprises a double compound planetary assembly including one of the sun gears 908, which is dislaced in logarithmic proportion to the dividend value sensed, and one of the sun gears 925, which is displaced in logarithmic proportion to the divisor value sensed, as described hereinbefore in connection with the "Logarithmic converters." Also mounted freely rotatable on shaft 906 and intermediate the two sun gears 908 and 925 is a stepped quotient cam 926 (Fig. 68) which carries a compound planetary idler assembly consisting of a planetary gear 927 meshing with sun gear 908, and a planetary gear 928 meshing with a small sun gear 929 made integral with the large sun gear 925. The quotient cam 926 also has rigidly secured thereto an arm 931, which contacts the shaft 772 to limit the rotational movement of quotient cam 926 in its two extreme operating positions, as is clearly shown in Fig. 68.

It will be recalled by referring to Figs. 53, 54 and 59 where the logarithmic conversion mechanism is illustrated, that a decreasing dividend value will result in counter-clockwise rotation of sun gear 908, and that a decreasing divisor value will likewise result in counter-clockwise rotation of sun gear 925. An increasing dividend value and an increasing divisor value will therefore each have just the opposite effect on sun gears 908 and 925, respectively. Hence, if sun gear 925 and its companion sun gear 929 are held stationary, clockwise rotation of sun gear 908 will result in similar clockwise movement of quotient cam 926, with planetary idlers 927—928 revolving clockwise around their own center; and conversely with sun gear 908 held stationary, clockwise rotation of small sun gear 929 will result in counter-clockwise displacement of quotient cam 926, with planetary idlers 927—928 revolving counter-clockwise around their own axis. The result of this arrangement is that quotient cam 926 will be advanced clockwise with an increasing dividend value being sensed, and will be advanced counter-clockwise with an increasing divisor value being sensed, so that the quotient figure will be increased by clockwise movement of quotient cam 926, as is indicated by the arrows in Fig. 68. The ratio of the respective gears in the just described comparators may be such that for each step of movement by dividend converter 901 and by divisor converter 919 (Figs. 53, 54 and 59) quotient cam 926 will describe just one and four tenths times as large an angle as the corresponding step in said logarithmic converters.

QUOTIENT SENSING MECHANISM

As previously outlined division is performed by estimating the quotient digit, then multiplying the divisor by the quotient digit and subtracting the product from the accumulator dials, or, in other words, the divisor is negatively multiplied by the estimated quotient digit.

With the quotient cams 926 rotated by the comparators just described to the position corresponding to the quotient digit, a quotient sensing mechanism is operated to sense the quotient cams 926 and establish an electrical circuit to the corresponding multiplier solenoid 424, whereby the negative multiplication of the divisor by the quotient digit is carried out.

The quotient sensing mechanism to perform the above function includes a pair of sensing levers 932 and 933 (Figs. 18, 64 and 68) which are pinned to the rocking shaft 891. Also pinned to the shaft 891, at its right-hand end and near the upright frame member 930 (Fig. 65) is a rearwardly extending lever 934, carrying a stud 935 adapted to be engaged by the bifurcated end of a lever 936, which is yieldably secured to a cam follower 937 by means of a torsion spring 938. Cam follower 937 is equipped with a roller 939, which is held in contact with a cam 941 through the action of the torsion spring 938. Cam 941 is keyed to the program shaft 785 mentioned hereinbefore, and is rotated thereby at the beginning of each division operation, thus causing the sensing levers 932 and 933 to be brought in against the quotient cams 926. Also pivotally mounted on the shaft 942, on which the two levers 936 and 937 are mounted, is a forwardly extending arm 943, which is slotted in close proximity of its axis 942, and is engaged by a stud 944 carried by the lever 934 which also carries the stud 935. A fiber roller 948 at the forward extremity of lever 943 is designed to cooperate with a series of nine spring raised plungers 946 (Figures 64 and 66) of a quotient selector switch 947. Each of the plungers 946 is adapted to close a circuit to a multiplier solenoid 424 corresponding to the quotient sensed, as will be described more fully later. A spring 950, tensioned between arm 943 and the base plate of the machine (not shown), tends to maintain the entire quotient sensing assembly comprising the parts 932, 933, 891, 934, 936 and 937 in initial position, in which the tips of sensing levers 932 and 933 are held clear of the working paths of the quotient cams 926, and the fiber roller 948 is clear of plungers 946.

The arrangement is such that, immediately after the dividend and divisor sensing has taken place and the quotient cam 926 has been positioned by the comparators, counter-clockwise rotation of cam 941 (by program shaft 785), forces its cooperating cam follower 937 to rock a uniform amount in clockwise direction about the shaft 942. Thus, through the members described above sensing levers 932 and 933 are rotated until stopped against cams 926. Cam follower 937 may complete its full stroke in clockwise direction, due to spring 938, which is interposed between it and the bifurcated arm 936. Inasmuch as sensing levers 932 and 933 are both pinned to shaft 891 and operate in unison, the first quotient cam 926 that is contacted by one of the sensing levers will control the stopping of switch lever 943 on the respective plunger 946 corresponding to the quotient digit sensed, and the circuit closed thereby will be retained in such closed condition until near the end of the program clutch cycle.

It will be noted when referring to Figure 68, where the quotient cam 926 and an associated sensing lever 932 or 933 are shown in enlarged scale, that while the angles of rotation between the steps of cam 926 (with the exception of the zero step which is limited by a stop) are in logarithmic proportion to the quotient digits, they are equal in height, the radius of the "0" step being closest to the center point of shaft 906 and each succeeding step having a radius further away from the axis 906, as indicated by the digits placed at each of the steps in Figure 68. Thus the sensing levers 932 and 933 will be stopped by the highest digit sensed.

Each of the plungers 946, ranging in value from 1 to 9, is adapted to close an electrical circuit to a multiplier solenoid 424 (Fig. 77B). The plunger 946 representing the No. 1 step on quotient cam 926 is connected by way of leads 410 and 423 with the multiplier solenoid 424 marked "I"; the plunger representing the No. 2 step on quotient cam 926 is connected with multiplier solenoid marked "II" by way of leads 411 and 423, etc. These circuits, having already been explained thoroughly in connection with the multiplier selection, need no further description at this time.

*Overdraft sensing and correction*

As mentioned earlier in this description, the sensing for determining the quotient digit will function very accurately; but to avoid possibility of ever sensing too small a quotient digit, the mechanism is arranged to sense a little on the high side. Thus, if a true quotient digit is approaching very closely to the next higher digit, the quotient sensing cam 926 will be positioned to indicate the next higher digit; this will result in negatively multiplying the divisor by a digit which is numerically one too high and will necessitate a corrective plus stroke to add the overdraft back into the accumulator dials. If the quotient digit sensed was the correct one, the remainder in the accumulator dials will be less than the divisor. If the quotient digit sensed was one too high and an overdraft has taken place, the accumulator dial with which the higher comparator dividend sensing is associated will show a number 9 digit. A second sensing operation will therefore indicate a 9 quotient if an overdraft has occurred, and will indicate a zero or (possibly a one since the quotient sensing is a little toward the high side) if the correct quotient has been sensed.

Accordingly, each division cycle, excepting those in which an original zero quotient is sensed, comprises two program clutch cycles, and, consequently, two sensing operations. The first quotient sensing takes place in the manner above related, to predetermine the quotient digit by which the divisor is negatively multiplied, and the second sensing operation takes place directly after the negative actuation to ascertain whether an overdraft has occurred, and, if so, to cause a positive multiplication of the divisor figure by "one" in order to correct the remainder appearing in the accumulator register 104. If the original quotient was correct the second sensing operation initiates a shift cycle.

Separate electrical circuits are provided which will act during the second quotient sensing operation to either institute the shift clutch operation or to institute the multiplication by one in a positive sense (if an overdraft has taken place).

Referring to Fig. 66, it will be noted that the quotient selector switch 947 is equipped, directly adjacent to the aforementioned plungers 946 and 949, with three additional spring raised plungers 953, 954, and 955 all of which are operable by fiber roller 948 of switch operating lever 943. Depression of either plunger 953 or 954 as the result (on the second sensing) of a zero or a one quotient will result in closing an electrical circuit to the shift solenoid 306 via the lead 958, which includes one of the windings thereof. On the other hand, depression of plunger 955 (Fig. 66) as the result of the second sensing (which indicates an overdraft) will result in closing a circuit to one of the windings of the No. 1 multiplier solenoid 424 (Fig. 77B) and to the main clutch solenoid 305 via the lead 963, and thereby cause the divisor to be multiplied by one and added back into the accumulator dials.

*Overdraft sensing switch*

The above description indicates that during a division problem both subtractive and additive operations of the accumulator dials are involved. The mechanism for reversing these operations has been previously described. However, during division, additional controls are required so that the proper circuits will be established for negative multiplication when the reversing mechanism is negatively positioned, and proper circuits established for a corrective plus stroke when the reversing mechanism is positively positioned. To accomplish this, a switch 956 (Fig. 64) is provided, which is operated, in conjunction with the reversing mechanism, by the division control member 1027 in such a manner that it is in its positive position when the reversing mechanism is set for additive operation, and in its negative position when the reversing mechanism is set for subtractive operation.

Switch 956, which will be referred to as the overdraft sensing switch, is assembled into the supporting structure of the quotient selector switch 947, and comprises a contact blade 965, which is connected by way of a lead 966 with the multiplier selector switch 947, and, therefore, with the minus supply line 129 (Fig. 77B) through the various circuits controlled by the plungers 946 or 949. A second contact blade 967 is also connected with the quotient selector switch 947 through a lead 968, and is connectable with the minus supply line 129 by depression of one of the plungers 953, 954 or 955, as fully explained hereinbefore. Disposed between the contact blades 965 and 967 is a flexible contact blade 969 carrying two contact points 971 and 972 adapted to make contact with either switch blade 967 or 965. The flexible blade 969 is normally held in its positive position, as shown in Figs. 64 and 77B, by a link 973 (connected to the division control member 1027), which is engageable with the insulated upper extremity of flexible contact blade 969 for adjusting it to either its positive or negative position, depending upon the position of the division control member 1027. Contact blade 969 is connected with the main supply line 110 marked "Plus," by way of lead 975, division starting switch 976, lead 977, division key switch 970, and lead 427.

When switch blade 969 is in its negative position, in which contact is made with blade 965, the circuits prepared by depression of any of the plungers 946 or 949 will be completed when the division starting switch 976 is closed by cam 979 during the cycle of the program shaft 785; switch 970 having been closed by division key 109 at the beginning of the division problem. Likewise, if switch blade 969 is returned to its positive or overdraft sensing position, in which it makes contact with switch blade 967, the circuits prepared by depression of one of the plungers 953, 954 and 955 will be completed to the plus line 110 in the same manner, upon closure of division starting switch 976 by cam 979 on program shaft 785 (see item 7 in Fig. 78), during the second sensing cycle.

It will be noted, from Fig. 78, that the division start switch 976 is not closed until after the quotient sensing (item 5) has been advanced into active position, which means that roller 948 of switch lever 943 has been definitely positioned on the selected one of the spring raised plungers 946, 949, 953, 954 or 955 of switch 947 (Fig. 64). This timing is to prevent closure of any of the circuits controlled by the quotient selector switch 947 while switch arm 943 is being moved over the plungers to its selected position.

*Program shaft cycle*

After the dividend and divisor have been set up, depression of the division key 109 results in closure of contact 978 of switch 970 (Fig. 77B), the setting of switch leaf 969 to negative position, the setting of the reverse mechanism to subtractive position, and the starting of a program shaft cycle. Rotation of the program shaft results in the positioning of quotient cam 926, followed by operation of quotient sensing arms 932 and 933, which are stopped against the quotient cam, thereby stopping roller 948 over the selected plunger of switch 947; connection is thus made to the corresponding multiplier solenoid. Continued rotation of the program shaft closes division starting switch 976, thereby completing the circuit to the selected multiplier solenoid and resulting in the negative multiplication of the divisor by the predetermined quotient digit. Upon completion of the negative multiplication cycle the division control member 1027 moves to the left, returning the overstroke sensing switch blade 969 to its positive position, and at the same time setting the reverse mechanism for positive actuation and starting the second program shaft cycle. The same series of functions just described are then repeated; this time, however, the overdraft sensing switch 956 is in positive position and the reversing mechanism is set for positive actuation, so that if an overstroke is sensed the connections previously described are completed to the number one multiplier solenoid and a plus stroke is added in. If the sensing shows the correct quotient had been previously selected, connections are completed to initiate a shift clutch cycle whereby the rotatable member 290 of shift switch 119 is rotated to its next position, and the dividend sensing mechanism is shifted, to sense in the next lower order at the beginning of the next division cycle.

A shift cycle is also necessary after completion of a corrective plus stroke to prepare for the next division cycle. During the corrective stroke as described above, the overstroke sensing switch blade 969 is in its positive position, as shown in Fig. 79B. A third switch blade 960 (Figs. 66 and 77B) is provided on overdraft sensing switch 956 to cooperate (when the latter is in its positive position) with a contact point 600, which is secured to an insulating member 974 on switch blade 969 and is electrically connected to lead 427, thereby establishing a circuit to the shift solenoid 306 from the positive supply line 110, by way of lead 427, contact 600 and cam operated switch 659. As previously described with reference to Fig. 26, cam 668 is rotated by the main clutch and functions near the end of its cycle to close switch 659 and complete the shift solenoid circuits by way of lead 640, contacts 661 and 663, leads 409 and 429, thereby initiating a shift clutch cycle the function of which has been described. With switch blade 969 in its negative position, no shift will result from closure of cam switch 659 at the completion of the negative multiplication, because contact 600 is then away from switch leaf 960.

Zero quotient

In case an original zero quotient digit was sensed during the first sensing operation, roller 948 would have been positioned on plunger 949 while switch blade 969 was in its negative position. A circuit would thus have been completed to the shift solenoid 306 by way of lead 951, and a shift cycle immediately initiated.

Immediately following such shift cycle, a new division cycle in the next lower order should take place, and since a new division cycle is always started by the division control member 1027, means must be provided for operating this member into proper position following a shift cycle resulting from sensing of a zero quotient digit.

The means for accomplishing this comprises the cam 1093 (Fig. 64) which is fixed to the driven side of shift clutch 316 (Fig. 17) so as to be rotated in unison therewith. The rocking lever 1089 (Fig. 64) is equipped with a downwardly extending arm carrying a roller 1094, which contacts cam 1093 when member 1027 is in its most clockwise position. Upon rotation of the shift clutch 316, cam 1093 is rotated counter-clockwise, and it forces lever 1089 to rock clockwise about its pivot 1090, resulting in restoration of member 1027 to its counter-clockwise position. During this return movement, division control member 1027 initiates a program clutch operation in the manner hereinbefore described.

However, at this time it is desired to not latch member 1027 in its counter-clockwise, i. e., additive position, but instead, to allow it to immediately return to its subtractive position, and therefore latch lever 1030 is held disabled. The purpose of this arrangement is to allow member 1027 to position link 1069 to subtractive position and move switch 956 to its negative position for negative operation in the actuation directly following. The timing of cam 1093 (Fig. 64) and complementary cams 1076 (Fig. 43) is such that during this reciprocation of member 1027, the link 1069 is returned to subtractive position before cam follower 1075 is operated.

The extent of counter-clockwise restoring movement imparted to member 1027 by either roller arm 1087 or by cam 1093 is sufficient to return it to its extreme leftward position, where the upper latching step within notch 1098 of lever 1030 (Fig. 71) may engage lateral extension 1099 of member 1027. This is done to allow a certain amount of clearance to exist between the face 1026 of division member 1027 and roller 1025 on the lower part of the divsion key stem 1013, so that when the division operation is selectively or automatically terminated, (resulting in release of division stem 1013), roller 1025 may move upwardly to its raised position (Fig. 70) adjacent to the curved surface 1026 of division control member 1027, without contacting the same.

REGISTRATION OF QUOTIENT

During problems of division it is required that the final quotient digits, as determined by the hereinbefore described quotient sensing mechanism in successive cycles of operation, be entered successively into the multiplier or quotient register 107 (Fig. 1).

The mechanical setting up of the quotient digits is accomplished in the same manner in which the multiplier digits are set up by the multiplier selection mechanism, previously described, except that whereas the rocking of the selected shafts 166 to 175 (Fig. 33) is accomplished during multiplication set up by depression of keys 101 (Fig. 1), rocking of the shafts 166 to 175 during the set up of quotient digits is effected by quotient solenoids 952 (Figs. 33 and 77B) in accordance with the quotient digit sensed.

Quotient solenoids 952

A group of ten solenoids 952 (Figs. 33 and 77B) are provided. These are arranged arcuately about the axis of shaft 179 (Fig. 33) and are supported in an upright frame plate 989. Each solenoid has a normally ejected plunger 991, which is connected with a rocking lever 992 (Fig. 34) by means of a link 993. The rocking levers 992 are mounted freely on the near ends of shafts 166 to 175, to cooperate with levers 368, which are keyed to the shafts 166 to 175 as already described in connection with the multiplication key 105. As will be recalled, each lever 368 is equipped with a lateral ear 369. As shown in Figs. 33 and 34, levers 992 are assembled on the respective shafts 166 to 175 in such a manner that arms 994 on levers 992 contact the underside of ears 369 on levers 368 with which they are associated. Thus it is evident that when a quotient solenoid is energized, its plunger 991 is retracted and link 993 is pulled downwardly, rocking lever 992 counter-clockwise. This counter-clockwise movement of a lever 992 causes its arm 994 to exert pressure against ear 369 on lever 368 and thereby rock the shaft to which it is keyed an angular amount in counter-clockwise direction equal to the amount that it would be rocked upon depression of a factor set up key 101 in setting up a multiplier digit, as previously explained in connection with the multiplier set up. Rocking of one of shafts 166 to 175 by a quotient solenoid 952 will have the same effect on the shiftable set-up carriage 186 (Fig. 32) as though a factor key 101 had been depressed. Thus, the traveling carriage 186 is successively advanced, after each quotient digit is set up, from order to order until a total number of eight quotients have been automatically entered into register 107, or until the operator depresses the stop key 111 and thus terminates the division operation, as will appear hereinafter in connection with the description of said stop key. Rocking of any of shafts 166 to 175, by a quotient solenoid 952, will result in rocking of a slidable rocking lever 182 in carriage 186, with consequent rocking of the cooperating stop lever 194 and release of segmental lever 211, whereby the quotient digit is entered into the register 107 in the same manner as was completely described in connection with the multiplier set-up mechanism.

Quotient solenoid circuits

As described in connection with the quotient sensing, it is possible that the first sensing operation may result in the predetermined quotient digit being numerically one too high. The second sensing, however, determines whether the quotient digit selected was one too high or whether it was the correct digit. This being true, the circuits to the quotient solenoids 952 are arranged to be closed during the second sensing operation, so that the correct quotient solenoid 952 will be energized.

This is accomplished in the following manner, with reference to Fig. 77B. The first sensing cycle results in energizing one of the multiplier solenoids 424. In series with each of the multiplier solenoids 424 is a relay solenoid 425, which operates at the same time and closes a switch 961 associated therewith, which switch remains closed until after the second sensing operation. Closure of switch 961 partially completes a circuit to two numerically adjacent quotient solenoids 952 by way of leads 959 and 964. One or the other of these circuits is completed as the result of the second sensing operation in which the correct quotient is determined. As previously described, the second sensing operation results in depression of plungers 953, 954 or 955 of quotient selector switch 947. If the original quotient digit selected during the first sensing was correct, one of the plungers 953 or 954 will be depressed, and the circuit to the higher of the two quotient solenoids 952 (which numerically corresponds to the original quotient sensing) will be completed from contact 953 or 954 by way of leads 958, 959, switch 961, bus lead 962, and lead 963 to the negative supply line 129, thereby causing registration of the correct quotient digit in the register 107. If, on the other hand, an overstroke has occurred and the correct quotient digit is numerically one less than that originally sensed, then, as previously explained, plunger 955 of quotient switch 947 will be depressed, and the circuit to the quotient solenoid numerically one lower than that corresponding to the originally sensed quotient digit will be completed from contact 955, by way of lead 963, through the No. 1 multiplier solenoid 424 and main clutch solenoid 305, to lead 964, the closed switch 961, bus lead 962, and lead 963, to the negative supply line 129, thus resulting in energizing of the correct quotient solenoid 952 and registration in the register 107.

In case an original zero quotient digit has been sensed, as has been explained, a second sensing cycle is unnecessary. In this case, the zero quotient solenoid is energized during the first sensing operation; thus plunger 949 will be depressed and the circuit to the zero quotient solenoid completed from contact 949 by way of lead 951 to the negative supply line 129.

Inasmuch as switch 428 (Fig. 77B) is held open by the division key 109 during division cycles, the circuits to the multiplier solenoids 424, effected by the multiplier set up mechanism, are not closed, and consequently the multiplier solenoids will not be operated as a result of the quotient set up in register 107.

Relay switch 961

As explained above, deenergization of locking relay 425 occurs simultaneously with that of the associated multiplier solenoid 424, during the first program cycle. Mechanical means are provided to retain the respective relay switches 961 closed until the subsequent overdraft sensing operation has taken place.

As shown in Fig. 17, the arrangement is such that each switch 961 is normally held open by the insulated tip 981 of a spring pressed relay plunger 982. When relay 425 is energized, the plunger 982 is retracted against spring action, and its restraining influence is removed from the flexing contact blade 983 of switch 961, thus permitting blade 983 to close said relay switch 961. In order to mechanically lock plunger 982 in its retracted position until after the overdraft sensing operation, said plunger is provided on its opposite end with a cone shaped collar 980 adapted to be engaged by a latching bail 984 common to all of the relays 425. The latter is pivoted at 985 and is constantly urged to rotate in counter-clockwise direction by the tension spring 986. Thus, when a relay 425 is energized, plunger 982 is locked in its fully retracted position until the overdraft sensing has taken place and the lever 332 is rocked counter-clockwise by actuating member 319 (in the early part of the shift clutch operation), as described in connection with the overdraft sensing. The means whereby latching bail 984 may be rocked and disengaged from plunger 982, comprises a lateral extension 988 on lever 332, which is disposed beneath the forwardly projecting arm 987 of latching bail 984, in order that counter-clockwise rocking of lever 332 will exert upward pressure upon arm 987, thereby causing latching bail 984 to rock clockwise and be disengaged from collars 980, whereupon spring pressed plungers 982 will return to their initial position, thereby opening switches 961. The common latching bail 984 for locking all plungers 982 corresponds to the latching member of an ordinary flexible key row and releases any previously locked plunger whenever the latch is rocked as an incident to the latching of a newly actuated plunger 982.

DIVISION STOP KEY

Upon depression of stop key 111 (Figs. 1 and 73) the operator may terminate the division operation at any time.

Stop key 111 is slidably mounted on frame studs 1117 and is normally maintained in its raised position by a torsion spring 1118 tensioned beneath an ear 1119 on the stop key. The ear 1119 is disposed above a rearwardly extending arm 1121 on latch 1019, to be engaged thereby upon depression of stop key 111.

From the foregoing, it is evident that, at any time during the division operation, the operator may terminate such operation by merely depressing stop key 111, to force lateral ear 1119 thereof to act upon arm 1121 during its downward stroke, thus forcing latch lever 1019 (Figs. 72 and 73) to rock clockwise about its pivot 1122 to bring about disengagement thereof from ear 1018 of division stem 1013, which is restored to its raised position by spring 1017 as soon thereafter as the restoring of operating lever 1027 (Fig. 70) will permit, thereby stopping further division operation, as previously explained.

Automatic stop

If the stop key 111 is not depressed, division continues until the last order (the eighth in a machine of the size shown) of the dividend has been sensed and the last quotient digit registered, after which the machine is automatically stopped as follows:

As previously described, segment 302 (Figs. 17 and 73) is power restored step by step after each division cycle is completed. Fig. 73 shows the position it is in during the last division cycle, in which position it is one step away from the restored position it will reach as a result of the final shift, following completion of the last division cycle. In this position, ear 304 of segment 302 is disposed against camming face 1007 on the lower end of the latching lever 1019. During the final shift operation, ear 304 is forced against camming face 1007, thereby causing latching lever 1019 to be rocked clockwise a sufficient amount to disengage it from lug 1018 of division stem 1013 (Fig. 72), which is then free to be returned to its raised position by tension spring 1017. The dotted lines (Fig. 73) show the restored or initial positions of segment 302 and latching lever 1019. The return of division stem 1013 (Fig. 72) to its raised position results in opening of contacts 978 of switch 970, thereby opening the division circuit. Further division operation is stopped by roller 1025 again being positioned (Fig. 70) to retain division operating member 1027 from initiating another program cycle.

Description of Division Operation

The functions of the various elements of the division mechanism having each been separately described, a complete operation will now be traced:

The dividend is first set up in the multiplicand selection mechanism by striking the proper factor keys, and thereafter the dividend key 108 is struck. This initiates two operations. First, it actuates the same mechanism actuated by depression of the multiplication key, to release the traveling set-up carriage through unset orders of the multiplicand selection mechanism, and move the shift switch simultaneously into extreme clockwise operation, in which the first order multiplicand selection switch 118A is associated with the first order A of the solenoid banks 110 (Fig. 74A); second, it actuates the switch 641 (Fig. 77B) in the same manner as caused by depression of the addition key 102, to initiate a main clutch cycle and multiply the dividend by one and transfer it into the higher orders of the accumulator register.

At the completion of the main clutch cycle, a clear operation is automatically instituted (as in addition), to clear the multiplicand register, restore the traveling set-up carriage to normal position, and release the dividend key; but leaving the dividend in the accumulator register. Registration of the dividend in the accumulator, rocks the dividend sensing levers 594 (Fig. 2) in accordance with the digits of the dividend.

The divisor is next set up in the multiplicand register by striking the proper factor keys, which sets up the multiplicand selection switches 118 in as many orders as there are digits in the divisor, and then striking the division key 109. This initiates several operations, which may be grouped as follows:

1. It shifts the traveling set-up carriage through unset divisor orders in the multiplicand set-up mechanism into the first multiplier (now quotient) position, shifting the dividend sensing mechanism 731 (Figs. 2 and 56) into leftmost position to sense the three leftmost (highest) orders in the accumulator register, and positioning the shift switch 119 to connect the highest order multiplicand selection switches 118 with the highest order group of partial product solenoids, so that the first actuation cycle will take place in the highest orders;

2. It closes contacts 978 of division switch 970 (Fig. 77B) and releases division control member 1027 (Fig. 70), to thereby condition reverse control link 1069 (Fig. 43) for subsequent negative actuation by the program shaft; sets the overdraft sensing switch 956 (Fig. 77B) to its negative position; and releases the program clutch 1051 (Fig. 74) to initiate the first cycle of movement of the program shaft.

The first movement of the program shaft results in setting the previously conditioned reverse mechanism for negative or subtraction actuation and initiates a sensing cycle in which the dividend sensing levers 775, 776 and 777 (Fig. 56) are moved into contact with the first three accumulator levers 594 (Fig. 2), thereby shifting the higher comparator dividend gear 823 and the lower comparator dividend gear 812 through angles proportional to the value represented by the first three digits of the dividend and proportional to the value represented by the 2nd and 3rd digits of the dividend, respectively.

At the same time, the divisor lock gate 841 (Fig. 2) moves in to lock the first three divisor check dials against movement during divisor sensing, and hold the divisor sensing stud 858 (Fig. 53) in position representative of the value of the first three digits of the divisor, and the shaft 854 (Fig. 18) is rotated to bring the sensing lever 861 against stud 858 and set the divisor segments 876 and 877. Since the first accumulator digit is normally set at zero at the beginning of a division operation, the higher comparator divisor segment 876 will be retained in normal, inactive position by lug 889a (Fig. 53) and only the lower comparator segment 877 will be actually set to active position.

Movement of the lower comparator dividend gear 812 is transmitted through its logarithmic conversion mechanism to sun gears 903, 908, respectively (Fig. 58), and movements of the higher and lower comparator divisor segments 876 and 877 are transmitted through their logarithmic conversion mechanisms to the sun gears 925, 925, respectively (Fig. 58). Of course, if the first accumulator digit is zero as above mentioned, the higher comparator divisor sun gear 925 (on the right in Fig. 58) does not move. In each comparator, the sun gears 908 and 925 cooperate to rotate their associated stepped quotient cam 926 (Fig. 68) through an angle equal to the difference between the angles of rotation of the dividend sun gear 908 and the divisor sun gear 925, and proportional to the logarithm of the quotient.

The quotient sensing levers 932 and 933 are next rocked toward the stepped quotient cams 926 until one of them contacts its associated cam. The shaft 891, on which the levers 932 and 933 are mounted, rocks through an angle determined by the highest step on either of the cams 926, which are in the paths of the sensing levers 932 and 933, respectively, and this motion is transmitted to the arm 943, carrying roller 948, which closes contacts in the quotient selector switch 947 (Fig. 77B), preparing a circuit to the particular multiplier solenoid 424 corresponding to the quotient digit sensed.

With the above function completed, continued rotation of the program shaft closes division cam switch 976 (Fig. 77B), thereby completing the circuit through the selected multiplier solenoid 424 corresponding to the quotient digit sensed, and also completing the circuit through a corresponding relay solenoid 425 and the main clutch solenoid 305. Energization of the main clutch solenoid 305 causes engagement of main clutch 341 for a single revolution. Rotation of the main clutch 341 results in a series of functions most of which have been separately described. These functions are performed in sequence, timed approximately as shown in Fig. 73, to complete the actuation cycle and control other parts, which will be fully described as this description progresses.

As noted from the operation chart (Fig. 78), the first function of the main clutch 341 is to effect the closure of those gang switches 121 (Fig. 77), in all orders, corresponding to the numerical value of the quotient digit sensed during the program clutch cycle. Directly after closure of gang switches 121, the main switch 131 (Fig. 77) is closed, by rotation of cam 458 (Fig. 76), which is secured to the sleeve 694 rotated by the main clutch 341. This results in completion of the partial product circuits which were partially completed by the introduction of the divisor digits into the multiplicand selection switches 113 (Fig. 77A).

After the solenoid stops have been ejected, the main clutch functions to operate the actuator.

After actuation has been substantially completed the main clutch, as its final function, restores the division control member 1027 to its leftmost position (Fig. 74). Restoration of member 1027 initiates the second program shaft operation, whereby the second sensing is accomplished.

If an overstroke is sensed, the circuit is completed to the No. 1 multiplier solenoid 424 and main clutch solenoid 305, resulting in a single cycle of the main clutch and a corrective plus stroke.

The main clutch operation, as a result of a corrective plus stroke being sensed, always initiates a shift operation. This is due to the fact that contacts 690 (Fig. 77B) are closed when the division control member 1027 is latched in its leftmost, i. e., plus position. Thus, near the end of the main clutch cycle, the circuit to the shift solenoid 306 is closed by cam operated switch 659, to initiate a shift cycle as previously described. Timing of this shift cycle is shown in operation 19 on operation chart Fig. 78.

Since shift switch 659 is closed by the main clutch operated cam 668, and since a shift is not desired until after the second sensing operation, contacts 690 are held open by means of member 973 (Fig. 77B) while the division control member 1027 is in its rightmost, i. e. subtractive position, during the subtractive main clutch operation. This ineffective shift switch operation is shown at 16 on operation chart Fig. 78.

If, during the second program cycle the sensing shows that an overstroke has not been made, a shift is immediately initiated as previously described under "Quotient sensing" and the various members shifted to position for the following division cycle in the next lower order.

As previously described under "Quotient sensing mechanism," if an initial zero quotient is sensed during the first program shaft cycle, an immediate shift is initiated to position the various members for the next division cycle.

To clarify the operation in the first and succeeding division cycles, the division problem 5727÷36=159.0833 will be traced to illustrate the various functions of the machine, in the order in which they occur, with reference to chart "A."

*Chart A*

["5727÷36=159.0833"]

| 1 | 2 | 3 | 4 | 5 | 6 | 7 | 8 |
|---|---|---|---|---|---|---|---|
| Division cycle | Accumulator register 104 nine highest orders | Program clutch first quotient sensing | Main clutch cycle | Program clutch second quotient sensing | Corrective plus stroke | Shift | Display of quotient |
| | 1 2 3 4 5 6 7 8 9 | | | | | | |
| #1 | 0 5 7 2 7 0 0 0 0<br>0 3 6 0 0 0 0 0 0 | 1 | Yes | | | | |
| | 0 2 1 2 7 0 0 0 0 | | | 0 | No | Yes | 1 |
| | 0 2 1 2 7 0 0 0 0<br>0 2 1 6 0 0 0 0 0 | 6 | Yes | | | | |
| #2 | 9 9 9 6 7 0 0 0 0<br>0 0 3 6 0 0 0 0 0<br>0 0 3 2 7 0 0 0 0 | | | 9 | Yes | Yes | 5 |
| #3 | 0 0 3 2 7 0 0 0 0<br>0 0 3 2 4 0 0 0 0 | 9 | Yes | | | | |
| | 0 0 0 0 3 0 0 0 0 | | | 0 | No | Yes | 9 |

Chart A—Continued

["5727÷36=159.0833"]

| 1<br>Division cycle | 2<br>Accumulator register 104 nine highest orders | 3<br>Program clutch first quotient sensing | 4<br>Main clutch cycle | 5<br>Program clutch second quotient sensing | 6<br>Corrective plus stroke | 7<br>Shift | 8<br>Display of quotient |
|---|---|---|---|---|---|---|---|
| #4 | 0 0 0 0 3 0 0 0 0 | 0 | No | | No | Yes | 0 |
| #5 | 0 0 0 0 3 0 0 0 0<br>0 0 0 0 2 8 8 0 0 | 8 | Yes | | | | |
|  | 0 0 0 0 0 1 2 0 0 | | | 0 | No | Yes | 8 |
| #6 | 0 0 0 0 0 1 2 0 0<br>0 0 0 0 0 1 0 8 0 | 3 | Yes | | | | |
|  | 0 0 0 0 0 0 1 2 0 | | | 0 | No | Yes | 3 |
| #7 | 0 0 0 0 0 0 1 2 0<br>0 0 0 0 0 0 1 0 8 | 3 | Yes | | | | |
|  | 0 0 0 0 0 0 0 1 2 | | | 0 | No | Yes | 3 |
| #8 | 0 0 0 0 0 0 0 1 2<br>0 0 0 0 0 0 0 1 0 | 3 | Yes | | | | |
|  | 0 0 0 0 0 0 0 0 2 | | | 0 | No | Yes | 3 |
|  | | | | | | Last shift releases division key 109 | |

Chart A helps to show in tabular form what takes place during each division cycle and will be helpful in following the description. The first column headed "Division cycle" simply numbers each complete division cycle. The dotted lines divide each division cycle into its two program shaft cycles. The second column will be described later. The third column headed "Program clutch first quotient sensing" shows the quotient digit sensed during the first program shaft cycle. The fourth column headed "Main clutch cycle" indicates whether or not a main clutch cycle follows the first program cycle. The fifth column headed "Program clutch second quotient sensing" shows the quotient digit sensed during the second program shaft cycle. The sixth column headed "Corrective plus stroke" shows whether or not a corrective plus stroke is made. The seventh column headed "Shift" shows "yes" in each division cycle but indicates whether the shift follows the first or second program shaft cycle. The eighth column headed "Display of quotient digit" indicates the quotient digit entered into the register 107. It will be noted that with the exception of the fourth division cycle, which has only one program shaft cycle, the quotient digit is registered following the second program shaft cycle, but the digit registered does not always correspond to the first quotient digit sensed, which is shown in the third column headed "Program clutch first quotient sensing."

The second column headed "Accumulator register 104" can best be explained during the description. It can be stated, however, that in each division cycle, as indicated by column 1, the first number in column 2 for that particular division cycle, shows the digits registered at that time in the accumulator register 104 which are used for comparison with the divisor during the first sensing operation in that division cycle.

The first step in the performance of the above problem comprises the introduction of the dividend digits 5727 into the accumulator register 104. This is shown as the first or top number in the second column, in the first division cycle. It will be noted that a zero digit is shown in the first dial, followed by the dividend digits in proper order. A zero digit will always be registered in the leftmost, i. e., highest order of the accumulator register if the dividend is first introduced directly by use of the dividend key.

Divisor set up

With the dividend set up and the other elements automatically normalized following depression of the dividend key, the operator next proceeds with the set-up of the divisor digits "36." These two digits are entered into the two leftmost multiplicand selection switches 118 (Fig. 79A).

Division key depressed

In order to initiate the actual division operation, the division key 109 (Figs. 1, 47 and 77B) is now depressed. Thereupon, set-up carriage 186 is escaped through the remaining six unset orders of multiplicand set-up sections, and the rotatable member 290 of shift switch 119 (Fig. 2) is rotated to its extreme clockwise position, in which the first multiplicand selection switch 118 (with a "3" set up) is connected to the highest order bank of partial product solenoids, and the second multiplicand selection switch (with a "6" set up) is connected to the second highest order bank of solenoids (see Figs. 2, 16A and 77A). The dividend sensing carriage 731 (Figs. 50 and 56) is moved to its leftmost position in which dividend sensing levers 775, 776 and 777 are adapted to sense the first, second and third orders of dividend register 104, respectively, which show the digits 057 (see problem Chart A); also the contacts 978 (Figs. 72 and 77B) have been closed to condition the division circuit; and division control member 1027 is released (Figs. 70, 71 and 74). As a result, a cycle of the program shaft is instituted (see description of "Division key and initiation of division operation" for complete description).

Division cycle #1

The various functions of the program shaft have been thoroughly described and the mechanical details will not be repeated; however, a few functions pertaining to this program should be pointed out. Since the dividend sensing levers 775, 776 and 777 (Fig. 56) have been moved to the extreme left position, the three dividend digits sensed are 057; therefore the value entered into the higher comparator by the dividend sensing mechanism is 0.57 which is below the value of 1, while that entered into the lower comparator is 5.7. The value entered into the lower comparator by the divisor sensing mechanism is 3.6, while that entered into the higher comparator by the divisor sensing mechanism is 10, since when the highest of the three dividend digits sensed is zero the divisor mechanism for the higher comparator is blocked in its 10 position.

Referring now to Fig. 52, the quotient digit sensed in the higher comparator will be zero, since the value entered into the higher comparator by the dividend is 0.57, which on the diagram is below point 10, while the divisor value is held at 10. Now considering the lower comparator, the dividend value is 5.7 and the divisor is 3.6; drawing a straight line 880 between these points the quotient line is cut between points 1 and 2, thus the quotient sensed is 1 (see column 3 for No. 1 division cycle) and this, as previously explained, results in energizing the No. 1 multiplier solenoid to multiply the divisor factor 36 by 1, and subtracts it from dividend 05727 leaving a value of 02127 in the accumulator dials for the second sensing operation, which will determine if the quotient 1 is correct. Referring to the chart, this figure 02127 is shown in the first (#1) division cycle and in the line for the second sensing operation. Since no shift has taken place, the three dividend digits sensed this time will be 021, this value will be compared with the divisor 36, and the quotient sensed will be zero, indicating that the original sensing of quotient digit 1 was correct. As shown by the chart under columns 5, 6, 7 and 8, the second sensing in the No. 1 division cycle results in a zero quotient, no corrective plus stroke, a shift cycle, and a quotient display of 1.

Division cycle #2

The shift operation at the end of the first division cycle results in shifting the dividend sensing carriage 731 with the sensing levers 775, 776 and 777, one order to the right and starting the first program cycle in the second division cycle. Referring to Chart A, the remaining dividend shown in the accumulator dials is still 02127; the sensing levers 775, 776 and 777, however, have been moved one order to the right so this time the value 212 in the 2nd, 3rd, and 4th dials will be sensed. The value entered into the higher comparator by the dividend sensing is therefore 2.12 while that entered into the lower comparator is 1.2. The value entered into both the comparators by the divisor sensing is now 3.6, the divisor mechanism for the higher comparator being free to operate this time, since the highest dividend digit sensed is not zero.

Referring again to the logarithmic diagram of Fig. 52, and considering first the highest comparator, the dividend value entered into the higher comparator is 2.12 and the divisor value is 3.6. A straight line 890 drawn between these points crosses the quotient line very slightly below the digit 6. As previously explained, in order to avoid the possibility of sensing too low a quotient digit, the quotient cam is arranged to sense a little high; therefore, in this case, the quotient sensed is 6 (note column 3 on Chart A for the second division cycle). This results in multiplying the divisor 36 by 6 and subtracting the product 216 from the value 212 in the accumulator register. Since the amount subtracted is greater than the value in the accumulator dials, the accumulator will register a series of 9's in the higher orders as shown in Chart A at the beginning of the second sensing operation in the second division cycle. No shift having taken place, the dividend sensing again takes place in the second, third and fourth orders which now show digits 996. Referring to Fig. 52, it is evident that with the higher comparator showing a dividend value of 9.96 and the divisor 3.6 that the quotient would be greater than 9, and since the quotient cam is limited by a stop to a maximum position of 9, the quotient sensed is 9, which, as previously explained under quotient sensing, indicates that the quotient digit 6 first sensed was too high and provides the means whereby a corrective plus stroke is taken. Referring to Chart A under the second division cycle, columns 5, 6, 7 and 8 show that the second sensing operation results in a 9 quotient digit sensed, a corrective plus stroke, a shift and a quotient display of 5, which is a correction from the first quotient sensing of the digit 6 (column 3). The corrective plus stroke adds the value of 36 back into the accumulator resulting in the dials now displaying 00327.

It might be well at this time to recall that the shift operation also positions the movable member 290 of the shift switch 119 one order lower each time so that the divisor (36) set up in the multiplicand selection switches 118 is connected to the next lower group of partial product solenoids after each shift, and actuation occurs in the next lower order of accumulator dials.

Division cycle #3

At the commencement of operations in the third cycle, the register 104 (Chart A) shows the digits 00327. The dividend sensing levers, having been shifted another step, now sense the third, fourth, and fifth accumulator dials, so that a dividend of 327 is compared with a divisor of 36. The first sensing operation in this order will therefore result in a "9" quotient and the product of 36×9, equaling 324, will be subtracted from 327 during the ensuing negative actuating stroke, which will leave 000030000 in the accumulator register 104. Therefore, a dividend value of 003 is compared with the divisor 36 during the succeeding second sensing operation and will result in a "0" quotient being sensed, which, as previously described, shows that the digit 9 first sensed was correct. The operation is therefore terminated in this cycle with the display of a "9" quotient in quotient register 197, and a shift into the next lower orders. Operation is initiated in the next orders in the same manner as described hereinbefore.

Division cycle #4

The shift of the dividend sensing levers 775, 776 and 777 having taken place at the end of the third division cycle, the divisor 36 is, in the fourth cycle, compared with a dividend figure of 030, as a result of which a "0" quotient is sensed. Due to this initial "0" sensing during the first program clutch operation, an immediate shift is instituted without a main clutch cycle. Chart A for the fourth division cycle shows only one program cycle and columns 3, 4, 5, 6, 7 and 8 show what has taken place. The means whereby the immediate shift takes place has been previously described and will be recalled by referring to Fig. 77B. Thus when the zero digit was sensed in the first program cycle, switch 956 was in its negative position with contacts 972 closed. With a zero sensing, contact 949 is closed, and the shift solenoid energized when cam switch 976 is closed by the program shaft.

Division cycle #5

At the beginning of the fifth cycle, the accumulator register 104 (Chart A) indicates a remaining dividend figure of 000030000. The quotient register 107 (Fig. 1) shows 1590. As a result of the last shift operation dividend sensing levers 775, 776 and 777 (Fig. 56) are now positioned to sense the 5th, 6th and 7th dividend orders, respectively. The dividend of 300 is therefore compared with the divisor 36 and the quotient digit 8 is sensed as a result of the first program clutch operation. This is followed by a negative actuation during which the product of 36×8, equaling 288, is subtracted from the above dividend of 300. The dividend is thus reduced to 000001200, and consequently, during the second sensing operation, a dividend of 012 is compared with the divisor 36, and a "0" quotient is sensed, indicating that the quotient digit 8 first sensed was correct. This cycle terminates with registration of an "8" quotient digit in the 5th dial of register 107 (Fig. 1), and a shift into the next lower order.

Division cycles #6, 7 and 8

The sixth, seventh and eighth division cycles are repetitions of the first, second, and fifth division cycles in so far as the sequence of operations are concerned. In each of these cycles the second sensing is a "0," and therefore the selective plus stroke is unnecessary, and a shift is instituted. After the eighth cycle is completed, in a machine comprising the number of orders illustrated in the present embodiment of the invention, division is automatically terminated as described under "Automatic stop."

Having fully described the preferred embodiment of this invention, it is to be understood that I do not wish to be limited to the exact construction herein set forth, which may obviously be varied in detail without departing from the spirit of this invention, but only as set forth in the appended claims.

I claim:

1. In a calculating machine; multiplicand and multiplier factor receiving mechanisms, an accumulator comprising a plurality of ordinal accumulator units; a driving mechanism; an actuator comprising a plurality of ordinal actuator units, each intermediate ordinal unit of which includes a units actuator member and a tens actuator member each member being operable to control the transmission of movement from the driving mechanism to the accumulator; ordinal groups of digital members selectively operable to control said units and tens actuator members to cause the amounts of movement transmitted under the control of said members to correspond to the units digits and the tens digits, respectively, of the partial products of the factor digits entered in said factor receiving mechanisms, each intermediate ordinal group of digital members including, certain digital members which are each operable under control of said factor receiving mechanisms to control only the units actuator member of one ordinal actuator unit, certain digital members which are each operable under control of said factor receiving mechanisms to control only the tens actuator member of an adjacent ordinal actuator unit, and certain other digital members; and means operable under control of said factor receiving mechanisms for operating each of said last mentioned other digital members to control either said units actuator member or said tens actuator member.

2. In a calculating machine, a multiorder accumulator register and product-entering mechanism associated therewith, in which the mechanism in each intermediate order has a units member and a tens member operative to control the entry of amounts in that order; a plurality of banks of control elements, each bank having a units group of control elements cooperating with the units member in one order of the product-entering mechanism and a tens group of control elements cooperating with the tens member in the next higher order of said mechanism; multiplicand and multiplier factor setting means; and partial product means cooperating therewith for positioning the units control elements and the tens control elements, respectively, in said banks in accordance with units and tens digits of partial products of multiplicand digits with multiplier digits, in which at least a part of said control elements in each of said banks are common to both said units group and tens group.

3. A calculating machine as described in claim 2 in which said units and tens members are mounted for movement along a common path, and in which said control elements are solenoids having fingers movable into and out of said path.

4. In in calculating machine, a multiorder accumulator register and product-entering mechanism associated therewith, in which the mechanism in each intermediate order has a units member and a tens member operative to control the entry of amounts in that order; a plurality of banks of control elements, each bank having a units group of control elements cooperating with the units member in one order of the product-entering mechanism and a tens group of control elements cooperating with the tens member in the next higher order of said mechanism; multiplicand and multiplier factor setting means; and partial product means cooperating therewith for positioning the units control elements and the tens control elements, respectively, in said banks in accordance with units and tens digits of partial products of multiplicand digits with multiplier digits in which all of said control elements in each of said banks are mounted in coplanar relation in a single row and the units and tens members, respectively, of the two adjacent orders of the accumulator mechanism are mounted for movement through paths alined with said single row of control elements.

5. A calculating machine as defined in claim 4, in which said control elements in each bank are mounted in an arcuate row and said units member and tens member are mounted for rotation about an axis concentric with respect to said arcuate row.

6. In a calculating machine, a multiorder accumulator register and product-entering mechanism associated therewith, in which the mechanism in each intermediate order has a units member and a tens member operative to control the entry of amounts in that order; a plurality of banks of control elements, each bank having a units group of control elements cooperating with the units member in one order of the product-entering mechanism and a tens group of control elements cooperating with the tens member in the next higher order of said mechanism; multiplicand and multiplier factor setting means; and partial product means cooperating therewith for positioning the units control elements and the tens control elements, respectively, in said banks in accordance with units and tens digits of partial products of multiplicand digits with multiplier digits, in which at least a part of the control elements in said units group corresponding to the digits 5, 6, 7, 8 and 9 are common to at least a part of the control elements in said tens group corresponding to the digits 8, 7, 6, 5 and 4, respectively.

7. In a calculating machine, a multiorder accumulator register and product-entering mechanism associated therewith, in which the mechanism in each intermediate order has a units member and a tens member operative to control the entry of amounts in that order, a plurality of banks of control elements, each bank having a units group of control elements cooperating with the units member in one order of the product-entering mechanism and a tens group of control elements cooperating with the tens member in the next higher order of said mechanism; multiplicand and multiplier factor setting means; and partial product means cooperating therewith for positioning the units control elements and the tens control elements, respectively, in said banks in accordance with units and tens digits of partial products of multiplicand digits with multiplier digits, in which all said control elements in each of said banks are mounted in co-planar relation in a single row, and the units and tens members, respectively, of the two adjacent orders of the product-entering mechanism are mounted for movement towards each other from opposite ends of said common row, the units control elements being arranged consecutively from one end of said row toward the other and the tens elements being arranged consecutively from the other end of said row toward the first end and at least a part of the control elements in the midportion of each row being adapted to exercise either units or tens control.

8. In a calculating machine, in combination: a multiorder, nonshiftable accumulator mechanism; a plurality of groups of electromagnetic devices, each group permanently associated with and controlling the operation of predetermined orders of said accumulator mechanism; a partial product multiplying means including a plurality of electrical circuits for selectively operating said electromagnetic devices in each group; multiplicand switching means and multiplier switching means in said circuits which jointly determine the energization of selected ones of said circuits so as to operate selected ones of said electromagnetic devices corresponding to the digital values of the partial products to the multiplicand and multiplier; and means including a multiplicand shift switch in said circuits for connecting said multiplicand switching means into the circuits operating selected groups of said devices.

9. In a calculating machine, in combination: a multiorder non-shiftable accumulator mechanism; a plurality of groups of electromagnetic devices, each group permanently associated with and controlling the operation of predetermined orders of said accumulator mechanism; a partial product multiplying means including a plurality of electrical circuits for selectively operating said electromagnetic devices in groups; a multiorder multiplicand selecting mechanism and a multiorder multiplier selecting mechanism including multiplicand switching means and multiplier switching means controlled by said multiplicand and multiplier selecting mechanisms respectively, said two switching means being in said electrical circuits and being jointly operable to determine the energization of selected ones of said circuits so as to operate selected ones of said electromagnetic devices corresponding to the digital values of the partial products of the multiplicand and multiplier; a multiplicand shift switch in said circuits for connecting said multiplicand switching means into the circuits operating selected groups of said devices, a multiplier shift switch to control said multiplier switching means for successive actuation thereof according to the value in selected orders of said multiplier selecting mechanism, and means synchronized with said multiplier shift switch for operating said multiplicand shift switch to successively connect said multiplicand switching means into the respective circuits operating different orders of said devices.

10. In a calculating machine; a multiorder accumulator; multiplicand set up means, including a plurality of selective control means adapted to simultaneously retain settings in accordance with the different digits of a multiplicand; multiplier set up means, including a plurality of multiplier selective control means adapted to receive and retain settings corresponding to the different digits of a multidigit multiplier; multiorder multiplying means associated with respective orders of said accumulator and including partial product circuits adapted to be selectively completed in accordance with the settings of said multiplicand and multiplier selective control means for simultaneously multiplying all multiplicand digits set up in said multiplicand selective control means by a single multiplier digit set on said multiplier selective control means, and entering the product in said accumulator; the orders of said multiplying means being greater in number than the orders of the multiplicand selective control means and being divisible into successive overlapping groups, each group containing the same number of orders as does the multiplicand selective control means, movable shift means for successively associating said plurality of multiplicand selective control means with successive groups of orders of said multiplying means, and means for repeatedly effecting simultaneous closure of said partial product circuits, each successive closure being made in accordance with the setting of a successive multiplier selective control means.

11. In an electrical selection calculating machine employing partial product circuits; multiorder accumulator register means, multiorder actuating mechanism for said accumulator register means; a plurality of banks of partial product electrical devices, each bank permanently associated with and controlling particular orders of the accumulator register actuating mechanism, and each bank containing devices representing all digital values in all products of any two single-digit factors; a plurality of multiplier switches; means constituting a plurality of partial product circuits, each circuit including in permanent connection one of said banks of partial product devices and one of said multiplier switches; a plurality of groups of multiplicand switches, each switch in each respective group representing a different digital value, the groups being less in number than the number of orders in said accumulator register means, and representing different orders in a multiplicand; means for closing and maintaining closed a multiplicand switch in each of a plurality of said groups, each closed switch representing the digital value in a respective order of a multiplicand; means for successively closing multiplier switches representing digital values in successive orders of a multiplier; a current source; shift switch means for selectively connecting said multiplicand switches and said current source to any one of a plurality of groups of said partial product circuits, and means for actuating said shift switch means in synchronism with said means for successively closing said multiplier switches.

12. In a calculating machine; an accumulator, a keyboard, a multisection factor set-up mechanism divided into multiplicand and multiplier groups, each section comprising a selection element settable in accordance with different digital values; multiplying means controlled by said selection elements for successively multiplying a multiplicand set up in the multiplicand group of selection elements by successive digits of a multiplier set up in the multiplier group and entering the products in the accumulator; a travelling carriage movable into operative relation with each section in each group of said set-up mechanism and comprising means responsive to said keyboard to set the section in operative relation therewith, shift means for selectively associating said factor set-up mechanism with different orders of said accumulator; a control key and means responsive to actuation thereof following setting up of a multiplicand in said multiplicand group of selection elements, for advancing said carriage into the multiplier group of the set-up mechanism, and shifting said shift means into position associating said factor set-up mechanism with the higher orders of said accumulator, and means responsive to subsequent setting of said multiplier group of selection elements by subsequent actuation of said keyboard, to start operation of said multiplying means and enter partial products of the multiplicand by successive digits of the multiplier into said accumulator.

13. In a calculating machine, a multiorder factor set-up mechanism, including a plurality of similar selection elements in a row and a travelling set-up carriage and an associated 10-key keyboard, for first selectively setting a first leftmost group of the selection elements in accordance with successive digits of a multiplicand, and subsequently selectively setting a second rightmost group of selection elements in accordance with successive digits of a multiplier; multiorder accumulator means and computing means, including actuators, associated therewith, said actuators being jointly controlled by said multiplicand and multiplier selection elements to enter partial products of numbers set up therein into said accumulator; shift means for selectively bringing said selection elements into operative relationship with different groups of orders in the accumulator; an operating key and means responsive to actuation thereof for automatically moving said set-up carriage past all unselected elements in said leftmost or multiplicand group and advancing it into operative relationship with the highest order of selection element in the rightmost or multiplier group, and for simultaneously operating said shift means to bring the multiplicand selection elements into operative relationship with the higher orders of the accumulator mechanism.

14. In a calculating machine; a factor set-up mechanism; a multiorder accumulator register; shift mechanism for operatively associating said set-up mechanism with different orders of said accumulator register; actuating means for entering values into those orders of said accumulator register operatively associated with said set-up mechanism; power means cyclically operative to drive said actuating means, including a main clutch; calculation control means including multiplication control means and addition control means, each operable to initiate operation of said main clutch; means for shifting said shift mechanism including a shift clutch; means for clearing said set-up mechanism including a clear cluch; shift clutch control means; clear clutch control means; a member selectively positioned in response to operation of said calculation control means for alternatively determining operation of one or the other of said two clutch control means; and means driven in timed relation to said main clutch, and operable in accordance with the positioning of said member to effect operation of said shift clutch control means in response to operation of said multiplication control means, and to effect operation of said clear clutch control means in response to operation of said addition control means.

15. In a calculating machine, ordinal selection mechanisms and a set-up carriage associated therewith which is movable into a plurality of different ordinal positions; a multiorder accumulator; shift mechanism for operatively associating said selection mechanisms with different orders of the accumulator; spring means for advancing said shift mechanism order by order from lower to higher orders of the accumulator in unison with movement of said set-up carriage from normal position; and cyclically operable means for effecting reverse movement of said shift mechanism, order by order, to operatively associate each of said selection mechanisms with successively lower orders of the accumulator respectively, independently of movement of the set-up carriage.

16. A calculating machine as described in claim 15, including a pawl movable into position for preventing advance of said shift mechanism by said spring means, said pawl being normally in inactive position; and means for moving the pawl into active position in response to operation of said cyclically operable means.

17. A calculating machine as described in claim 15, including a pawl movable into position for preventing advance of said shift mechanism by said spring means, said pawl being normally in inactive position; means for moving the pawl into active position in response to operation of said cyclically operable means; and means responsive to restoration of said set-up carriage to normal position for restoring said pawl to inactive position.

18. In a calculating machine having an ordinal accumulator, means for initially entering a dividend in said accumulator, a divisor receiving means, and means for entering a divisor therein; a dividend comparator member, means controlled by a plurality of orders of said accumulator for adjusting said comparator member to a position representative of a value entered in such orders, a divisor comparator means, means controlled by said divisor receiving means for controlling said divisor comparator means, and mechanism controlled jointly by said dividend comparator member and said divisor comparator means for forming a representation of a value of that one of a plurality of tentative partial quotients which corresponds approximately to the true quotient of the dividend and divisor entered in said accumulator and said divisor receiving means respectively.

19. In a calculating machine having an accumulator, means for initially entering a dividend in said accumulator, an ordinal divisor receiving means, and means for entering a divisor therein; dividend comparator means, means controlled by an element of said accumulator for controlling said dividend comparator means, divisor comparator means, means controlled by a plurality of orders of said divisor receiving means for controlling said divisor comparator means, and mechanism controlled jointly by said dividend comparator means and said divisor comparator means for forming a representation of a value of that one of a plurality of tentative partial quotients which corresponds approximately to the true quotient of the dividend and divisor entered in said accumulator and said divisor receiving means respectively.

20. In a calculating machine having an accumulator, means for initially entering a dividend in said accumulator, an ordinal divisor receiving means, and means for entering a divisor therein; dividend comparator means, means controlled by an element of said accumulator for controlling said dividend comparator means, a divisor comparator member, means controlled by a plurality of orders of said divisor receiving means for adjusting said divisor comparator member to a position representative of a value entered in such orders, and mechanism controlled jointly by said dividend comparator means and said divisor comparator member for forming a representation of a value of that one of a plurality of tentative partial quotients which corresponds approximately to the true quotient of the dividend and divisor entered in said accumulator and said divisor receiving means respectively.

21. In a calculating machine having an ordinal accumulator, means for initially entering a dividend in said accumulator, an ordinal divisor receiving means, and means for entering a divisor therein; a dividend comparator member, means controlled by a plurality of orders of said accumulator for adjusting said comparator member to a position representative of a value entered in such orders, divisor comparator means, means controlled by a plurality of orders of said divisor receiving means for controlling said divisor comparator means, and mechanism controlled jointly by said dividend comparator member and said divisor comparator means for forming a representation of a value of that one of a plurality of tentative partial quotients which corresponds approximately to the true quotient of the dividend and divisor entered in said accumulator and said divisor receiving means respectively.

22. In a calculating machine, a multiorder dividend register, and means for setting a multidigit dividend therein; a divisor receiving means and means for setting a multidigit divisor therein; comparator means for comparing said dividend with said divisor and preestimating the quotient digit thereof, including: a dividend comparator member, a divisor comparator member, a quotient member having a plurality of positions corresponding to the digits one to nine, means controlled by said dividend register for moving said dividend comparator member to a position corresponding to a multidigit dividend value, and means controlled by said divisor receiving means for moving said divisor comparator member to a position corresponding to a divisor value, and means controlled jointly by said dividend and divisor comparator members for moving said quotient member directly to the one of said positions which corresponds to the preestimated value of the quotient of said dividend and divisor; computing means jointly responsive to said divisor receiving means and said comparator means for multiplying the divisor by the preestimated quotient digit and negatively entering the product thereof into the dividend register.

23. In a calculating machine, a dividend set up mechanism; a divisor set up mechanism; a displaceable dividend comparator member, and means for displacing it a distance proportional to the logarithm of a number set up in the said dividend set-up mechanism; a displaceable divisor comparator member, and means for displacing it a distance proportional to the logarithm of the number set up in said divisor set-up mechanism; a displaceable quotient element movable through a range representing logarithms of quotient values extending from a fixed minimum value less than 1 but greater than zero; means differentially responsive to displacement of said dividend and divisor comparator members for displacing said quotient element, said means including connections between said comparator members and said quotient element, at least one of which connections is yieldable to permit retention of the quotient element at the lower end of its range when the quotient is less than said fixed minimum value.

24. In a calculating machine, a multiorder dividend register; dividend sensing means for sensing a plurality of digits in said register; a divisor receiving means; a higher comparator for estimating a quotient digit, jointly controlled by said divisor receiving means and by said dividend sensing means, and comprising a member primarily positioned by said dividend sensing mechanism in accordance with the highest order digit sensed; a lower comparator for estimating a quotient digit, jointly controlled by said divisor receiving means and by said dividend sensing means, and comprising a member primarily positioned by said dividend sensing mechanism in accordance with the next to highest order digit sensed; quotient set-up means responsive to said comparators for setting up a quotient digit, and means controlled by said dividend sensing means for rendering said quotient set-up means nonresponsive to said higher comparator means when the highest order dividend digit sensed is zero.

25. In a calculating machine, a multiorder dividend register; a divisor receiving means; a higher comparator means for estimating the first quotient digit resulting from division of a 2-digit number represented by digital values in two predetermined adjacent orders of said dividend register, by the first divisor digit set up in said divisor indicator; a lower comparator means for estimating the first quotient digit resulting from division of the number represented by the digital value in the lower of said two predetermined orders of said dividend register, by the said first divisor digit; quotient set-up means responsive to said comparators for setting up a quotient digit; and means responsive to digital value of one or more in the higher of said two first-mentioned predetermined orders for rendering said quotient set-up means responsive to said higher order comparator means and non-responsive to the said lower comparator means for setting up a quotient digit estimated by the higher comparator, and responsive to a digital value of zero in the higher of said two first-mentioned predetermined orders for rendering said quotient set-up means responsive to said lower comparator means and non-responsive to said higher comparators means, for setting up a quotient digit estimated by the lower comparator.

26. A calculating machine as described in claim 25, with means for initially setting up a dividend in predetermined orders of said dividend register preceded by a zero setting in the first order to the left thereof, and initially associating said comparator means with orders including said mentioned first order and orders immediately to the right thereof whereby in the initial cycle the lower comparator controls.

27. In a calculating machine; an accumulator, and means for initially entering a dividend therein; a divisor receiving means, and means for entering a divisor therein; a quotient selecting means including a quotient member movable into a plurality of positions representative of different digital values; a dividend member controlled by said accumulator and selectively positioned in accordance with the number entered in said accumulator; a divisor member controlled by said divisor receiving means and selectively positioned in accordance with the number entered into said divisor receiving means; and means jointly controlled by said dividend and divisor members for moving said quotient member to a position representative of an approximate partial quotient; in combination with checking mechanism including means jointly controlled by said divisor receiving means and said quotient member for multiplying the divisor by the selected partial quotient and negatively entering the product thereof into the accumulator, and control means jointly controlled by said dividend and divisor members to estimate a check quotient of the divisor with the remainder left in the same orders of the accumulator; said control means including means controlled by said quotient member and responsive to the estimation of a check quotient of value less than a predetermined minimum to enter the associated partial quotient, and responsive to estimation of the check quotient of value more than a predetermined maximum to enter a final quotient of value one less than said selected partial quotient.

28. In a calculating machine; an accumulator, and means for initially entering a dividend therein; a divisor receiving means, and means for entering a divisor therein; a quotient selecting means including a quotient member movable into a plurality of positions representative of different digital values; a dividend member controlled by said accumulator and selectively positioned in accordance with the number entered in said accumulator; a divisor member controlled by said divisor receiving means and selectively positioned in accordance with the number entered into said divisor receiving means; and means jointly controlled by said dividend and divisor members for moving said quotient member to a position representative of an approximate partial quotient; in combination with checking mechanism including means jointly controlled by said divisor receiving means and said quotient member for multiplying the divisor by the selected partial quotient and negatively entering the product thereof into the accumulator, and control means jointly controlled by said dividend and divisor members to estimate a check quotient of the divisor with the remainder left in the same orders of the accumulator; said control means including means for selectively adding the divisor into the accumulator in response to estimation of a check quotient above a predetermined maximum.

29. In a calculating machine, a multiorder dividend register, means for setting a multidigit dividend therein; a divisor receiving device, and means for setting a divisor therein; comparing means including, a dividend comparator member, a divisor comparator member, a quotient member having a plurality of positions corresponding to the digits one to nine, means controlled by said dividend register for moving said dividend comparator member to a position corresponding to a multidigit dividend value, and means controlled by said divisor receiving device for moving said divisor comparator member to a position corresponding to a divisor value; means controlled jointly by said dividend and divisor comparator members for moving said quotient member directly to the one of said positions corresponding to a pre-estimated value of the current digit of the quotient of the dividend and divisor, said pre-estimated value lying within a range including the true quotient digit value and the value differing therefrom by an error of not more than one digital increment; computing means jointly responsive to said divisor receiving device and said comparator means for multiplying the divisor by the pre-estimated quotient digit and negatively entering the product thereof into the dividend register; error responsive means operable under control of said comparing means in response to negative entry therein of an amount greater than said dividend, and means controlled by said error responsive means to cause said computing means to correct said error.

30. In a calculating machine, a multiorder dividend register, and means for setting a multidigit dividend therein; a divisor receiving means, and means for setting a multidigit divisor therein; comparator means for comparing said dividend with said divisor and preestimating the quotient thereof, including a dividend comparator member, a divisor comparator member, a quotient member having a plurality of positions corresponding to the digits one to nine, means controlled by said dividend register for moving said dividend comparator member to a position corresponding to a multidigit dividend value, means controlled by said divisor receiving means for moving said divisor comparator member to a position corresponding to a divisor value, and means controlled jointly by said dividend and divisor comparator members for moving said quotient member directly to the one of said positions which corresponds to the estimated value of a quotient digit of said dividend and divisor;

computing means jointly responsive to said divisor receiving means and said comparator means for multiplying the divisor by the preestimated quotient digit and negatively entering the product into the dividend register; shift means for associating said comparator means with predetermined group of orders of said dividend register; and successively operable control means for sequentially effecting operation of the computing means and then the shift means so as to operatively associate the comparator means with successively lower groups of orders of said dividend register.

31. A calculating machine as described in claim 30, with means controlled by the comparator means and operative in response to the estimation of a zero quotient digit thereby, for suppressing operation of the computing means and repeating operation of the shift means.

32. A calculating machine as described in claim 30, in which said shift means is operable to initially associate said comparator means with those orders of the dividend register in which the highest order digits of the dividend are registered; means for cyclically operating said comparator means to estimate successive quotient digits; means for cyclically operating said computing means to multiply the divisor by the estimated quotient digits and to negatively enter the products successively into the dividend register; and a member controlled by said computing means for enabling said control means to cause operation of said shift means following the successive entries of said products.

33. In a calculating machine; a multiorder accumulator means and means for initially entering successive digits of a dividend therein; means for receiving a divisor; divisor sensing means cooperating with said divisor receiving means; sensing means for sensing the digits entered in said accumulator means, including a means permanently associated with each order of said accumulator and actuated thereby into position dependent upon the digital value entered in that order; shiftable sensing means shiftable into cooperative relation with any of a plurality of said permanently associated means; means cooperating with said divisor sensing means and said shiftable sensing means for estimating the quotient digit corresponding to division of a number entered in said accumulator, by the divisor; means for multiplying the divisor in the divisor receiving means by the quotient digit estimated and negatively entering the product in the accumulator; means for repeatedly actuating said sensing and multiplying means in successive cycles of operation; and shift means for successively associating said divisor receiving means and said shiftable sensing means with successively lower orders of said accumulator means in successive cycles of operations.

34. In a calculating machine, a multiorder accumulator adapted to receive a multidigit dividend entry, a multiorder divisor receiving device, setting means for said device, mechanism adjustable to a series of different positions which constitute mechanical representations of different multidigit values; sensing means ordinally shiftable into sensing relationship with a group of adjacent orders of said accumulator; means operable under control of said sensing means to adjust said adjustable mechanism to the one of said series of positions which constitutes a mechanical representation of the multidigit value registered in the group of orders of the accumulator which are in sensing relationship with said sensing means, comparing mechanism settable under control of said adjustable mechanism and said divisor receiving device to form a mechanical representation of a digital value which is the approximate value of the first digit of the quotient of the value entered in that group of orders of the accumulator which are in sensing relationship with said sensing means divided by the divisor set up in said divisor receiving device, mechanism controlled by said comparing mechanism and by the aforesaid setting means for said divisor receiving device for subtracting from the amount entered in said accumulator, the product of the divisor set up in said divisor receiving device and the digital value represented by the setting of said comparing mechanism, means for relatively shifting said sensing means and said accumulator to bring said means into sensing relationship with another group of adjacent orders of said accumulator, and means for initiating readjustment of the aforesaid adjustable mechanism under control of said shiftable sensing means to a position constituting a mechanical representation of the value registered in said other group of orders of said accumulator.

35. In a calculating machine; a multidigit accumulator and means for entering a dividend therein; a factor receiving means and means for entering a divisor therein, the factor receiving means including selection elements adapted to be set in accordance with the divisor entered therein, a multiorder quotient indicator; divisor sensing means cooperating with said factor receiving means, and a divisor element selectively set thereby in accordance with the divisor entered therein; dividend sensing means cooperating with the accumulator, and a dividend element selectively set thereby in accordance with a number entered in said accumulator; first shiftable means for selectively shifting said dividend sensing means to associate it with different orders in said accumulator; means responsive to the setting of said elements for estimating a quotient digit; means responsive to said quotient estimating means and factor selection elements for multiplying the divisor by the estimated quotient digit and negatively entering the product into the accumulator; a second shiftable means for selectively associating said factor receiving means with different orders of said accumulator; means for entering an estimated quotient digit into said quotient indicator, including third shiftable means for selecting the order of the quotient indicator in which entry is made, and a single control device for actuating said three shiftable means to associate said dividend sensing means and said factor receiving means with lower orders of the accumulator and to associate said quotient entering means with a lower order of the quotient indicator.

36. In a calculating machine; a multiorder factor set-up mechanism including a plurality of similar selection devices in a row and a traveling set-up carriage and an associated 10-key keyboard for first actuating a first group of the selection devices successively from left to right in accordance with successive digits of a multiplicand, and then actuating a second group of the selection devices successively from left to right in accordance with successive digits of a multiplier; accumulator means having a plurality of orders; computing means associated with the accumulator and responsive to said multiplicand and multiplier selection devices to enter partial products of numbers set up therein into said accumulator means; shift means movable in unison with said carriage for selectively associating said selection devices with different orders of said accumulator means; means for normalizing said factor set-up mechanism; means for moving said traveling set-up carriage into the first order of said first group of selection devices, means for actuating said shift means into position to associate said selection devices with predetermined lower orders of said accumulator means; control means for energizing said normalizing means, said carriage moving means, and said shift actuating means; and means including a clear key for selectively energizing said control means.

37. In a calculating machine; a multiorder factor mechanism including a selectively settable element in each order; a 10-key keyboard, and a travelling set-up carriage associated therewith for successively setting said elements in successive orders, said carriage having an initial position, and means to automatically displace the carriage by successive steps from said initial position as the successive elements are set by the carriage; restoring means for restoring said carriage to its initial position; a multiorder accumulator controlled by said factor mechanism, each order of the factor mechanism being normally in cooperative relationship with a predetermined order of the accumulator; first shift means for bringing the respective orders of the factor mechanism into cooperative relation with different orders of the accumulator; restoring means to shift said first shift means to reestablish the factor mechanism in normal cooperative relation with the accumulator; means for sensing values set in the accumulator, said sensing means being normally associated with certain orders of the accumulator; second shift means for bringing the sensing means into cooperative relation with different orders of the accumulator, and restoring means for shifting said second shift means to reestablish its normal cooperative relation with the accumulator; a key, and means controlled thereby for moving the settable elements to zero and operating all of said restoring means.

38. In a calculating machine; computing means including a plurality of electromagnetic devices having windings selectively energizable in accordance with different values; a current source of substantially constant potential; means including selection switches for selectively preparing circuits from said source to selected ones of said windings; a normally open master switch and a normally closed auxiliary switch in series relation with each other and said source for completing the circuits prepared by said selection switches; a current reducing resistor shunted across said auxiliary switch; and means for cyclically actuating said computing means, including means for first closing said master switch and then opening said auxiliary switch, in timed relation in each cycle of operation, to initially impose a large voltage on said windings to positively operate said electromagnetic devices, and then reduce the voltage to a lesser value sufficient to hold said devices in operated position; said selection switches having active positions in which they prepare circuits to said windings, and inactive positions in which they do not prepare circuits to said windings; and resistance means for completing a circuit from said source to said master and auxiliary switches through each selection switch when the latter is in inactive position; whereby variations in the total current through said current reducing resistor resulting from movement of said selection switches from inactive to active positions are reduced.

HAROLD T. AVERY.